(12) United States Patent
Wei et al.

(10) Patent No.: US 12,733,576 B2
(45) Date of Patent: Sep. 15, 2026

(54) MOWER

(71) Applicant: Greenworks (Jiangsu) Co., Ltd., Changzhou (CN)

(72) Inventors: Qunli Wei, Changzhou (CN); Dongdong Shi, Changzhou (CN); Chen Zhu, Changzhou (CN); Min Ding, Changzhou (CN); Chaoqun Wang, Changzhou (CN); Fei Zhu, Changzhou (CN); Jun Fan, Changzhou (CN); Liang Peng, Changzhou (CN)

(73) Assignee: Greenworks (Jiangsu) Co., Ltd., Changzhou (CN)

(*) Notice: Subject to any disclaimer, the term of this patent is extended or adjusted under 35 U.S.C. 154(b) by 351 days.

(21) Appl. No.: 18/536,143

(22) Filed: Dec. 11, 2023

(65) Prior Publication Data

US 2024/0099196 A1 Mar. 28, 2024

Related U.S. Application Data

(63) Continuation of application No. PCT/CN2022/098906, filed on Jun. 15, 2022.

(30) Foreign Application Priority Data

Jun. 16, 2021 (CN) ......................... 202110667075.5
Jun. 16, 2021 (CN) ......................... 202110670378.2
(Continued)

(51) Int. Cl.
*A01D 34/78* (2006.01)
*A01D 34/66* (2006.01)
(Continued)

(52) U.S. Cl.
CPC ............. *A01D 34/78* (2013.01); *A01D 34/66* (2013.01); *A01D 34/662* (2013.01);
(Continued)

(58) Field of Classification Search
CPC .... A01D 69/02; A01D 34/662; A01D 34/667; A01D 67/04; A01D 34/66; A01D 34/78; A01D 42/00; B60K 7/0007
See application file for complete search history.

(56) References Cited

U.S. PATENT DOCUMENTS 6,681,443 B1 1/2004 Bourgeois
8,387,205 B2 * 3/2013 Weihl ..................... A01D 42/06 15/347
(Continued)

FOREIGN PATENT DOCUMENTS

CN 2461264 Y 11/2001
CN 103749089 A 4/2014
(Continued)

*Primary Examiner* — Brad Harcourt

(57) ABSTRACT

The disclosure provides a mower. The mower includes a vehicle frame, a walking assembly, a working assembly, a seat and a battery pack. The walking assembly includes a first walking wheel assembly and a second walking wheel assembly connected with the vehicle frame. The first walking wheel assembly and/or the second walking wheel assembly includes a main walking wheel and a hub motor, the main walking wheel is connected with the hub motor, and the hub motor is arranged outside a side of the vehicle frame. The working assembly is connected with the vehicle frame. The seat is arranged on the vehicle frame. The battery pack is lowered and mounted on the vehicle frame and extends below the seat.

19 Claims, 37 Drawing Sheets

(30) Foreign Application Priority Data

| | | |
|---|---|---|
| Jun. 16, 2021 | (CN) | 202121339069.9 |
| Jun. 16, 2021 | (CN) | 202121339751.8 |
| Jun. 16, 2021 | (CN) | 202121339839.X |
| Jun. 16, 2021 | (CN) | 202121341560.5 |
| Jul. 7, 2021 | (CN) | 202121544380.7 |
| Sep. 23, 2021 | (CN) | 202122313957.X |

(51) Int. Cl.
*A01D 67/04* (2006.01)
*A01D 69/02* (2006.01)

(52) U.S. Cl.
CPC ........... *A01D 34/667* (2013.01); *A01D 67/04* (2013.01); *A01D 69/02* (2013.01)

(56) References Cited

U.S. PATENT DOCUMENTS

| | | | | |
|---|---|---|---|---|
| 9,499,199 | B1 * | 11/2016 | Laymon | B62D 11/003 |
| 10,624,264 | B1 | 4/2020 | Seliga | |
| 11,032,973 | B2 | 6/2021 | Conrad et al. | |
| 2003/0082016 | A1 | 5/2003 | Eavenson | |
| 2008/0264026 | A1 | 10/2008 | Ishii et al. | |
| 2010/0257694 | A1 | 10/2010 | Weihl | |
| 2012/0246865 | A1 | 10/2012 | Lauer | |
| 2014/0121881 | A1 * | 5/2014 | Diazdelcastillo | G05D 1/0274 180/9.1 |
| 2014/0157744 | A1 * | 6/2014 | Anderson | A01G 20/47 56/13.5 |
| 2016/0113207 | A1 | 4/2016 | Shumaker et al. | |
| 2017/0354087 | A1 | 12/2017 | Yamagishi et al. | |
| 2019/0291779 | A1 * | 9/2019 | Zeiler | H01Q 1/27 |
| 2022/0174870 | A1 * | 6/2022 | Shaffer | A01D 43/063 |

FOREIGN PATENT DOCUMENTS

| | | | |
|---|---|---|---|
| CN | 207151202 | U | 3/2018 |
| CN | 110199667 | A | 9/2019 |
| CN | 111296044 | A | 6/2020 |
| CN | 111313503 | A | 6/2020 |
| CN | 111771521 | A | 10/2020 |
| CN | 112706602 | A | 4/2021 |
| CN | 113243190 | A | 8/2021 |
| CN | 113303178 | A | 8/2021 |
| CN | 214758312 | U | 11/2021 |
| CN | 215011659 | U | 12/2021 |
| CN | 215379928 | U | 1/2022 |
| CN | 215380408 | U | 1/2022 |
| CN | 215714914 | U | 2/2022 |
| CN | 215735809 | U | 2/2022 |
| DE | 102007015668 | A1 | 10/2008 |
| GB | 1507830 | A | 4/1978 |
| JP | 2000248524 | A | 9/2000 |
| JP | 2010104267 | A | 5/2010 |

* cited by examiner

MOWER

The present application is a continuation Application of PCT application No. PCT/CN2022/098906 filed on Jun. 15, 2022, which claims the benefit of CN202110670378.2 filed on Jun. 16, 2021, CN202121339069.9 filed on Jun. 16, 2021, CN202121544380.7 filed on Jul. 7, 2021, CN202122313957.X filed on Sep. 23, 2021, CN202121341560.5 filed on June 16, CN202121339751.8 filed on June 16, CN202121339839.X filed on June 16, CN202110667075.5 filed on June 16. All the above are hereby incorporated by reference.

TECHNICAL FIELD

The disclosure belongs to the technical field of mowers, and in particular relates to a mower with a hub motor.

BACKGROUND

The current electric-driven riding mower products are all driven by a driving motor with a gearbox, and the battery pack is mounted at the rear end of the vehicle frame, located directly above the driving motor, and the front end of the battery pack ends at the seat. This structural design has many disadvantages. Specifically, the size and weight of the driving motor and the gearbox are large, which occupies a large space, and is inconvenient to mount and replace. Moreover, the gear transmission has a part of efficiency loss and high noise. The gear oil needs to be regularly maintained and replaced, and the gear oil must be emptied during transportation, which results in unnecessary waste. In addition, the battery pack is mounted above the driving motor, and the mounting position is high and rearward, resulting in the center of the whole mower being high and rearward, which is not conducive to driving stability and climbing stability, leads to a long power wire connected with the battery pack, and increases the safety hazard.

Current mowers transmit power to the cutter through gasoline engines, electromagnetic clutches, belts and pulleys, thereby rotating and cutting the lawn. This structure has the following defects: the exhaust gas discharged from the traditional fuel engine will cause a large amount of air pollution; the structure of traditional mowers is relatively complicated, and the cost of parts, productions and later maintenances and replacements is relatively expensive.

At present, most blowers on the market blow in a fixed direction and may not be adjusted. The blowing direction of some blowers may be adjusted, but it requires people to get off the mower and adjust the blowing direction at the air outlet of the blower, which is inconvenient to operate.

Mowers usually use an anti-reverse charging module to dissipate the energy generated when the garden tool brakes, so as to avoid damage to the mower. At present, the anti-reverse charging module includes a reverse charging resistor and a control module, both of which are integrated in the same closed container, so it is difficult to dissipate heat and the mounting positions of them are within the range that the human body may easily touch. During the operation of the garden tool, the reverse charging resistor will continue to heat up, which will cause damage to the components of the control module. And since the heat dissipation of the entire anti-reverse charging module is slow, when the human body accidentally touches or touches the housing of the entire anti-reverse charging module, it will cause burns to varying degrees.

SUMMARY

The disclosure provides a mower with a hub motor, which is used to solve technical problems of inconvenient mounting and replacement, high cost, unreasonable distribution of a center of gravity of a whole mover, and poor driving stability and climbing stability of a drive structure using a driving motor with a gearbox in the conventional art.

The disclosure provides a mower, including a vehicle frame, a walking assembly, a working assembly, a seat and a battery pack. The walking assembly includes a first walking wheel assembly connected with the vehicle frame and a second walking wheel assembly connected with the vehicle frame. The working assembly is connected with the vehicle frame. The seat is arranged on the vehicle frame. The battery pack is and mounted on the vehicle frame and extends below the seat. The first walking wheel assembly and/or the second walking wheel assembly includes a main walking wheel and a hub motor, the main walking wheel is connected with the hub motor, and the hub motor is arranged outside a side of the vehicle frame.

In an embodiment of the disclosure, the first walking wheel assembly is arranged at a front end of the vehicle frame, the first walking wheel assembly includes a front wheel and a steering mechanism to control a steering of the front wheel, the second walking wheel assembly is arranged at a rear end of the vehicle frame, and the second walking wheel assembly includes the main walking wheel and the hub motor.

In an embodiment of the disclosure, the seat is arranged between the first walking wheel assembly and the second walking wheel assembly, and the battery pack is and mounted at the rear end of the vehicle frame and extends below the seat.

In an embodiment of the disclosure, the seat is arranged between the first walking wheel assembly and the second walking wheel assembly, and the battery pack is mounted at the front end of the vehicle frame and extends below the seat.

In an embodiment of the disclosure, a longitudinal distance between a front end of the battery pack and an axle of the main walking wheel is between 340 mm and 400 mm.

In an embodiment of the disclosure, a distance between a center of gravity of the battery pack and an axle of the main walking wheels is between 60 mm and 70 mm.

In an embodiment of the disclosure, a height of a center of gravity of the battery pack from a ground is from 400 mm to 500 mm.

In an embodiment of the disclosure, a total length of the hub motor is from 250 mm to 310 mm.

In an embodiment of the disclosure, the working assembly further includes a cutting deck, a driving assembly and a cutter assembly. The driving assembly is mounted on a top of the cutting deck, and an air vent is arranged between the cutting deck and the driving assembly. The cutter assembly is mounted on a bottom of the cutting deck and connected with an output shaft of the driving assembly.

In an embodiment of the disclosure, a mounting hole is arranged on the cutting deck, the driving assembly is mounted in the mounting hole, partially extends from the mounting hole into the bottom of the cutting deck, and is connected with the cutter assembly.

In an embodiment of the disclosure, the mower further includes a resistor assembly, the resistor assembly is mounted at a bottom of the vehicle frame, and the resistor assembly includes a reverse charging resistor.

In an embodiment of the disclosure, the walking assembly includes the first walking wheel assembly and the second walking wheel assembly arranged at the bottom of the vehicle frame, and the resistor assembly is located between the first walking wheel assembly and the second walking wheel assembly.

In an embodiment of the disclosure, the resistor assembly further includes a mounting bracket, a heat dissipation component and a mesh plate. The resistor assembly is mounted on the vehicle frame through the mounting bracket. The heat dissipation component is mounted on the mounting bracket. The mesh plate is mounted on the mounting bracket. The reverse charging resistor is located between the heat dissipation component and the mesh plate, and heat dissipation holes of the mesh plate expose a surface of the reverse charging resistor on a side away from the heat dissipation component.

In an embodiment of the disclosure, the mesh plate is arranged on one side of the resistor assembly facing a forward direction of the mower.

In an embodiment of the disclosure, the mower further includes a control module, and the control module and the resistor assembly are mounted independently, the control module is connected with the reverse charging resistor, and the control module and the reverse charging resistor together constitute an anti-reverse charging module.

In an embodiment of the disclosure, the mower further includes a blower, the blower is mounted to a front end of the mower, the blower includes a blower frame and a blowing direction adjustment mechanism. The blowing direction adjustment mechanism is arranged on the blower frame. Wherein, the blowing direction adjustment mechanism includes a gear seat, a rotating swing arm, an adjustment handle, a connecting rod assembly, an adjustment plate rotating shaft and an air direction adjustment plate. The gear seat is mounted on the blower frame and the blower frame is provided with an air outlet. The rotating swing arm is rotatably mounted on the gear seat. One end of the adjustment handle is pivotally arranged on the rotating swing arm. A first end of the connecting rod assembly is connected with the rotating swing arm. The adjustment plate rotating shaft is arranged at the air outlet, and connected with a second end of the connecting rod assembly through a transmission component. The air direction adjustment plate is located in the air outlet, fixedly connected with the adjustment plate rotating shaft, and rotates synchronously with the adjustment plate rotating shaft.

In an embodiment of the disclosure, the adjustment handle includes a holding part and a pivot mounting part, the pivot mounting part is arranged at one end of the holding part, the blowing direction adjustment mechanism further includes a first torsion spring, the first torsion spring is sleeved on the pivot mounting part, a first end of the first torsion spring is connected with the holding part, and a second end of the first torsion spring is connected with the rotating swing arm.

In an embodiment of the disclosure, the blowing direction adjustment mechanism further includes a second torsion spring, the second torsion spring is sleeved on the adjustment plate rotating shaft, a first end of the second torsion spring is connected with the transmission component, and a second end of the second torsion spring is connected with the blower frame.

In an embodiment of the disclosure, the blowing direction adjustment mechanism further includes two joint bearings, a first end of the connecting rod assembly is connected with the rotating swing arm through the joint bearings, a second end of the connecting rod assembly is connected with a first end of the transmission component through the joint bearing, and a second end of the transmission component is connected with the adjustment plate rotating shaft.

In an embodiment of the disclosure, the mower further includes a blower. The blower is connected with the mower, the blower includes a blower assembly and an adjustment mechanism. The adjustment mechanism is arranged on the blower assembly, and the adjustment mechanism includes a rotating air passage assembly and a driving mechanism. The rotating air passage assembly is connected with an air outlet of the blower. The driving mechanism is in a transmission connection with the rotating air passage assembly, and the driving mechanism is provided with an operating part. Wherein, an arrangement position of the operating part is a position that is operatable by an operator who in a driving position of the mower, and the driving mechanism is controlled by the operating part to drive the rotating air passage assembly to rotate.

In the mower of the disclosure, the hub motor saves one-third to one-half of the cost compared with a motor gearbox solution.

In the mower of the disclosure, a total length of the hub motor is shorter than that of the driving motor and the gearbox, and a weight of the hub motor is lighter, a mass of a rear axle is reduced, and a stability of the whole mower is better.

In the mower of the disclosure, compared with the motor gearbox solution, a main part of the hub motor is mounted in a rim, and the whole hub motor is located outside the vehicle frame, a mounting space of the battery pack is larger, and the center of gravity of the battery pack is lower and closer to the rear axle. Therefore, a distribution of the center of gravity of the whole mower is more reasonable, and a climbing stability is greatly increased.

In the mower of the disclosure, the hub motor directly drives the wheels, which has high efficiency without any transmission loss, does not require gear oil and maintenance, and is convenient for transportation.

In the mower of the disclosure, the hub motor is completely mounted on an outside of the vehicle frame, and an outer rotor of the motor rotates with the wheel, so that a heat dissipation performance is significantly improved.

In the mower of the disclosure, through arranging the air vent between the driving assembly and the cutting deck, as a cutter rotates, air flow around the motor is also accelerated, and the heat emitted by the motor is absorbed into a cutting deck cavity through the air vent, and is discharged with a rotation of the cutter, thus improving a heat dissipation effect of the motor. In addition, vanes are also designed on a blade mounting base, which may rotate together with the blades, and may also dissipate heat for the motor, which improves the heat dissipation effect of the mower of the disclosure.

In the mower of the disclosure, the reverse charging resistor is mounted independently from the anti-reverse charging module to separate the reverse charging resistor from the control module, so as to protect the control module from being damaged by a high temperature of the reverse charging resistor and prolong a duration life of the control module.

The blowing direction adjustment mechanism of the blower designed by the multi-connecting rod adjustment mechanism of the mower of the disclosure can realize a multi-angle adjustment of the blowing direction of the air outlet of the blower, and a mounting position of the blower is located at the front end of the mower. During an entire adjustment process, the operator leans forward in a driving position on the mower, and the driver's arm may adjust the blowing direction angle through an adjustment handle, which is simple and convenient, and saves manpower and time.

The mower of the disclosure adopts the blowing direction adjustment mechanism with the rotating air passage assembly and the driving mechanism, which can realize a stepless adjustment of an air outlet direction of the blower. A mounting position of the blower is located at the front end of the mower. During an entire adjustment process, the operator leans forward in a driving position on the mower. The driver's arm may rotate the rotary handle to drive the air outlet to rotate, and an angle adjustment of the blowing direction may be quickly completed, which is simple and convenient, and saves manpower and time.

DETAILED DESCRIPTION

Figure 1:
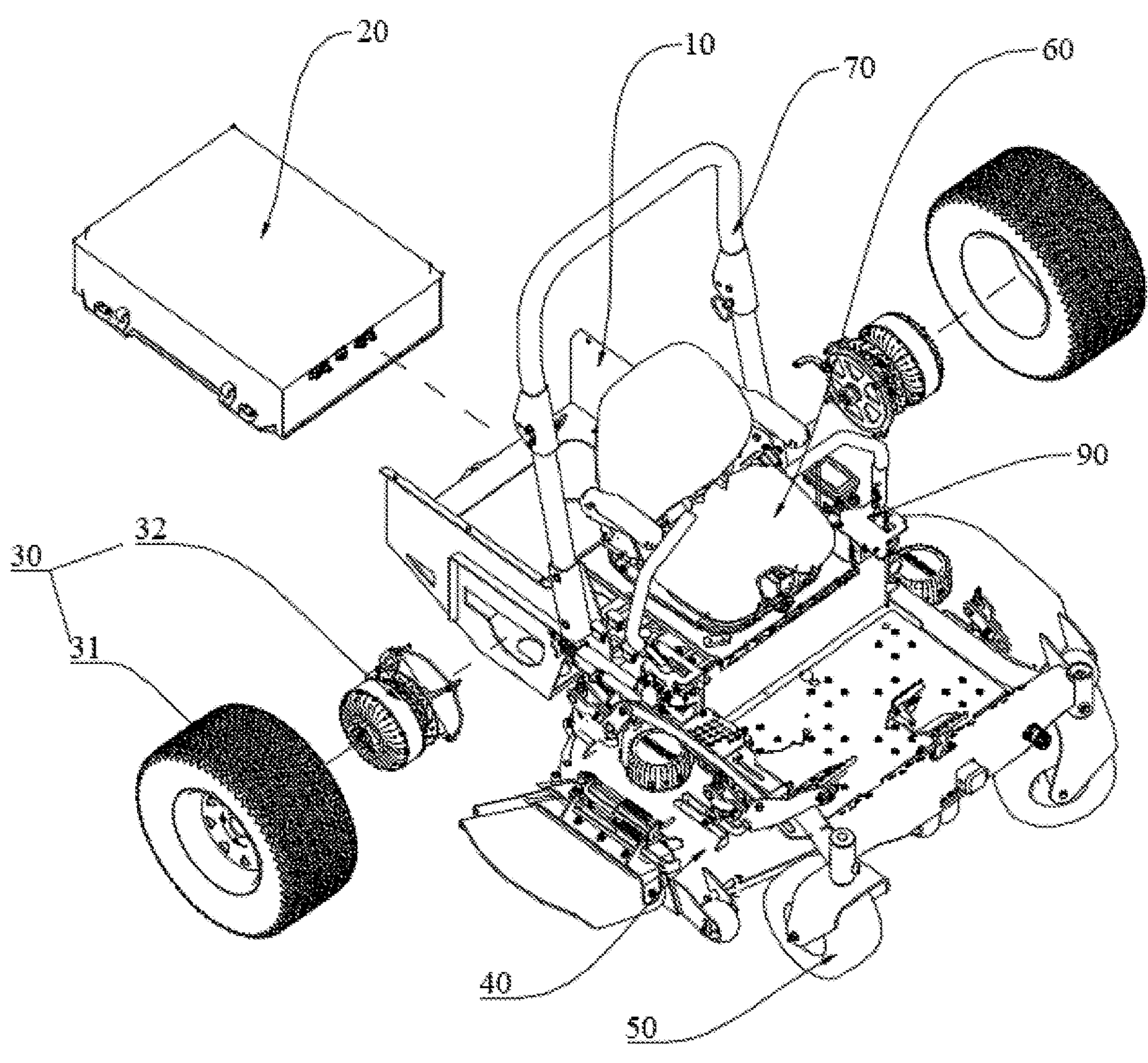
FIG. 1 is a schematic structural view of a garden tool of the disclosure.

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure.

It should be noted that drawings provided in the embodiments are only illustrative of a basic idea of the disclosure. The drawings only show assemblies related to the disclosure instead of drawing according to the number, shape and size of the assemblies in actual implementation. In actual implementation, the type, quantity and ratio of each assembly may be changed at will, and a layout of the assemblies may also be more complicated.

Please refer to FIG. 1 through FIG. 6. An embodiment of the disclosure provides a mower driven with a hub motor 32. The mower includes a vehicle frame 10, a seat 60, an operating assembly 90, a walking assembly, a mowing assembly 40, a battery pack 20 and an electric control box 80, and all of these components are arranged on the vehicle frame 10.

Technical solutions of the disclosure will be described in detail below in conjunction with accompanying drawings.

Figure 2:
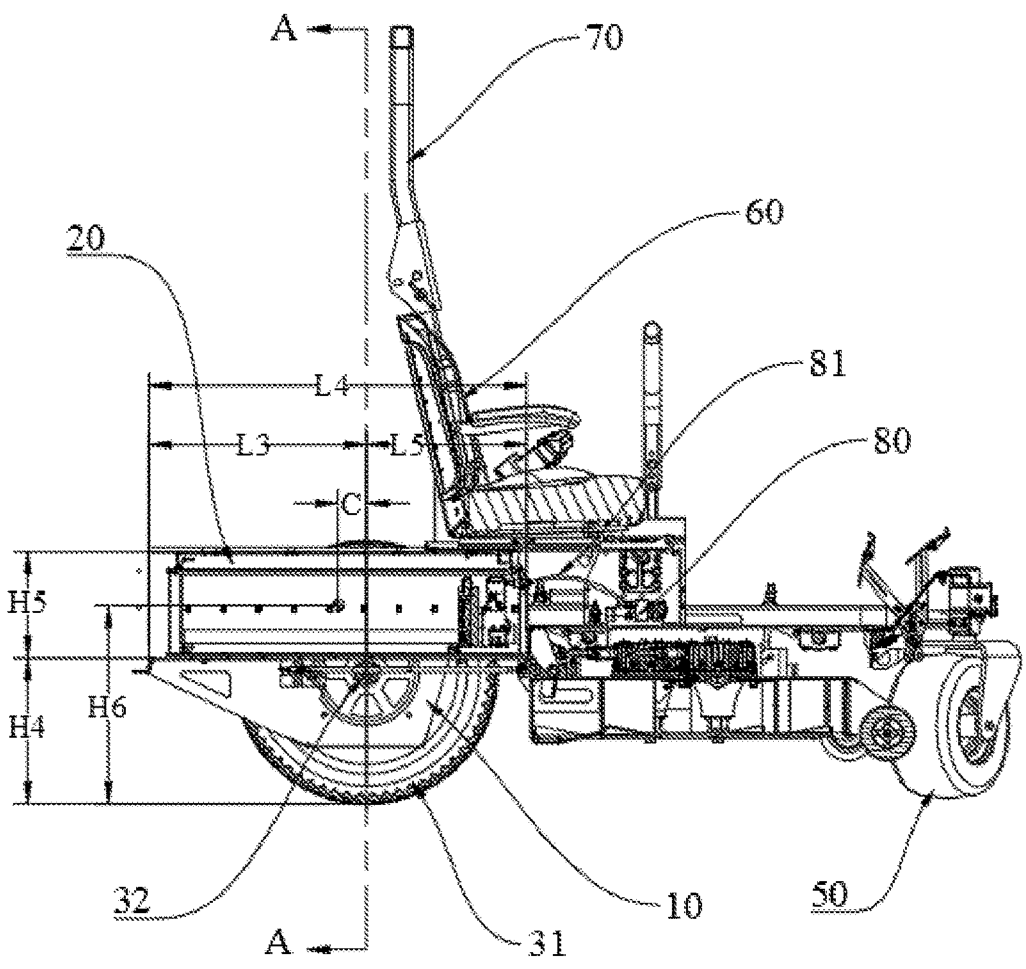
FIG. 2 is a half-sectional view of a vertical plane behind a rear wheelbase of the garden tool of the disclosure.
Figure 3:
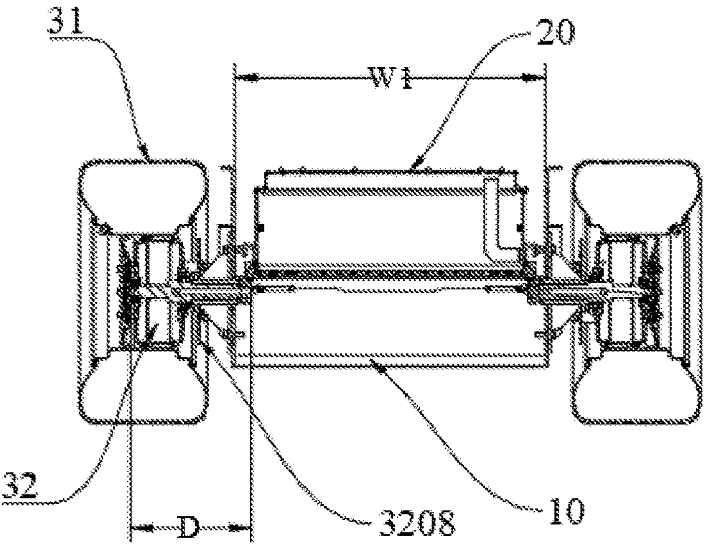
FIG. 3 is a sectional view along a direction A-A in FIG. 2.
Figure 4:
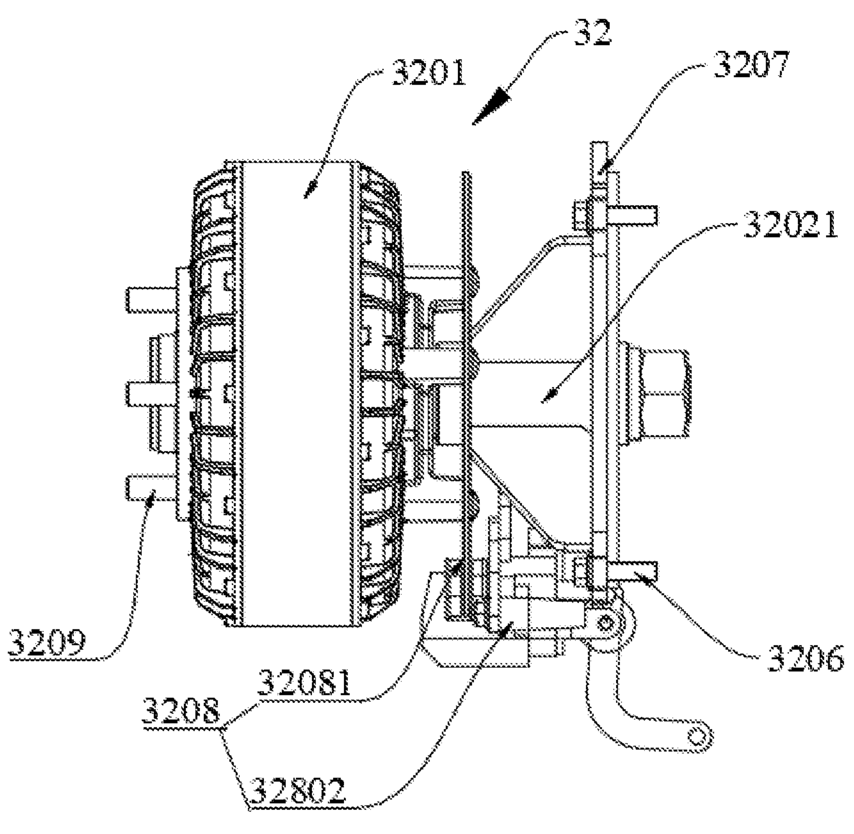
FIG. 4 is a front view of a hub motor of the disclosure.
Figure 5:
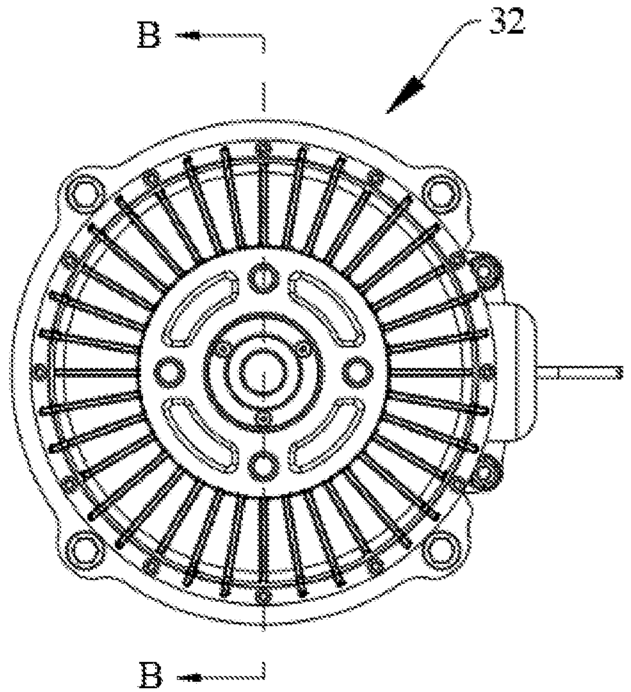
FIG. 5 is a left view of the hub motor of the disclosure.
Figure 6:
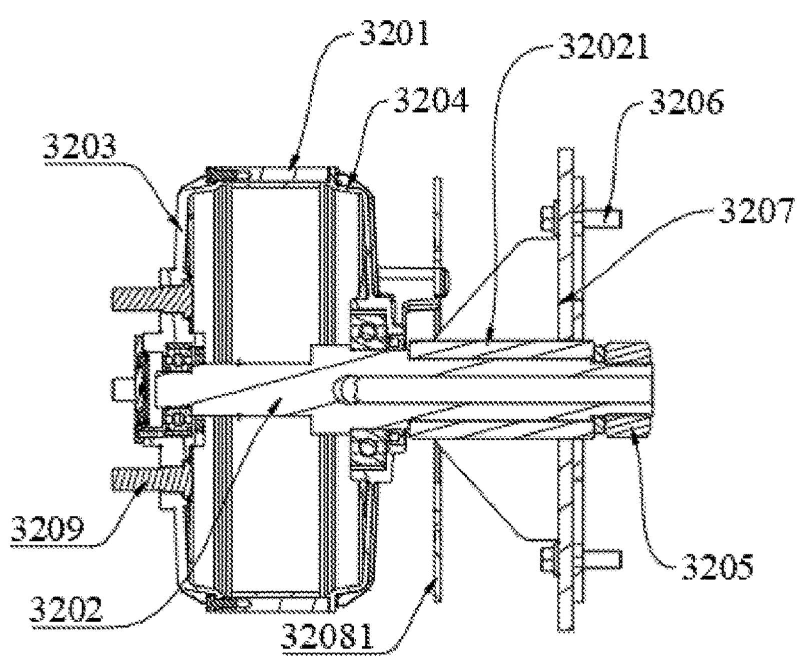
FIG. 6 is a left view of a sectional view along the B-B direction in FIG. 5 of the hub motor of the disclosure.
Figure 7:
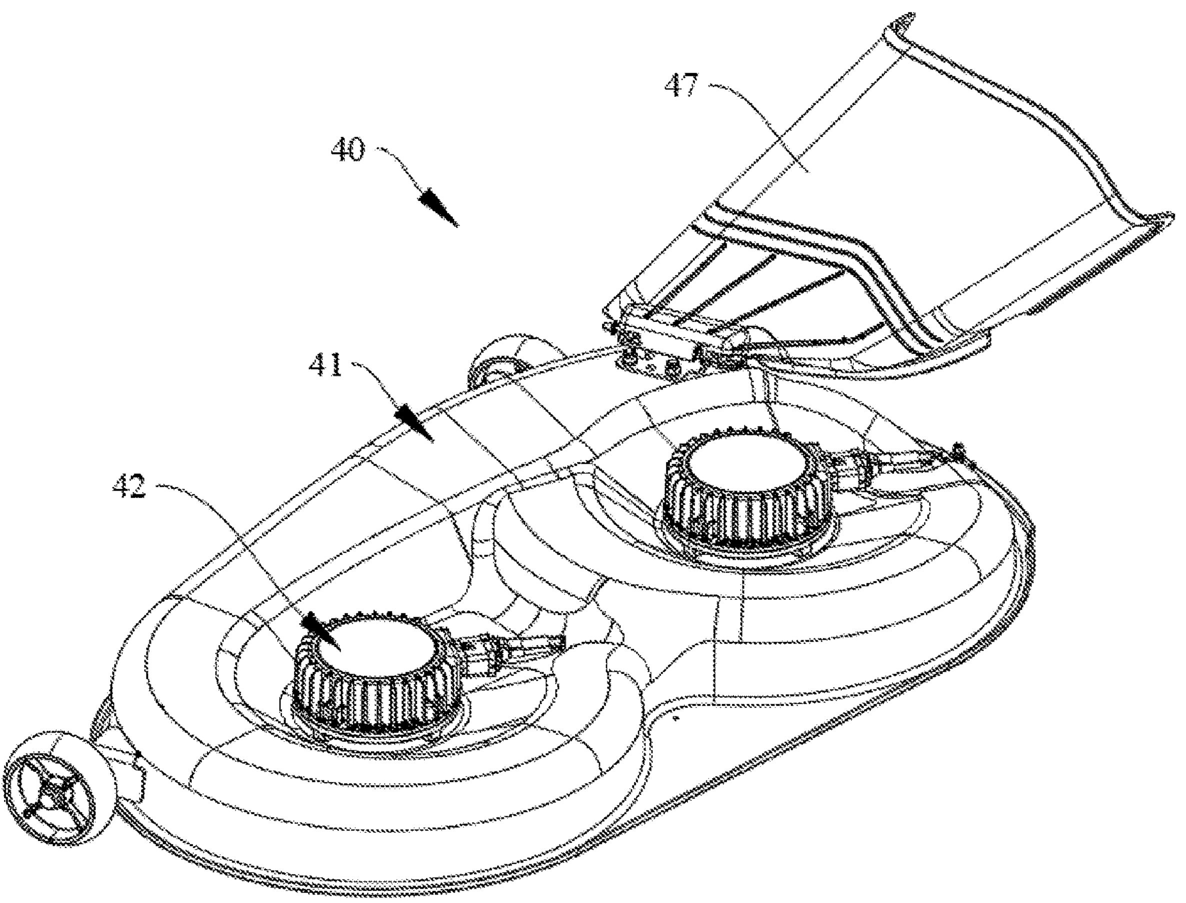
FIG. 7 is a schematic view of an overall structure of a mowing assembly in an embodiment of the disclosure.
Figure 8:
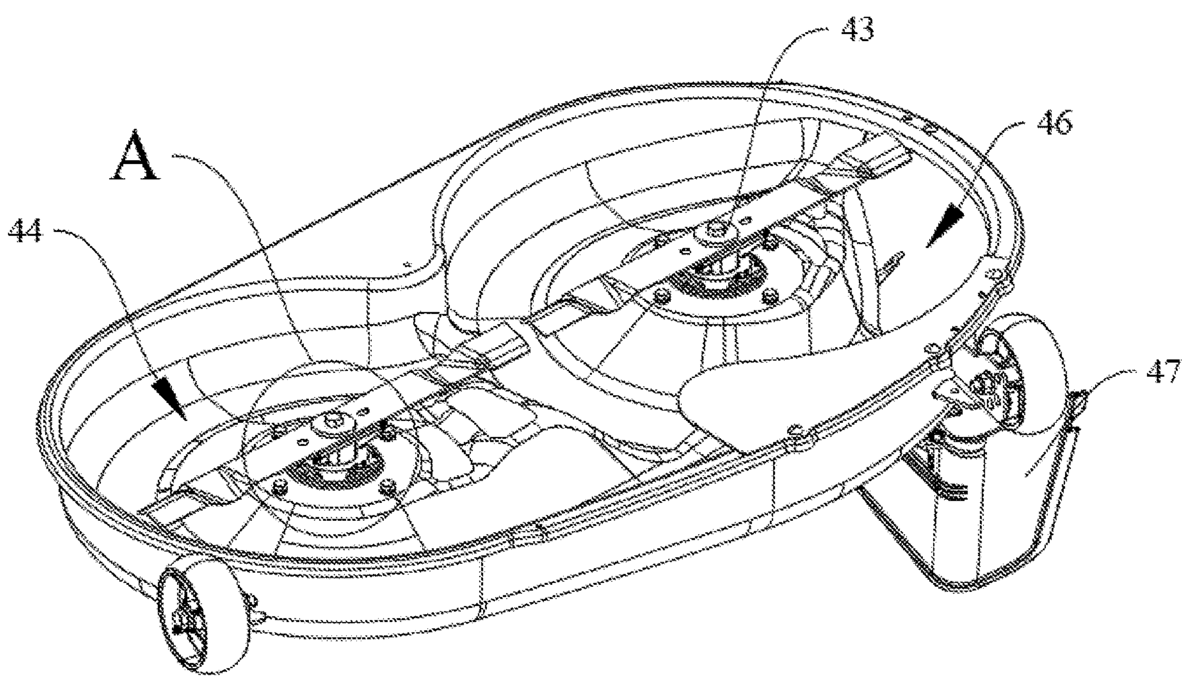
FIG. 8 is a schematic view of the overall structure of another angle of the mowing assembly in an embodiment of the disclosure.
Figure 9:
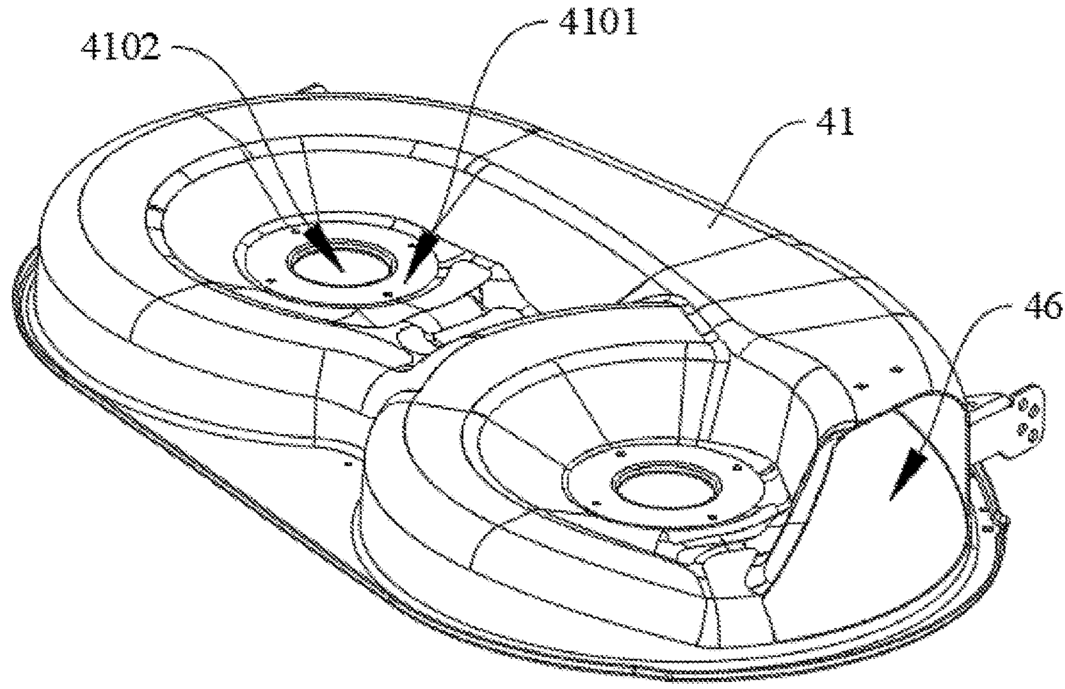
FIG. 9 is a schematic structural view of a cutting deck in an embodiment of the disclosure.
Figure 10:
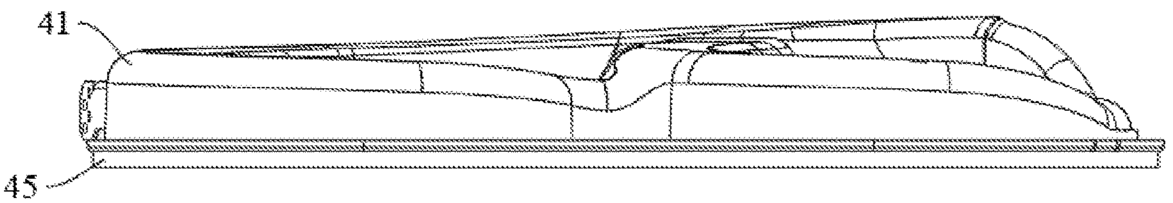
FIG. 10 is a schematic structural view of another angle of the cutting deck in an embodiment of the disclosure.

Please refer to FIG. 1 through FIG. 3. In this embodiment, the seat 60 is arranged at a middle position on the vehicle frame 10 for an operator to sit on. The operating assembly 90 is arranged at a position convenient for the operator to operate, such as two sides of the seat 60, and is used for controlling the mower. The electric control box 80 is arranged on the vehicle frame 10 and is located at a below of the seat 60. The electric control box 80 is connected with the mowing assembly 40 (as a working assembly) and a rear wheel assembly 30 of the walking assembly, and the electric control box 80 is used to control working states of the mowing assembly 40 and the walking assembly.

Please refer to FIG. 1 through FIG. 3. In this embodiment, the walking assembly is used for a movement of the mower, and it includes a pair of front wheel assemblies 50 (a first walking wheel assembly) arranged at a bottom front end of the vehicle frame 10 and a pair of rear wheel assemblies 30 (a second walking wheel assembly) arranged at a bottom of the vehicle frame 10 at a rear position. The front wheel assembly 50 is a driven wheel assembly, which includes a front wheel rotatably connected with a bottom front end of the vehicle frame 10 and a steering mechanism for controlling a steering of the front wheel. The front wheel may be a universal wheel, for example. As an example, the front wheels may be smooth universal wheels, so as to effectively avoid an impact of the front wheels on a working ground when turning.

Please refer to FIG. 1 through FIG. 3. In this embodiment, the vehicle frame 10 is further provided with a roll over protection system 70, which is located on a rear side of the seat 60 to prevent the operator from falling. During the operation, the roll over protection system 70 reduces a damage to the operator due to accidental rollover, and greatly guarantees a personal safety of the operator.

Please refer to FIG. 1 through FIG. 3. In this embodiment, the rear wheel assembly 30 is used as a driving wheel assembly, which includes a hub motor 32 and a rear wheel 31 (as a main walking wheel), and a main part of the hub motor 32 is mounted in a rim of the rear wheel 31 through flange bolts 3209 (see FIG. 6), and the whole of the hub motor 32 is located outside the vehicle frame 10. The rear wheel 31 is directly driven by the hub motor 32. A differential movement of the two rear wheels 31 may be controlled respectively by the two hub motors 32, so that a steering radius of the rear wheel assembly 30 approaches zero infinitely, which further improves a practicability and performance of the mower.

Please refer to FIG. 1 through FIG. 6. In this embodiment, the hub motor 32 is mounted on an outside of the vehicle frame 10, and fixing bolts 3206 and locking nuts 3205 to be introduced later are fixedly connected with the vehicle frame 10, and an assembly and disassembly are very convenient. The hub motor 32 includes a motor stator shaft 3202, a motor outer rotor 3201, a first outer end cover 3203, a second outer end cover 3204, a disc brake 3208 and a fixing bracket 3207. The motor stator shaft 3202 is fixed with the vehicle frame 10, and is located at a center of the motor outer rotor 3201. An axial length of the motor stator shaft 3202 is greater than an axial length of the motor outer rotor 3201. One end of the motor stator shaft 3202 protrudes from a center of the second outer end cover 3204, passes through the vehicle frame 10 and is fixedly connected with the vehicle frame 10 through the locking nut 3205.

Please refer to FIG. 1 through FIG. 6. In this embodiment, the motor outer rotor 3201, the first outer end cover 3203, and the second outer end cover 3204 form a housing cavity. Wherein, the first outer end cover 3203 is supported on one end of the motor stator shaft 3202 through a bearing (not labeled), and the second outer end cover 3204 is supported on a middle part of the motor stator shaft 3202 through another bearing (not labeled). Two sides of the motor outer rotor 3201 are fixedly connected with the first outer end cover 3203 and the second outer end cover 3204 by bolts respectively. Therefore, the motor outer rotor 3201, the first outer end cover 3203 and the second outer end cover 3204 may rotate together relative to the motor stator shaft 3202.

Please refer to FIG. 1 through FIG. 6. In this embodiment, the fixing bracket 3207 is arranged on a side of the second outer end cover 3204 away from the first outer end cover 3203, and is fixedly connected with a shaft sleeve 32021. The shaft sleeve 32021 is sleeved on a part of the motor stator shaft 3202 protruding from the second outer end cover 3204, the fixing bracket 3207 is arranged around the shaft sleeve 32021, and one end of the fixing bracket 3207 away from the second outer end cover 3204 is fastened to the vehicle frame 10 through the fixing bolts 3206. As an example, the fixing bracket 3207 and the shaft sleeve 32021 may be connected by welding, for example. As an example, the number of fixing bolts 3206 may be four, for example.

Please refer to FIG. 1 through FIG. 6. In this embodiment, the disc brake 3208 includes a brake plate 32081 and a brake caliper 32082, and the brake plate 32081 is arranged between the second outer end cover 3204 and the vehicle frame 10. The brake plate 32081 is sleeved on the shaft sleeve 32021 or the motor stator shaft 3202, and is fixed with the second outer end cover 3204 by bolts. The brake caliper 32082 is fixedly connected with the fixing bracket 3207 and arranged on an edge of the brake plate 32081. When braking, a high-pressure brake fluid pushes a brake block of the brake caliper 32082 to clamp the brake plate 32081 to produce a braking effect.

It should be noted that, compared with a conventional driving scheme of driving motor with the gearbox, the hub motor 32 is completely mounted on the outside of the vehicle frame 10, and is connected with the vehicle frame 10 by the fixing bolts 3206 and the locking nuts 3205, and the assembly and disassembly are simple and convenient. The hub motor 32 directly drives the wheels, with high efficiency and basically no transmission loss, more efficient transmission, no gear oil, no maintenance, and convenient transportation. The hub motor 32 may save one-third to one-half of cost compared with the conventional driving scheme of driving motor with the gearbox, and the cost is lower. A total length D of the hub motor is between 250 mm and 310 mm, such as 280 mm, and a weight of the hub motor is between 42 kg and 52 kg, such as 47 kg. The total length D of the hub motor 32 is shorter than a total length of the driving axle (driving motor plus gearbox), the weight may be reduced by about ⅓, a mass of the hub motor 32 is lighter, a mass of a rear axle is reduced, and a stability of the whole mower is better. Since the hub motor 32 is completely mounted on the outside of the vehicle frame 10, the hub motor 32 rotates with the wheels during operation, and its heat dissipation capacity far exceeds a driving scheme of the driving motor with the gearbox mounted inside the vehicle frame 10.

Please refer to FIG. 1 through FIG. 3. In this embodiment, since the mower uses two hub motors 32 to directly drive the rear wheels 31, the main part of the hub motor 32 is mounted in the rim (also called wheel rim), and the hub motor 32 may be completely mounted outside the vehicle frame 10.

Please refer to FIG. 1 through FIG. 3. In this embodiment, the battery pack 20 is set in a flat strip shape, which may increase a volume of the battery pack 20. The battery pack 20 is lowered and mounted inside the vehicle frame 10 and extends directly below the seat 60. A longitudinal distance L5 between a front end of the battery pack 20 and a cross-section of a wheel axle of the rear wheel 31 is between 340 mm and 400 mm, for example, 370 mm. A distance C between a center of gravity of the battery pack 20 and the rear axle is between 60 mm and 70 mm, for example, 65 mm. A height H6 between the center of gravity of the battery pack 20 and the ground is between 400 mm and 500 mm, for example, 450 mm.

A mounting space of the battery pack 20 is increased by changing a structure of the vehicle frame 10, so that the center of gravity of the battery pack 20 moves forward, and the center of gravity of the battery pack 20 is lowered. In this way, a height of a position close to a center of gravity of the whole mower from the ground is greatly reduced and is closer to an axis of the rear wheel 31, and the center of gravity of the whole mower is at an optimal position (which means a half position of the front and rear wheelbase), which increases a driving stability and climbing stability of the whole mower. In addition, because the battery pack 20 is flat and long, a surface area of upper and lower surfaces may be increased, and a heat dissipation capacity of the battery pack 20 is also improved.

Please refer to FIG. 1 through FIG. 3. In this embodiment, a part of the battery pack 20 is extended and mounted under the seat 60, so the battery pack 20 may be wired from the front end. A first end of the power wire 81 is connected with the front end of the battery pack 20, and a second end of the power wire 81 is connected with the electric control box 80. A direction of the power wire 81 is shown in FIG. 2, which may greatly shorten a length of the power wire 81 and improve safety.

Comparing the mower driven by the hub motor 32 in this embodiment with the mower that uses the driving motor with the gearbox with substantially same specifications and dimensions, the mounting space of the battery pack 20 is increased by changing the structure of the vehicle frame 10, and a distance H4 between a mounting surface of the battery pack 20 and the ground is about 330 mm. The mounting space of the battery pack 20 is L4 (860 mm)*W1 (710 mm)*H5 (240 mm), a length of the battery pack 20 is increased by 40%, and a capacity has been increased by one-third. The longitudinal distance L5 between the front end of the battery pack 20 and the cross-section of the wheel axle of the rear wheel 31 is about 370 mm, L3 means that a length of a rear overhang remains unchanged, and a distance C between the center of gravity of the battery pack 20 and the rear axle is about 65 mm. A height H6 of the center of gravity of the battery pack 20 from the ground is about 450 mm, the center of gravity of the battery pack 20 has moved forward by 135 mm, and the center of gravity of the battery pack 20 has been lowered by 170 mm. Affected by this, the center of gravity of the whole mower is closer to the optimal position (which means the half position of the front and rear wheelbase) by 50 mm, a height of the center of gravity of the whole mower is reduced by about 40 mm, and the climbing stability is greatly increased.

In the mower driven by the hub motor 32 of this embodiment, the total length D of the hub motor 32 is about 280 mm, and the weight is about 47 kg. Compared with mowers with basically the same specifications and dimensions which are driven by the driving motor with the gearbox, the driving axle is shortened by 40%, and the weight is lightened by one-third. A mass of the rear axle is reduced, and the stability of the whole mower is better.

Comparing the mower driven by the hub motor 32 in this embodiment with the mower that uses the driving motor with the gearbox with substantially same specifications and dimensions, since the front end of the battery pack 20 is used to be wired, one end of the power wire 81 is connected with the front end of the battery pack 20, and the other end is connected with the electric control box 80. The direction of the power wire 81 is changed as shown in FIG. 2, and the length of the power wire 81 is shortened by about 400 mm, which improves safety.

Although the mower of the embodiment adopts the rear wheel driven by the hub motor 32 as the main walking wheel, it may be understood that, in other embodiments, the mower may also adopt the front wheel driven by the hub motor 32 as the main walking wheel. The battery pack 20 is lowered and mounted on the front part of the vehicle frame 10 and extends to the bottom of the seat 60.

Although this embodiment is described with a mower as an example, it may be understood that a design idea of the mower with the hub motor 32 in this embodiment may also be applied to other garden tools. As a garden tool with the hub motor 32, the vehicle frame 10 and battery pack 20 of the garden tool may refer to the above-mentioned similar designs, and specific types of working assemblies of the garden tool may be selected according to actual needs.

In order to solve problems of environmental pollution and complex structure caused by traditional mowers using fuel engines, in this embodiment, please refer to FIG. 7 through FIG. 20. The mower includes the mowing assembly 40, and the mowing assembly 40 includes a cutting deck 41, a driving assembly 42 and a cutter assembly 43. Wherein, the driving assembly 42 and the cutter assembly 43 are mounted on the cutting deck 41, and an output shaft 4201 of the driving assembly 42 is fixedly connected with the cutter assembly 43. A second driving motor 4205 in the driving assembly 42 starts to rotate, thereby driving the cutter assembly 43 to rotate to mow, and the cutting deck is mounted at the bottom of the vehicle frame 10 of the mower.

Please refer to FIG. 7 through FIG. 10. In this embodiment, a top of the cutting deck 41 is depressed downward to form a motor mounting groove 4101, and a bottom of the motor mounting groove 4101 is provided with a mounting hole 4102. The driving assembly 42 is mounted in the motor mounting groove 4101, and the output shaft 4201 of the driving assembly 42 extends from the mounting hole 4102 to a bottom of the cutting deck 41 to be connected with the cutter assembly 43, thereby driving the cutter assembly 43. It should be noted that, in this embodiment, the bottom of the cutting deck 41 is formed with a cutter housing cavity 44, the cutter assembly 43 is located in the cutter housing cavity 44, and is fixedly connected with the output shaft 4201 of the driving assembly 42. In addition, the bottom of cutting deck 41 is provided with a blocking plate 45 around, and a height of blocking plate 45 will be higher than a height of cutter assembly 43, which means that a distance between the cutter assembly 43 and the cutting deck 41 is less than a distance between a lower end of the blocking plate 45 and the cutting deck 41, so that the cutter assembly 43 is contained in the cutter housing cavity 44 formed by a combination of the blocking plate 45 and the cutting deck 41, which avoids an exposure of the cutter assembly 43 to the outside and causing injury to the operator during work. And due to an existence of the blocking plate 45, it is possible to avoid splashing of cut forage and avoid inconvenience for subsequent cleaning.

Please refer to FIG. 11 through FIG. 14. In this embodiment, there is a gap between the driving assembly 42 and the cutting deck 41 to form a ventilation hole 4103, so that air flows more smoothly, and the air in the cutter housing cavity 44 can be replenished in time, which may discharge grass more smoothly. In this embodiment, the driving assembly 42 includes the output shaft 4201 and the second driving motor 4205, and a bottom of the second driving motor 4205 includes a lower end cover 4206. In this embodiment, the lower end cover 4206 is mounted in the motor mounting groove 4101 of the cutting deck 41, and partly located in the mounting hole 4102. The second driving motor 4205 is mounted on the lower end cover 4206 and is fixedly connected by bolts, a first end of the output shaft 4201 is connected with the second driving motor 4205, a second end of the output shaft 4201 protrudes from a through hole in a middle of the lower end cover 4206, and extends into the cutter housing cavity 44 to be fixedly connected with the cutter assembly 43. The ventilation holes 4103 are arranged between the lower end cover 4206 and the cutting deck 41, so that air may enter the cutter housing cavity 44 of the cutting deck 41 along a surface of the cutting deck 41, which ensures that an air amount of grass discharge is not affected. At the same time, the heat dissipated by the second driving motor 4205 is absorbed into the cutter housing cavity 44 of the cutting deck 41 and discharged along with a rotation of the cutter assembly 20 to improve a heat dissipation effect of the second driving motor 4205.

Please refer to FIG. 11, FIG. 13, FIG. 16 through FIG. 18. In this embodiment, the lower end cap 4206 includes a main body part 4207, a protruding part 4208 and a spacer plate 4209. The main body part 4207 and the protruding part 4208 are fixedly connected and arranged coaxially, and the spacer plates 4209 are distributed around the protruding part 4208 at intervals, and are fixedly connected with the main body part 4207 and the protruding part 4208. The lower end cover 4206 has a ring-like structure, which means a through hole is arranged in a middle of the lower end cover 4206, and the output shaft 4201 protrudes from the through hole and connects with the cutter assembly 43. In this embodiment, the main body part 4207, the protruding part 4208 and the spacer plate 4209 are integrally formed.

Please refer to FIG. 11, FIG. 13, FIG. 16 through FIG. 18. In this embodiment, the protruding part 4208 is located in the mounting hole 4102, and a diameter of the protruding part 4208 is smaller than a diameter of the mounting hole 4102. The main body part 4207 is located in the motor mounting groove 4101, the main body part 4207 is fixedly connected with the second driving motor 4205 of the driving assembly 42, and a diameter of the main body part 4207 is larger than the diameter of the mounting hole 4102.

Please refer to FIG. 11, FIG. 13, FIG. 16 through FIG. 18. In this embodiment, the spacer plate 4209 includes a first spacer plate 42091 and a second spacer plate 42092. The first spacer plate 42091 and the second spacer plate 42092 separate the lower end cover 4206 from the cutting deck 41 and form a gap, the gap is the ventilation vent 4103. Specifically, the first spacer plate 42091 is arranged on an outer surface of the protruding part 4208, and an outer contour of the first spacer plate 42091 is circular and is matched with the mounting hole 4102 for mounting. Since the diameter of the protruding part 4208 is smaller than the diameter of the mounting hole 4102, and under an effect of the first spacer plate 42091, the protruding part 4208 and the cutting deck 41 are separated from each other to form the gap. The second spacer plate 42092 is located at a bottom of the main body part 4207, and is mounted in contact with the bottom of the motor mounting groove 4101 to form the gap between the cutting deck 41 and the main body part 4207. The gap between the main body part 4207 and the protruding part 4208 and the gap between the main body part 4207 and cutting deck 41 forms the ventilation vent 4103.

Please refer to FIG. 7, FIG. 8, FIG. 9 through FIG. 15. In this embodiment, a grass discharge opening 46 is arranged on the cutting deck 41, and is located on one side of the cutting deck 41, and a grass discharge cover 47 is mounted at the grass discharge opening 46. When the cutter assembly 43 starts to rotate, the air in the cutter housing cavity 44 of the cutting deck 41 is discharged from the grass discharge opening 46 on a right side of the cutting deck 41 along with a rotation of the cutter assembly 43. When a supplementary air around a lower edge of the cutting deck 41 is not as much as discharged air, a negative pressure state will be formed in the cutter housing cavity 44 of the cutting deck 41. If the air is not supplemented in time at this time, the cut grass will block the cutter housing cavity 44 of the cutting deck 41. In order not to reduce air volume of the grass discharge and enable the grass to be discharged more smoothly, a ventilation vent is arranged between the lower end cover 4206 of the driving assembly 42 and the cutting deck 41 so that the air may enter the cutter housing cavity 44 of the cutting deck 41 along the surface of the cutting deck 41, which ensures that the air volume of the grass discharge is not affected, so that the grass may be discharged smoothly. In addition, air flow will also speed up air flow around the second driving motor 4205. The heat dissipated by the second driving motor 4205 is absorbed into the cutter housing cavity 44 of the cutting deck 41, and is discharged along with the rotation of the cutter assembly 43, thereby improving the heat dissipation effect of the motor.

Figure 12:
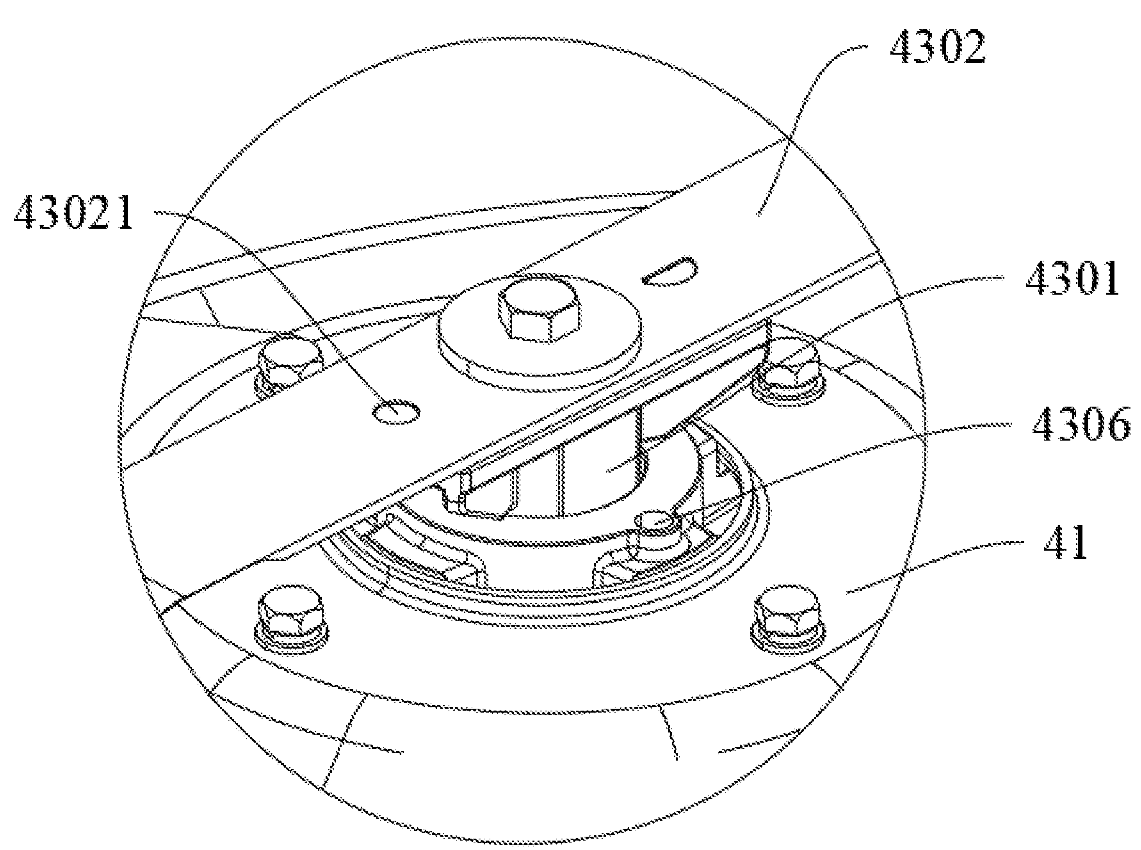
FIG. 12 is an enlarged schematic view at A in FIG. 8.
Figure 14:
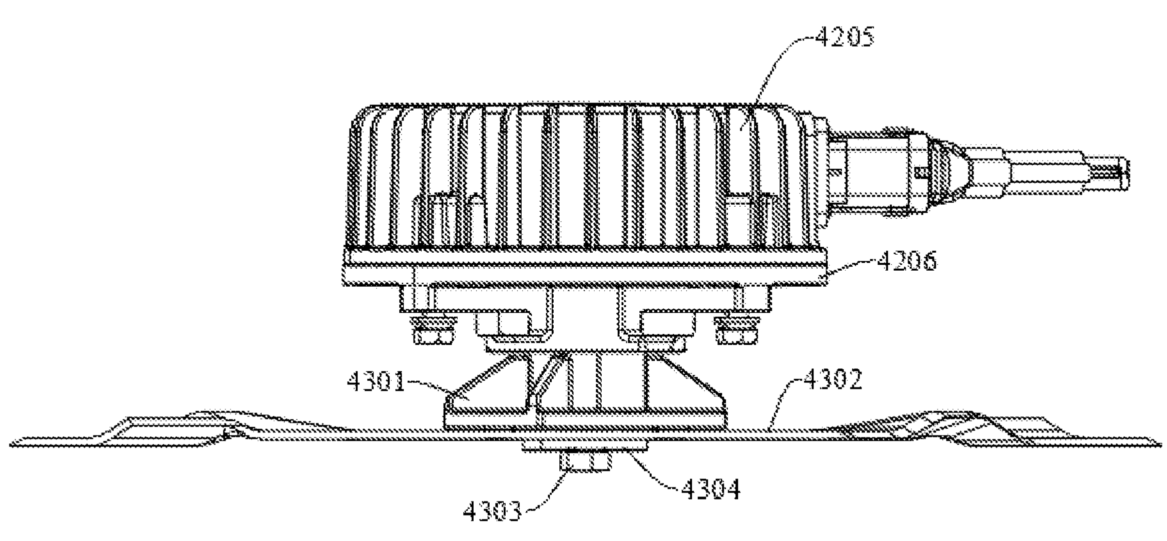
FIG. 14 is a schematic structural view of an assembly structure of the driving assembly and the cutter assembly in an embodiment of the disclosure.
Figure 15:
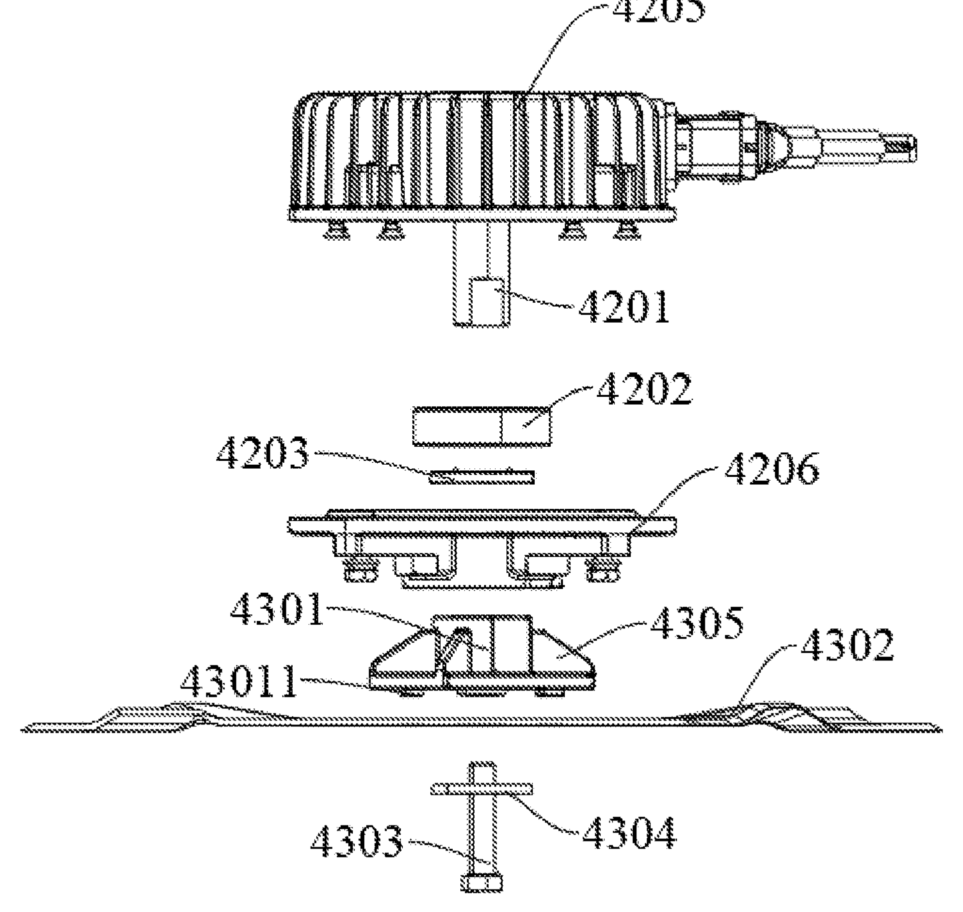
FIG. 15 is a schematic structural view of an exploded structure of the driving assembly and the cutter assembly in an embodiment of the disclosure.
Figure 16:
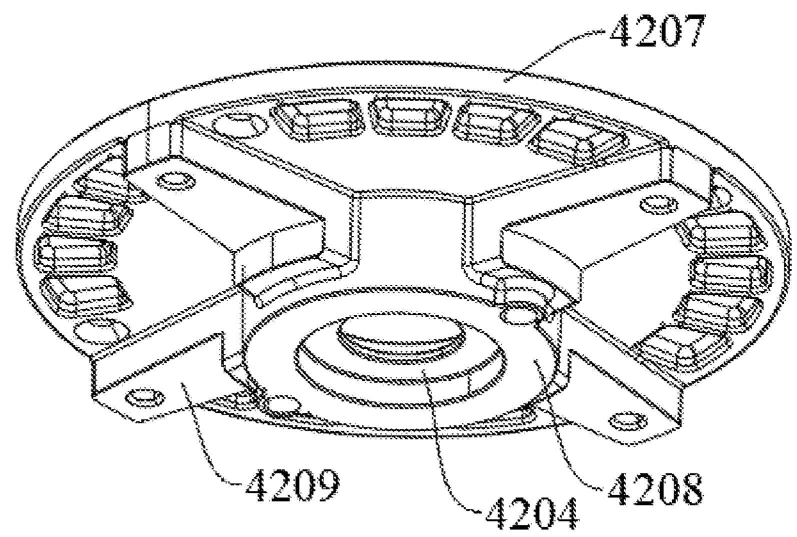
FIG. 16 is a schematic structural view of a lower end cover in an embodiment of the disclosure.
Figure 17:
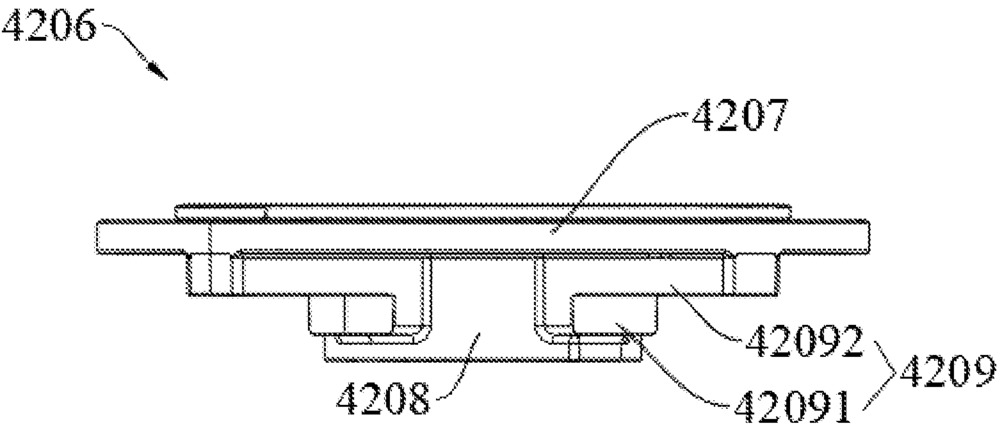
FIG. 17 is a front view of the lower end cover in an embodiment of the disclosure.
Figure 18:
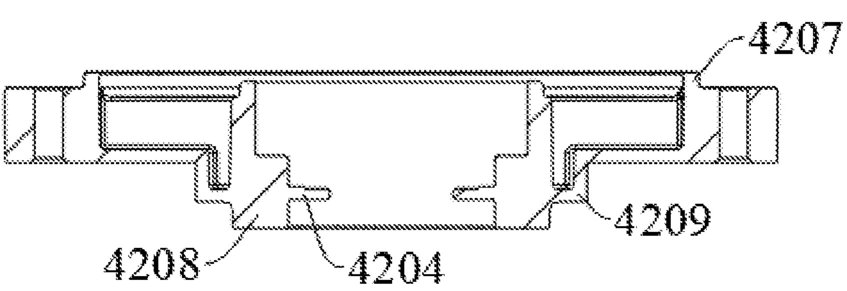
FIG. 18 is a schematic cross-sectional structural view of the lower end cover in an embodiment of the disclosure.
Figure 19:
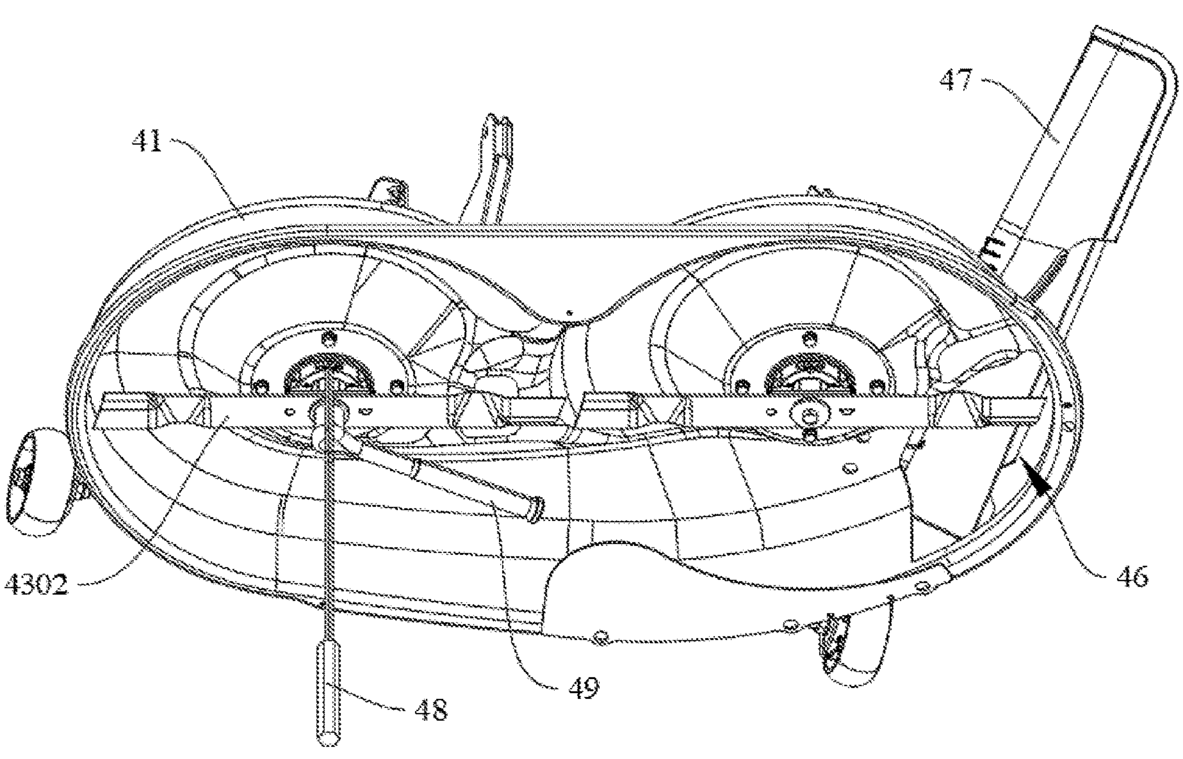
FIG. 19 is a schematic view of a disassembly and assembly of the cutter assembly in an embodiment of the disclosure.
Figure 20:
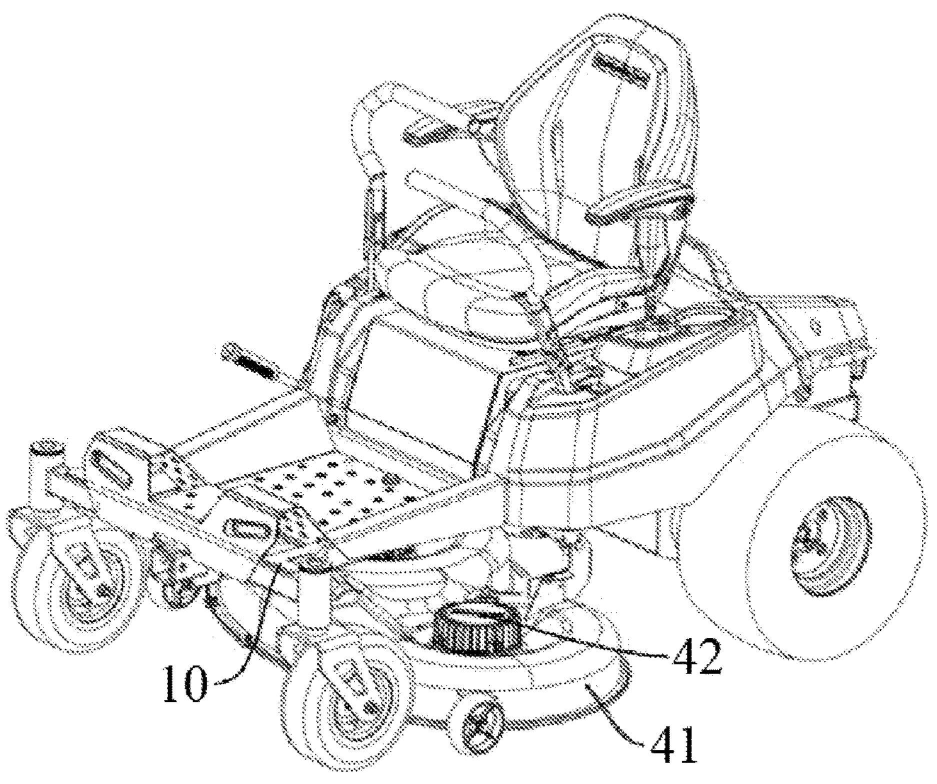
FIG. 20 is a schematic structural view of a mower in an embodiment of the disclosure.

Please refer to FIG. 12, FIG. 14, and FIG. 15. In this embodiment, the cutter assembly 43 includes a blade mounting base 4301 and a blade 4302. The blade 4302 is mounted on a bottom of the blade mounting base 4301, and a bolt 4303 passes through the blade 4302 and the blade mounting base 4301 in turn and is threadedly connected with the output shaft 4201, so that the blade 4302 and the blade mounting base 4301 are pressed and fixed on the output shaft 4201. And a disc spring 4304 is arranged between the bolt 4303 and the blade 4302. It should also be noted that, in this embodiment, a stop structure is arranged between the bottom of the blade mounting base 4301 and the blade 4302, which means that the bottom of the blade mounting base 4301 is provided with a special-shaped protruding structure 43011. The blade 4302 is provided with an opening 43021 matching the special-shaped protruding structure 43011 to prevent a rotation between the blade 4302 and the blade mounting base 4301, thus affecting mowing efficiency. In some other embodiments, the blade mounting base 4301 is fixedly connected with the output shaft 4201, and the blade 4302 is connected with the blade mounting base 4301 through bolts 4303 or other mounting methods are adopted.

Please refer to FIG. 12, FIG. 14, and FIG. 15. In addition, in this embodiment, a plurality of vanes 4305 are arranged on a side of the blade mounting base 4301 that is away from the blade 4302. When the cutter assembly 43 rotates, the vanes 4305 also rotate together, which can also dissipate heat for the second driving motor 4205, further improving the heat dissipation effect of the mower. In addition, in this embodiment, a double-cutter structure is adopted, which means that the mower is equipped with two cutter assemblies 43, and each cutter assembly is equipped with the driving assembly 42 respectively. And a distance between a tip of the blade 4302 and the ground is between 1 inch and 2 inches, so as to improve mowing effect. In addition, it should also be noted that, please refer to FIG. 12, in this embodiment, a bottom of the lower end cover 4206, which means a side close to the cutter assembly 43, is provided with a blade mounting hole 4306. A fixing tool 48 is utilized to be connected with blade mounting hole 4306, and be connected with the bolt 4303 by a dismounting tool 49 again, and the dismounting tool 49 is turned and enables the bolt 4303 to rotate together to disassemble or assemble. And due to an effect of the fixing tool 48 to limit a rotation of the blade 4302, the blade 4302 is prevented from rotating with a rotation of the dismounting tool 49, thereby realizing a loading and unloading or replacement of the cutter, which enables a dismounting process to be more labor-saving and convenient for loading, unloading and changing cutters.

Figure 11:
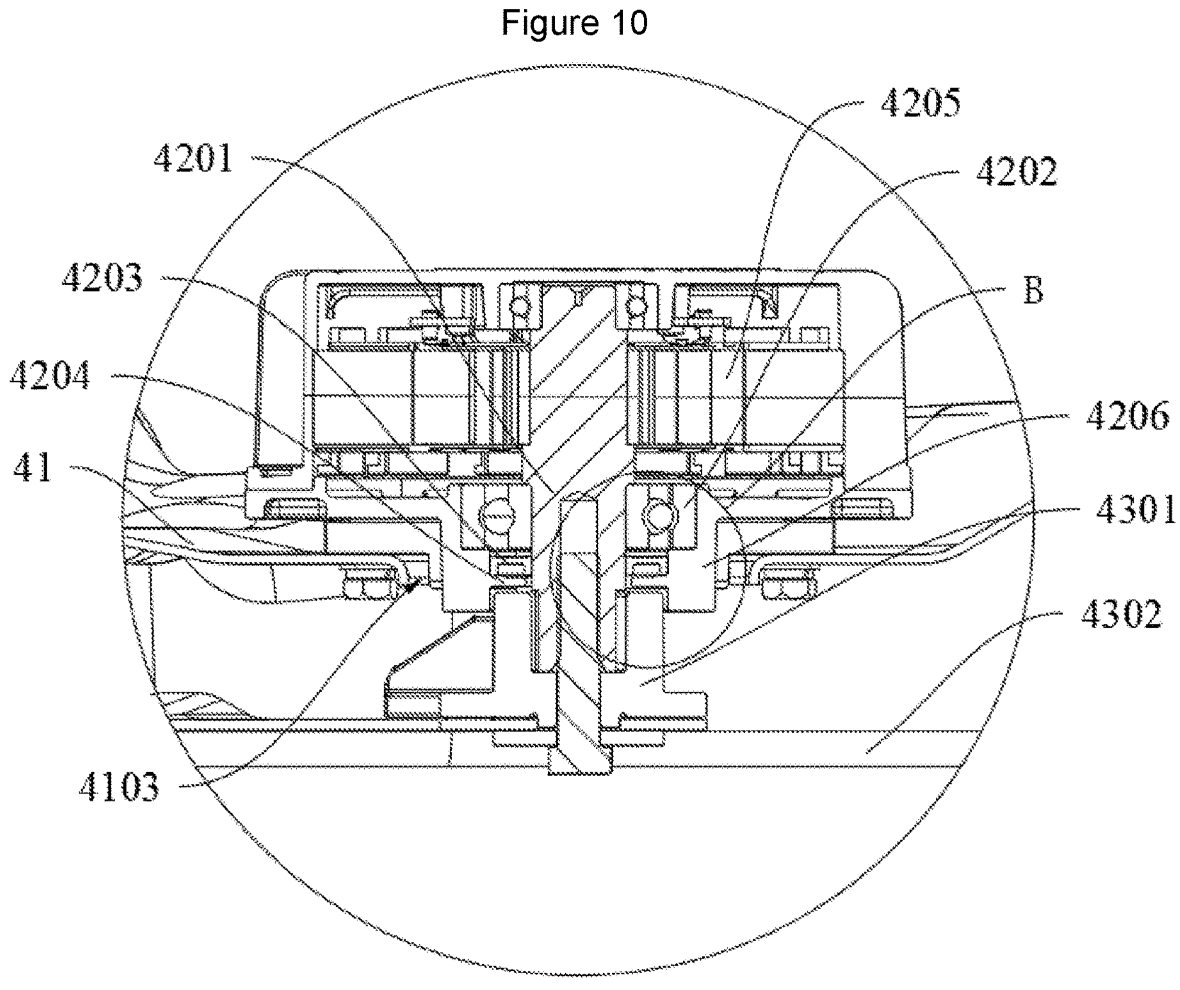
FIG. 11 is a schematic cross-sectional structural view of a driving assembly and a cutter assembly in an embodiment of the disclosure.
Figure 13:
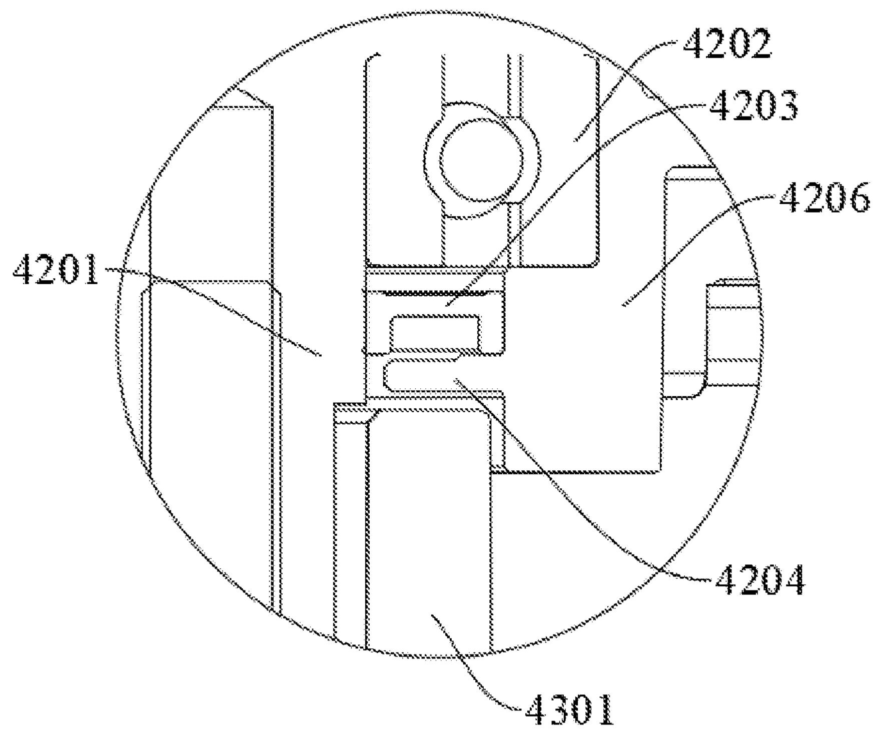
FIG. 13 is an enlarged schematic view at B in FIG. 11.

Please refer to FIG. 11 through FIG. 13. Since there is dew on the lawn during mowing, water mist will be formed when mowing under normal circumstances, which may easily seeps into the second driving motor 4205 of the mower, thereby reducing a duration life of the second driving motor 4205. In order to prevent water mist from entering the driving motor 4205, reducing water mist from entering the second drive motor 4205 may be realized through arranging an oil seal structure 4203 and a baffle plate 4204. Specifically, in this embodiment, the output shaft 4201 is sleeved with a bearing 4202 and the oil seal structure 4203, and both the bearing 4202 and the oil seal structure 4203 are located in a through hole of the lower end cover 4206. And the oil seal structure 4203 is located under the bearing 4202 to prevent water from entering the mower when mowing. In this embodiment, the baffle plate 213 and the lower end cover 4206 are integrally formed, which means that the baffle plate 213 is a part of the lower end cover 4206. Of course, in some other embodiments, the baffle plate 213 may also be arranged as a separate component, and connected with an inside of the through hole of the lower end cover 4206. In addition, the baffle plate 213 is further arranged in the through hole of the lower end cover 4206, and the baffle plate 213 is arranged around the output shaft 4201. The baffle plate 213 is located below the oil seal structure 4203, and there is a small gap between the baffle plate 213 and the output shaft 4201. And the blade mounting base 4301 is also fixedly connected with the output shaft 4201 and partially located in a through hole, and there is also a small gap between the blade mounting base 4301 and an inner surface of the through hole of the lower end cover 4206. When the mower is working, dew enters the through hole of the lower end cover 4206 through the gap between the blade mounting base 4301 and the lower end cover 4206, since there is no gap between the baffle plate 213 and the inside of the through hole, the dew can only flow out from an original path or flow towards the output shaft 4201, then move upward through the gap between the baffle plate 213 and the output shaft 4201, and only go back along original path again due to the effect of the oil seal structure 4203, which means that a mutual matching of the lower end cover 4206, the baffle plate 213, the output shaft 4201 and the oil seal structure 4203 enables the gap between them form a labyrinth circuit to further prevent water mist from entering the second driving motor 4205 and ensure the duration life of the mower.

In this embodiment, through arranging a ventilation vent between the driving assembly and the cutting deck, the air flow around the motor increases as the cutter rotates. The heat dissipated by the motor is absorbed into a cavity of the cutting deck through the ventilation vent, and discharged with the rotation of the cutter, thus improving the heat dissipation effect of the motor. In addition, vanes are also arranged on the blade mounting base, which may rotate together with the blades, and can also dissipate heat for the motor, further improving the heat dissipation effect of the mower of the disclosure. In addition, an arrangement of the ventilation vent also ensures that the air amount of the grass discharge of the mower is not affected, so as to achieve a purpose of smooth grass discharge.

In this embodiment, through arranging the oil seal structure and adding a flange in the lower end cover below the oil seal structure, a smaller gap is reserved between the output shaft of the second driving motor and the flange in the lower end cover, then a small gap between the blade mounting base and the flange of the lower end cover is kept to form the labyrinth circuit, coupled with a blocking of the oil seal structure, an entry of water vapor into an interior of the second driving motor is minimized, which ensures the duration life of the motor of the mower.

Figure 21:
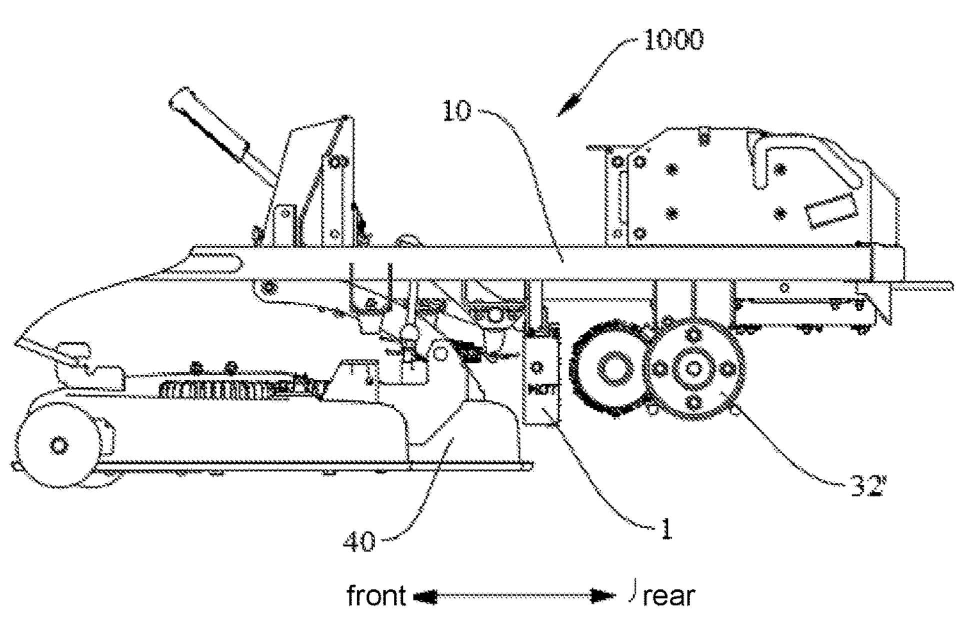
FIG. 21 is a front view of the mower with a resistor assembly of the disclosure.
Figure 22:
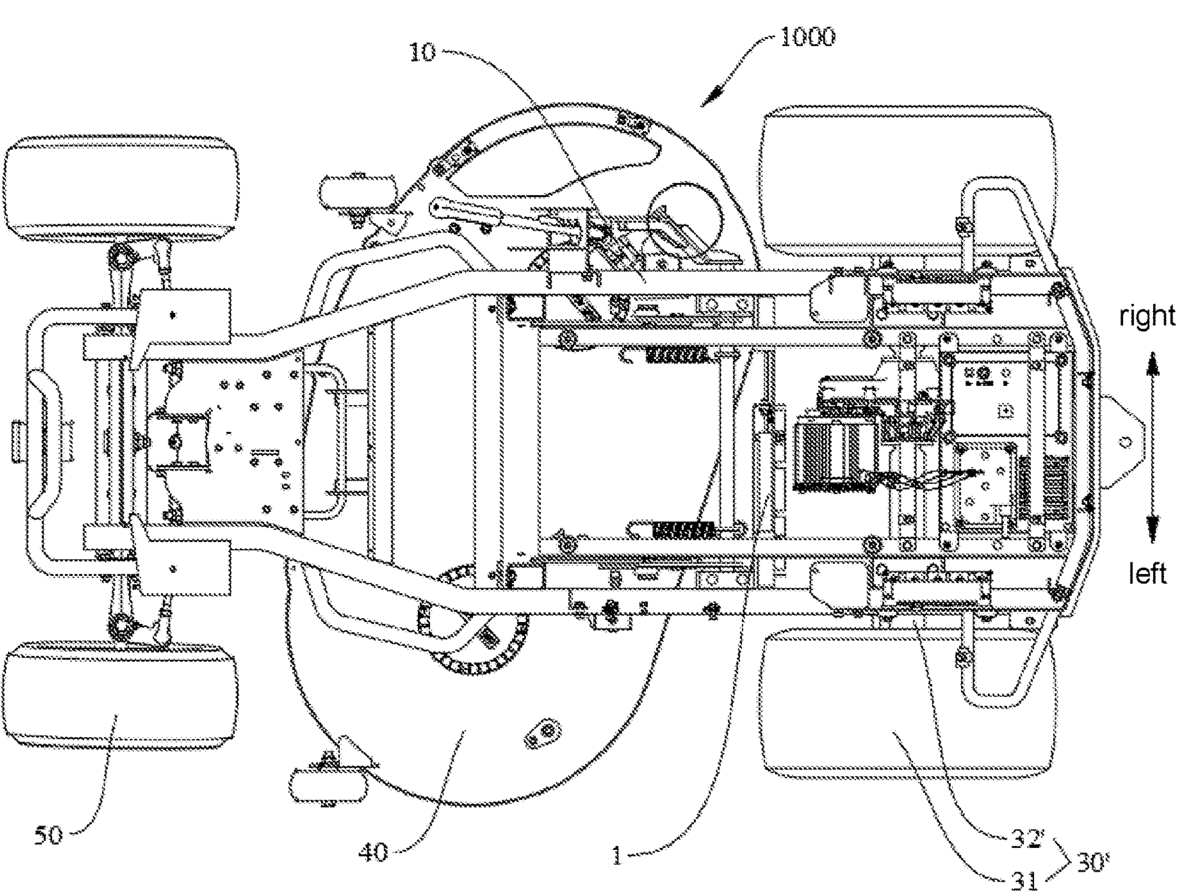
FIG. 22 is a top view of the mower with the resistor assembly of the disclosure.

In order to solve a problem that an anti-reverse charging resistor 102 of an anti-reverse charging module and the control module in the conventional mower are integrated in a same closed container, which may easily cause damage to components of the control module and burns due to unreasonable arrangement, please refer to FIG. 21 and FIG. 22. The disclosure further provides a mower 1000 with a resistor assembly 1. Of course, an arrangement of the resistor assembly 1 of the disclosure may also be applied to riding-type washing machines, riding-type vacuum cleaners or other garden tools.

For a convenience of description, a length direction of the mower is defined as a front-to-back direction (as shown in FIG. 21), and a width direction of the mower is defined as a left-to-right direction (as shown in FIG. 22).

Please refer to FIG. 21 and FIG. 22. In this embodiment, the front wheel assembly 50 may be used as the driven wheel assembly, which includes the front wheel rotatably connected with the bottom front end of the vehicle frame 10 and the steering mechanism, and the steering mechanism is used to control the steering of the front wheels. The rear wheel assembly 30' may be used as the driving wheel assembly, which includes a driving axle 32' mounted on a rear end of the vehicle frame 10 and the rear wheel 31 connected with the driving axle 32'.

Please refer to FIG. 21 and FIG. 22. The mowing assembly 40 is mounted on the bottom of the vehicle frame 10 and located between the front wheel assembly 50 and the rear wheel assembly 30'. The electric control box is connected with the mowing assembly 40 and the rear wheel assembly 30' of the walking assembly, and the electric control box is used to control a working state of the mowing assembly 40 and the walking assembly.

Figure 23:
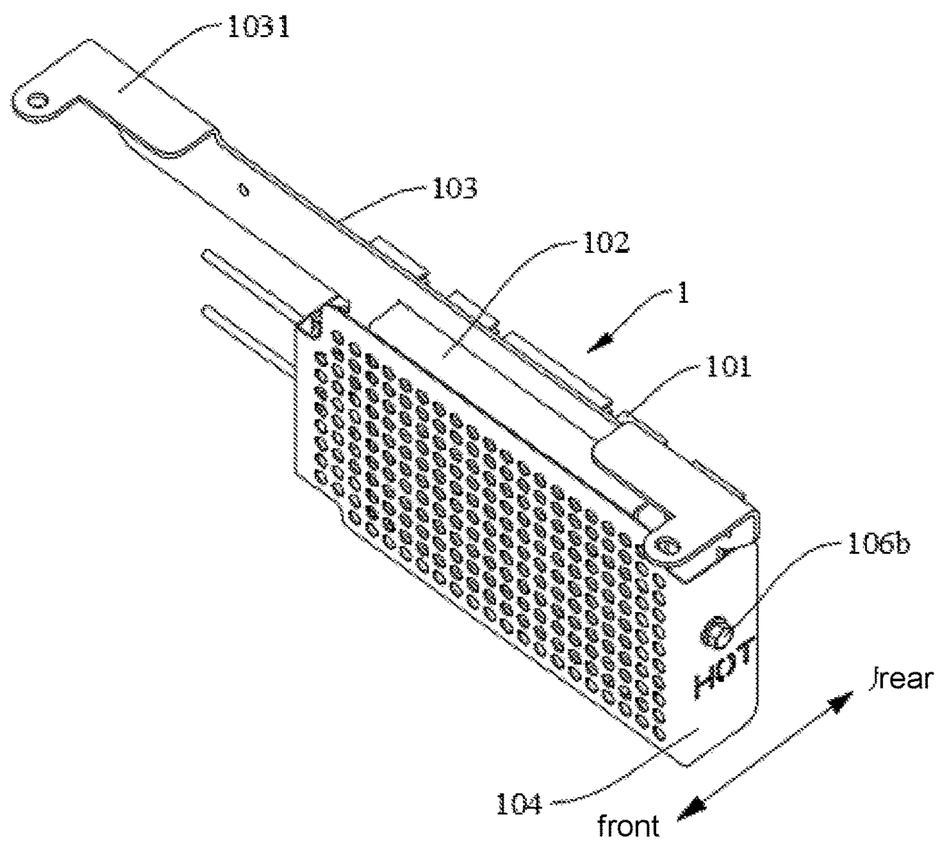
FIG. 23 is a schematic structural view of the resistor assembly of the disclosure.
Figure 24:
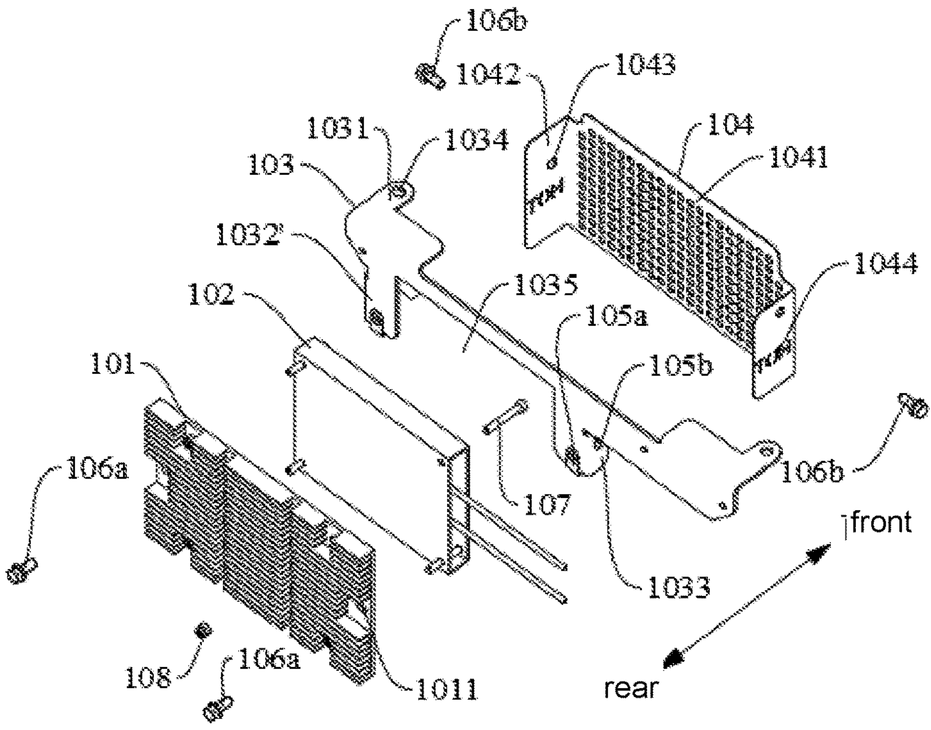
FIG. 24 is an exploded view of the resistor assembly of the disclosure.

FIG. 23 is a schematic structural view of the resistor assembly 1. FIG. 24 is an exploded view of the resistor assembly 1.

Please refer to FIG. 21 through FIG. 24. The resistor assembly 1 is mounted and fixed on the bottom of the vehicle frame 10, and the resistor assembly 1 includes the reverse charging resistor 102, a heat dissipation component 101, a mounting bracket 103 and a mesh plate 104. The heat dissipation component 101 is fixedly mounted on one side of the mounting bracket 103, and the reverse charging resistor 102 is mounted on a side of the heat dissipation component 101 facing the mounting bracket 103. The mesh plate 104 is mounted on a side of the mounting bracket 103 away from the heat dissipation component 101, the reverse charging resistor 102 is located between the heat dissipation component 101 and the mesh plate 104 and heat dissipation holes of the mesh plate 104 expose a surface of the reverse charging resistor 102 away from the heat dissipation component 101.

A structure of the resistor assembly 1 will be described below by using an actual position where the resistor assembly 1 is mounted on the mower 1000.

Please refer to FIG. 23 and FIG. 24. The heat dissipation component 101 may be a rectangular plate structure, and in order to increase a heat dissipation area, heat dissipation ribs are arranged on a back of the heat dissipation component 101. Of course, a shape of the heat dissipation component 101 may be flexibly adjusted according to actual needs, for example, it may also be a circular plate structure, an oval plate structure, a trapezoidal plate structure, and the like.

Please refer to FIG. 23 and FIG. 24. The heat dissipation component 101 is fixedly mounted on a rear side of the reverse charging resistor 102. In order to dissipate heat generated by the reverse charging resistor 102 into the air in time, thermal conductive glue is further filled between the reverse charging resistor 102 and the heat dissipation component 101 to realize a bonding of the two. As an example, the anti-charging resistor 102 and the heat dissipation component 101 may be fixed by hexagon socket bolts 107 and locknuts 108.

Please refer to FIG. 23 and FIG. 24. The mounting bracket 103 is arranged on a side of the heat dissipation component 101 that is not provided with heat dissipation ribs. The mounting bracket 103 includes a first mounting part 1031, a second mounting part 1032 and a third mounting part 1033.

Please refer to FIG. 23 and FIG. 24. The first mounting part 1031 is arranged on both ends of a top of the mounting bracket 103, the first mounting part 1031 is a flat plate arranged horizontally, and the first mounting part 1031 is used for mounting the resistor assembly 1 on the vehicle frame 10. Specifically, the first mounting part 1031 is provided with a second mounting hole 1034, and two bolts of a height adjustment mechanism of the mowing assembly 40 may be used to fix the resistor assembly 1 on an intermediate position between the driving axle 32' and the cutting deck of the mowing assembly 40.

Please refer to FIG. 23 and FIG. 24. The second mounting part 1032 is arranged on two ends of a bottom of the mounting bracket 103, and the second mounting part 1032 is a strip plate extending in a vertical direction. The second mounting part 1032 is arranged parallel to the heat dissipation component 101, and a first reed nut **105*a* is arranged on the second mounting part 1032. Through holes are arranged at left and right ends of the heat dissipation component 101. As the first mounting hole 1011, a first combination bolt 106*a* passes through the first mounting hole 1011 and the first reed nut 105*a* to fix the heat dissipation component 101 on the second mounting part 1032. It should be noted that, the first combination bolt 106*a*** refers to a three-unit assembly consisting of an outer hexagonal bolt coupled with a spring washer and a flat washer combined with a rolling thread.

Please refer to FIG. 23 and FIG. 24. The third mounting part 1033 is arranged at both ends of the bottom of the mounting bracket 103 and is located at an end of the second mounting part 1032 away from a notch 1035. The third mounting part 1033 is a strip plate extending forward from the end of the second mounting part 1032 away from the notch 1035. The third mounting part 1033 is arranged parallel to a fourth mounting part 1042 of the mesh plate 104, and a second reed nut **105*b* is arranged on the third mounting part 1033**.

Please refer to FIG. 23 and FIG. 24. The notch 1035 is opened on the mounting bracket 103, and the notch 1035 is located between the two second mounting parts 1032. When the heat dissipation component 101 is fixed on the mounting bracket 103, an end of the reverse charging resistor 102 facing the mesh plate 104 passes through the notch 1035, so that the air flow directly blows on the reverse charging resistor 102 after passing through the heat dissipation holes of the mesh plate 104 to realize a rapid cooling. Of course, the notch 1035 may also be replaced by a hole.

Please refer to FIG. 23 and FIG. 24. The mesh plate 104 is arranged on one side of the resistor assembly 1 facing a forward direction of the mower, and the mesh plate 104 covers a front side and both left and right sides of the reverse charging resistor 102. The mesh plate 104 includes a main body part 1041 and two fourth mounting parts 1042. The two fourth mounting parts 1042 are side plates extending from left and right ends of the main body part 1041 to a rear side of the main body part 1041 (which means a side of the main body part 1041 facing the heat dissipation component 101). A third mounting hole 1043 is opened on the fourth mounting part 1042, and a second combination bolt **106*b* passes through the third mounting hole 1043 and the second reed nut 105*b* to fix the mesh plate 104 on the third mounting part 1033. It should be noted that, the second combination bolt 106*b*** refers to a three-unit assembly consisting of an outer hexagonal bolt coupled with a spring washer and a flat washer combined with a rolling thread.

Please refer to FIG. 23 and FIG. 24. The main body part 1041 of the mesh plate 104 is provided with a number of heat dissipation holes at intervals. The heat dissipation holes may be, for example, round holes, strip holes, cross holes, Y-shaped holes, triangular holes or other. A size of the heat dissipation hole needs to meet requirements of safety regulations, which may avoid a risk of being burned through fingers directly touching the reverse charging resistor 102. As an example, in FIG. 23 and FIG. 24, the heat dissipation hole is a circular hole, and a diameter of the circular hole is between 7 mm and 9 mm, such as 8 mm, and the diameter meets the requirements of safety regulations.

Please refer to FIG. 23 and FIG. 24. an outer surface of the fourth mounting part 1042 of the mesh plate 104 is provided with words "HOT" (or "be careful of burns" or others) as an anti-scalding warning sign 1044, which reminds that a personnel who need to disassemble and maintain the resistor assembly 1 not to touch this part with hands just after the machine finishes working, and wait for a period of time until heat of the reverse charging resistor 102 dissipates naturally before disassembling and maintaining.

An arrangement of the mesh plate 104, in addition to avoiding a risk of being burned by direct contact with the reverse charging resistor 102 with fingers, also has the following effects: when the mower is walking, the air flow speeds up after passing through the heat dissipation holes, which means that the mesh plate 104 may accelerate an air circulation on a surface of the reverse charging resistor 102 to quickly help the reverse charging resistor 102 to cool down; the mesh plate 104 may prevent debris such as broken grass and leaves from falling on the reverse charging resistor 102, prevent these debris from igniting due to excessive temperature, and improve a safety of the mower; the reverse charging resistor 102 is placed independently away from the electrical components of the control module, so that the electrical components will not be damaged by high temperature.

Please refer to FIG. 21 and FIG. 22. The resistor assembly 1 is fixedly mounted on the bottom of the vehicle frame 10 of the mower, so that the reverse charging resistor 102 is arranged separately from the control module, which may prevent the high temperature of the reverse charging resistor 102 from damaging the electrical components of the control module during mowing and prolong a duration life of the control module.

In order to reduce structural changes to the conventional mower, a mounting point on the mower may be borrowed for mounting and fixing. For example, two bolts of the height adjustment mechanism of the mowing assembly 40 may be used to fix the resistor assembly 1 in a middle position between the drive axle 32' of the rear wheel assembly 30' and the cutting deck of the mowing assembly 40, so that all surfaces of the whole resistor assembly 1 are completely exposed to the air, which enables heat exchange with the air to a greatest extent. At the same time, the mesh plate 104 on a front side of the reverse charging resistor 102 may also block the debris such as grass and leaves splashed from the cutting deck, which prevents debris such as grass and leaves from falling on a surface of the resistor and being dried and ignited to cause safety accidents.

Please refer to FIG. 22. The resistor assembly 1 is mounted in the middle position between the drive axle 32' and the cutting deck of the mowing assembly 40, except that the reverse charging resistor 102 has good heat dissipation, a width of the cutting deck of the mowing assembly 40 and a shielding of the rear wheel 31 of the rear wheel assembly 30' may also be used to prevents the human body from directly contacting the reverse charging resistor 102, so as to avoid being scalded by a high temperature of the reverse charging resistor 102.

Figure 25:
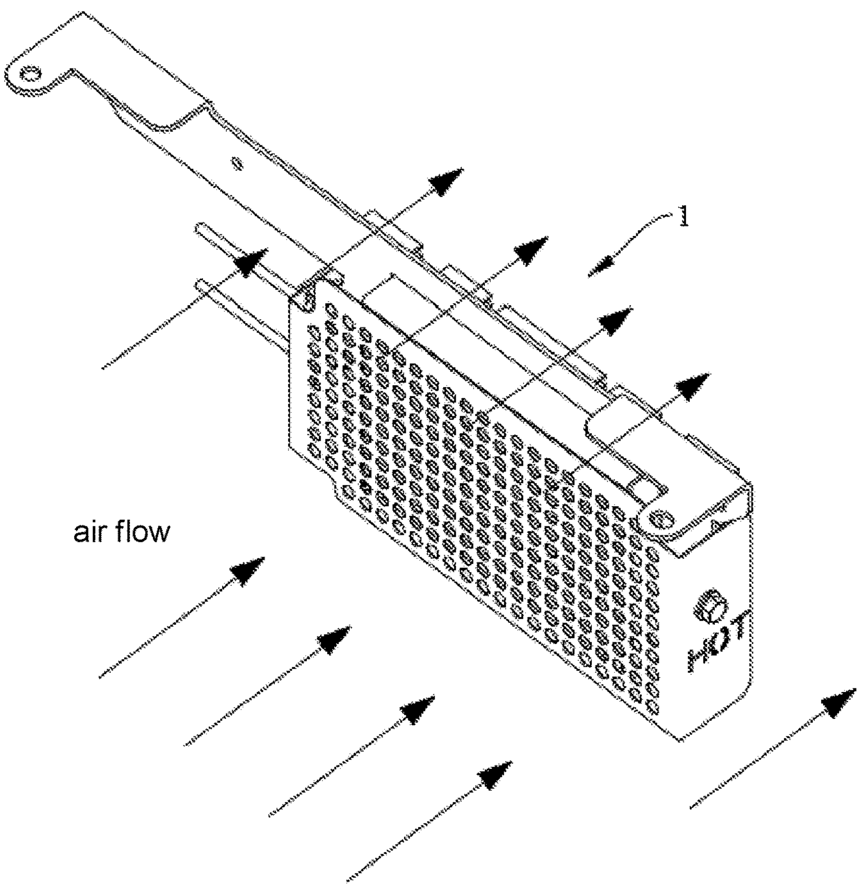
FIG. 25 is a schematic view of a relative movement of flowing air and the resistor assembly.

FIG. 25 is a schematic view of a relative movement of the air flow and the resistor assembly 1. When the mower is running, the air flow will directly pass through the holes on the mesh plate 104 to accelerate and impact on the surface of the reverse charging resistor 102 to take away the heat generated by the reverse charging resistor 102.

Figure 26:
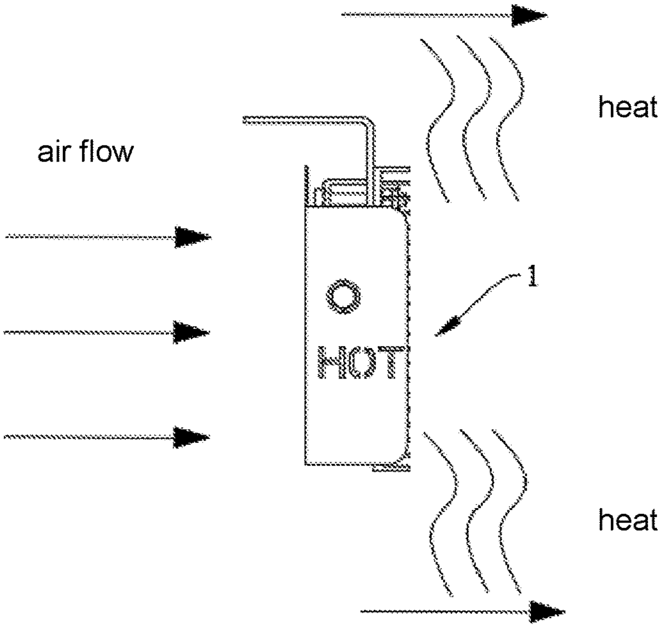
FIG. 26 is a schematic view of a heat dissipation of the resistor assembly under an action of flowing air.
Figure 27:
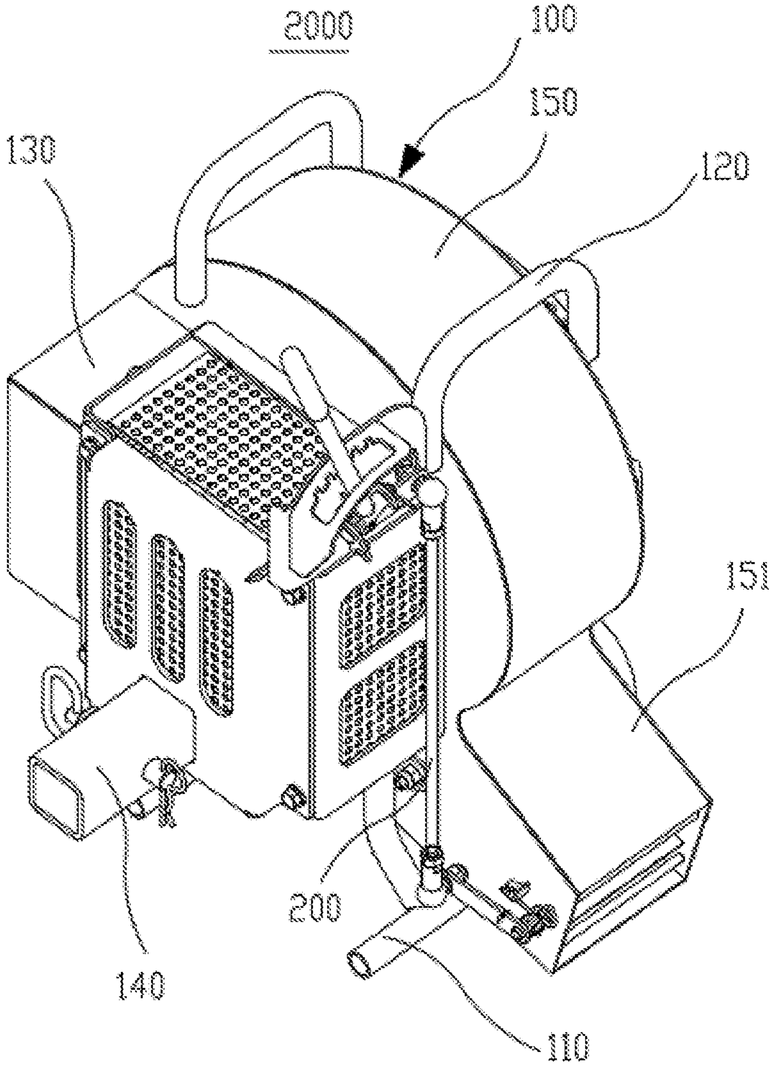
FIG. 27 is a perspective schematic structural view of a blower with a blowing direction adjustment mechanism of the disclosure.

FIG. 26 is a schematic view of a heat dissipation of the resistor assembly 1 under an action of flowing air flow. As the air flow velocity around the resistor assembly 1 increases, while the flow velocity of the heat dissipation component 101 remains unchanged, a negative pressure is formed on a rear side of the heat dissipation component 101 (the side where the heat dissipation ribs are arranged), so that the heat on the heat dissipation component 101 quickly dissipate to surroundings.

In the resistor assembly of the disclosure, the reverse charging resistor is mounted independently from the anti-reverse charging module, so that the reverse charging resistance and the control module are independently arranged, so as to protect the control module from being damaged by the high temperature of the reverse charging resistor and prolong the duration life of the control module. The resistor assembly of the disclosure has a simple structure and is convenient for mounting and replacement.

Please refer to FIG. 27 through FIG. 42. In order to solve a technical problem of inconvenient operation and cumbersome process of adjusting a blowing direction of the mower 1000 with a blower 2000, the disclosure realizes an adjustment of the blowing direction of the blower 2000 through introducing a multi-link designed blowing direction adjustment mechanism 200 on the blower 2000. Please refer to FIG. 42, the blower 200 is attached to a front end of the mower 1000.

Please refer to FIG. 27 through FIG. 33. In this embodiment, the blower 2000 includes a blower assembly 100 and a blowing direction adjustment mechanism 200 mounted on the blower assembly 100. The blower assembly 100 includes a blower frame 150, a motor assembly (not shown) and a fan assembly (not shown) housed in the blower frame 150, a handle 120 arranged above the blower frame 150, a base 110 for supporting the whole blower assembly 100 arranged below the blower frame 150, a second connecting component 140 arranged on one side of the blower frame 150 for connecting with the mower 1000 and a controller 130 arranged on the blower frame 150. The blower frame 150 includes an air outlet 151, and the air outlet 151 is arranged on one side of the blower frame 150. The second connecting component 140 is arranged on a side of the blower frame 150 close to the mower 1000 (see FIG. 42), and the blower 2000 may be mounted on the front end of the mower 1000 through the second connecting component 140.

Please refer to FIG. 27 through FIG. 33. In this embodiment, the blowing direction adjustment mechanism 200 includes a gear base 220, a rotating swing arm 230, an adjustment handle 210, a connecting rod assembly 240, an adjustment plate rotating shaft 250 and an air direction adjustment plate 260. The gear base 220 is mounted on the blower frame 150, and the rotating swing arm 230 is rotatably mounted on the gear base 220. One end of the adjustment handle 210 is pivotally arranged on a first end of the rotating swing arm 230, and a first end of the connecting rod assembly 240 is connected with a second end of the rotating swing arm 230. The adjustment plate rotating shaft 250 passes through the air outlet 151 of the blower frame 150, and one end of the adjustment plate rotating shaft 250 is connected with a second end of the connecting rod assembly 240 through a transmission component 251. The air direction adjustment plate 260 is located in the air outlet 151 of the blower frame 150, the air direction adjustment plate 260 is fixedly connected with the adjustment plate rotating shaft 250, and the air direction adjustment plate 260 may rotate synchronously with the adjustment plate rotating shaft 250.

Figure 28:
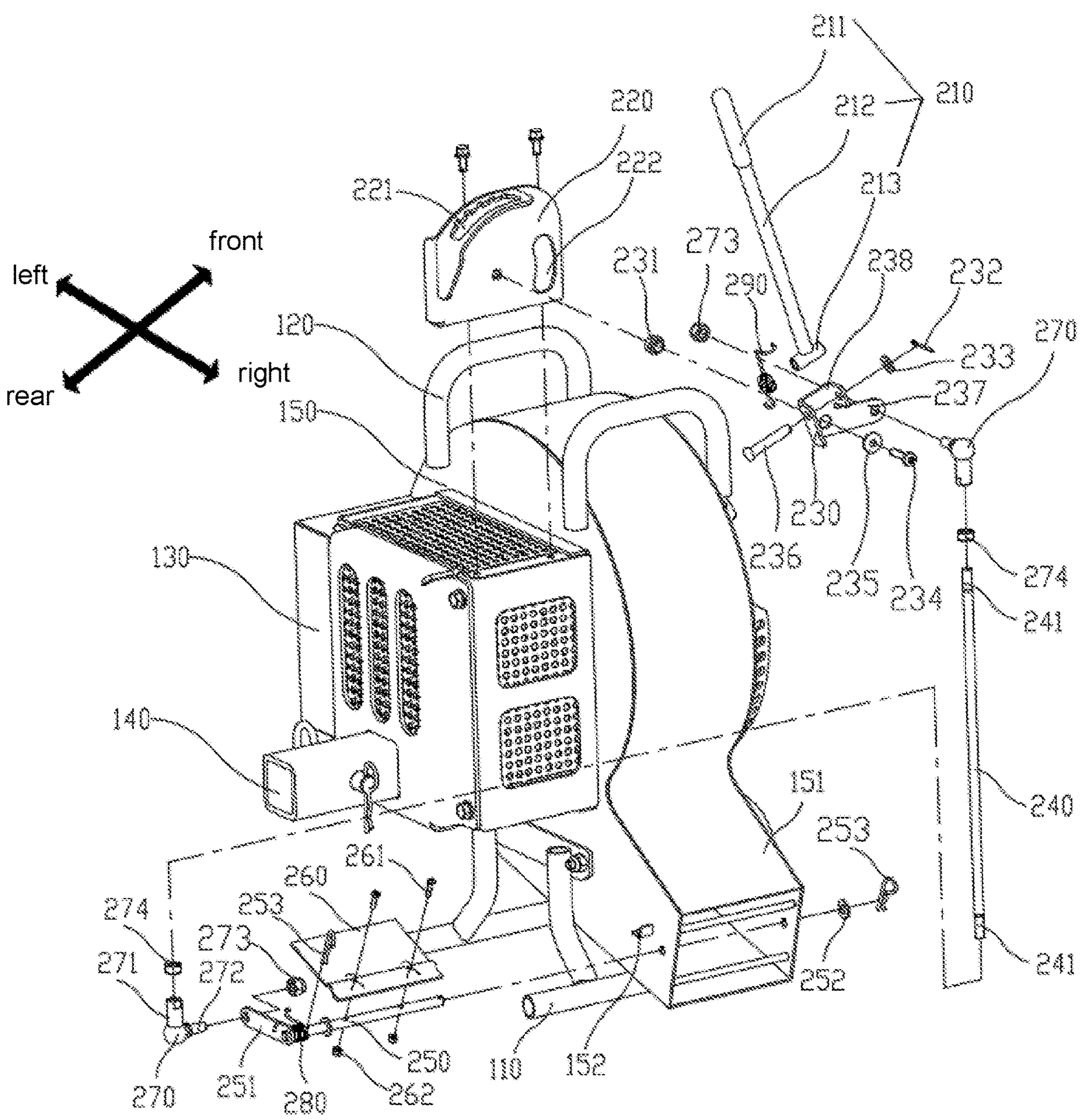
FIG. 28 is a schematic exploded view of the blower with the blowing direction adjustment mechanism of the disclosure.

For ease of understanding and illustration, please refer to FIG. 28, in the disclosure, we define a direction parallel to a pivot axis of the adjustment handle 210 as a front-to-rear direction, and define a direction of a rotation axis of the parallel rotating swing arm 230 as a left-to-right direction.

The blowing direction adjustment mechanism 200 of the disclosure swings back and forth through the adjustment handle 210 to drive the rotating swing arm 230 to rotate around a rotating shaft (a pivot pin 231). The rotating swing arm 230 drives the connecting rod assembly 240 to move up and down, and the connecting rod assembly 240 drives the adjustment plate rotating shaft 250 to make a rotary motion. The adjustment plate rotating shaft 250 drives the air direction adjusting plate 260 to swing, thereby changing a size of the air outlet 151 and an air direction of the air outlet.

Please refer to FIG. 27 through FIG. 33. In this embodiment, a bottom of the gear base 220 may be mounted and fixed on a top of the blower frame 150 of the blower 2000 close to the mower 1000 by bolts or welding, for example. In this way, the operator leans forward on a driving position of the mower 1000, and the operator's arm can adjust an angle of the air direction by the adjustment handle 210 without getting off the mower 1000 to adjust the air direction at the air outlet 151, which is simple and convenient, and saves manpower and time. It should be understood that the gear base 220 may also be arranged at other suitable positions of the blower frame 150. As long as it can be ensured that when the operator leans forward in the driving position of the mower 1000, the operator's arm can reach the adjustment handle 210.

Please refer to FIG. 27 through FIG. 33. In this embodiment, a top of the gear base 220 is provided with a long strip-shaped sliding groove 221 extending generally along the front-to-rear direction, and the long strip-shaped sliding groove 221 limits a range of motion of the adjustment handle 210. On a left side wall (or right side wall) of the long strip-shaped sliding groove 221, a plurality of ratchet gear grooves 223 for a limitation of the adjustment handle 210 are arranged at intervals. When the adjustment handle 210 is adjusted to a suitable angle, it engages with the corresponding ratchet gear groove 223, and a number of each ratchet gear groove 223 corresponds to a number of gear positions. Each ratchet gear groove 223 can realize an adjustment of an angle, and a situation including five ratchet gear grooves 223 is shown in FIG. 27 through FIG. 33.

Please refer to FIG. 27 through FIG. 33. In this embodiment, the adjustment handle 210 includes a holding part 212 and a pivot mounting part 213. The holding part 212 is a rod-shaped structure, and an upper end of the holding part 212 is covered with a handle cover 211. The handle cover 211 is arranged to be convenient for users to hold. A ratchet 214 matching the ratchet gear groove 223 is arranged on a side wall of the holding part 212 close to the ratchet gear groove 223. After the adjustment handle 210 is adjusted to a corresponding gear position, the ratchet 214 of the adjustment handle 210 may be engaged in the corresponding ratchet gear groove 223 under an action of the second torsion spring 280.

The pivot mounting part 213 is a tubular structure, a sidewall of the pivot mounting part 213 is mounted on a lower end of the holding part 212, and an axial direction of the pivot mounting part 213 is perpendicular to an axial direction of the holding part 212. The pivot mounting part 213 is pivotally mounted on a handle mounting part 238 of the rotating swing arm 230 through a pin shaft 236. One end of the pin shaft 236 passes through a side wall of a first end of a top of the rotating swing arm 230 and a central hole of the pivot mounting part 213 in turn, then passes through a side wall of a second end of the handle mounting part 238 of the rotating swing arm 230, and is limited by a first R pin 232 and a first washer 233. Certainly, the axial direction of the pivot mounting part 213 and the axial direction of the holding part 212 may also be in a non-perpendicular structure.

Please refer to FIG. 27 through FIG. 33. In this embodiment, a first torsion spring 290 is sleeved and arranged on the pivot mounting part 213 of the adjustment handle 210. A first end of the first torsion spring 290 is fixed on the holding part 212 of the adjustment handle 210, and a second end of the first torsion spring 290 is fixed on the rotating swing arm 230. A force of the first torsion spring 290 acting on the adjustment handle 210 enables the adjustment handle 210 to always move toward a direction of the ratchet gear groove 223 of the gear base 220 (a left side in FIG. 28).

Please refer to FIG. 27 through FIG. 33. In this embodiment, the rotating swing arm 230 is generally L-shaped, and the rotating swing arm 230 includes the handle mounting part 238 and a connecting rod mounting part 237 connected with each other. The rotating swing arm 230 is mounted on the gear base 220 through the pivot pin 231, and the rotating swing arm 230 may rotate around the pin shaft 231. The pivot pin 231 is fixedly mounted on the gear base 220 through a first bolt 234 and a second washer 235, and a pivot hole of the rotating swing arm 230 is sleeved on the pivot pin 231.

Please refer to FIG. 27 through FIG. 33. In this embodiment, an upper end of the connecting rod assembly 240 is fixed on an end of the connecting rod mounting part 237 away from the pivot pin 231, and a lower end of the connecting rod assembly 240 is connected with the adjustment plate rotating shaft 250 through the transmission component 251.

In a specific example, two joint bearings 270 are mounted on both ends of the connecting rod assembly 240, the joint bearing 270 includes a joint vertical section 271 and a joint horizontal section 272 connected with each other, the joint vertical section 271 is provided with an inner threaded hole, and the joint horizontal section 272 is provided with an external thread. Both ends of the connecting rod assembly 240 are provided with threaded sections 241 that match the inner threaded holes of the joint vertical section 271, and both ends of the connecting rod assembly 240 are respectively screwed into the inner threaded holes of the joint vertical sections 271 of the two joint bearings 270 through the threaded sections 241 and fastened by a third nut 274.

For ease of description, the joint bearing 270 located at the upper end of the connecting rod assembly 240 is defined as an upper joint bearing, and the joint bearing 270 located at the lower end of the connecting rod assembly 240 is defined as an lower joint bearing. The joint horizontal section 272 of the upper joint bearing passes through an end of the connecting rod mounting part 237 away from the pivot pin 231, and is fixed by a second nut 273. The joint horizontal section 272 of the lower joint bearing passes through one end of the transmission component 251 and is fixed by the second nut 273. Of course, other reasonable ways of connecting the joint bearing 270 with the connecting rod assembly 240, the rotating swing arm 230 and the transmission component 251 may also be adopted. It should be noted that, in order to enable the blowing direction adjustment mechanism 200 to be compact, an arc-shaped hole 222 may be arranged on one side of the gear base 220. The arc-shaped hole 222 is used for a movement of the second nut 273 connected with the joint horizontal section 272 of the upper joint bearing when the rotating swing arm 230 swings under a drive of the adjustment handle 210, in this way, the connecting rod assembly 240 may be brought closer to the rotating swing arm 230.

Please refer to FIG. 27 through FIG. 33. In this embodiment, the adjustment plate rotating shaft 250 passes through a tube wall of the air outlet 151 of the blower frame 150. Both ends of the adjustment plate rotating shaft 250 may be limited on both sides of the air outlet 151 by a second R pin 253 and a third washer 252, and the adjustment plate rotating shaft 250 is located in a middle of the air outlet 151. One end of the adjustment plate rotating shaft 250 is fixedly connected with one end of the transmission component 251, so that the adjustment plate rotating shaft 250 and the transmission component 251 may rotate synchronously. The air direction adjustment plate 260 may be fixed on a shaft section of the adjustment plate rotating shaft 250 inside the air outlet 151 through a second bolt 261 and a first nut 262, which means that the air direction adjustment plate 260 is located inside the air outlet 151.

Please refer to FIG. 27 through FIG. 33. In this embodiment, the second torsion spring 280 is sleeved on the end of the adjustment plate rotating shaft 250 close to the transmission component 251, and is located between the transmission component 251 and the second R pin 253. A first end of the second torsion spring 280 is fixed on the transmission component 251, and a second end of the second torsion spring 280 is fixed on a fixing part 152 of the blower frame 150. The fixing part 152 may be arranged on the tube wall of the air outlet 151, for example. The second torsion spring 280 will give a downward force to the adjustment plate rotating shaft 250. In a natural state, the adjustment plate rotating shaft 250 will have a turning tendency under an action of the second torsion spring 280, and this tendency will eliminate an assembly gap between the connecting rods. At the same time, the connecting rod assembly 240 will drive the rotating swing arm 230 to rotate clockwise, and finally the rotating swing arm 230 will drive the adjustment handle 210 to move forward, so that the ratchet 214 of the adjustment handle 210 is stuck in the ratchet gear groove 223 of the gear base 220 (please refer to FIG. 30 through FIG. 32).

Figure 32:
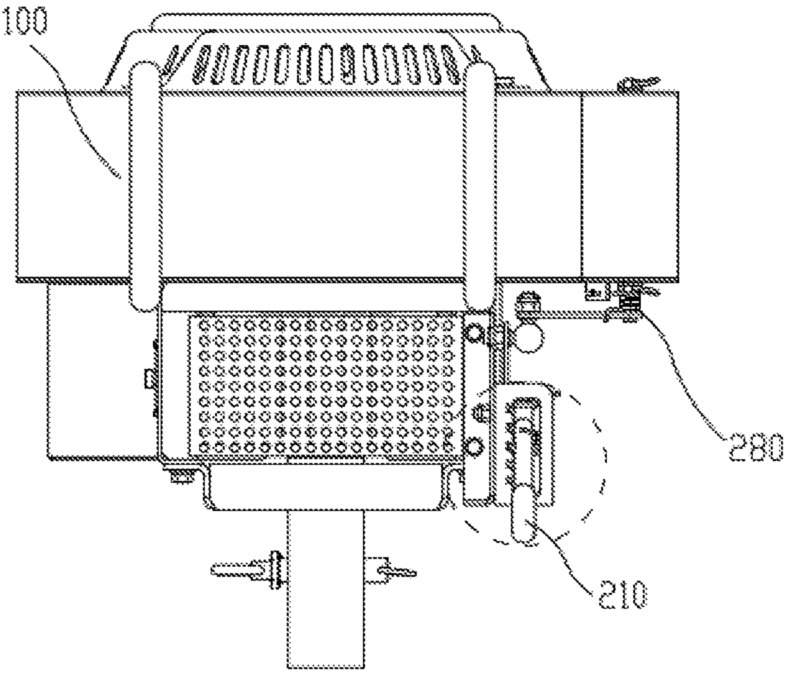
FIG. 32 is a top view of the blower with the blowing direction adjustment mechanism of the disclosure.
Figure 33:
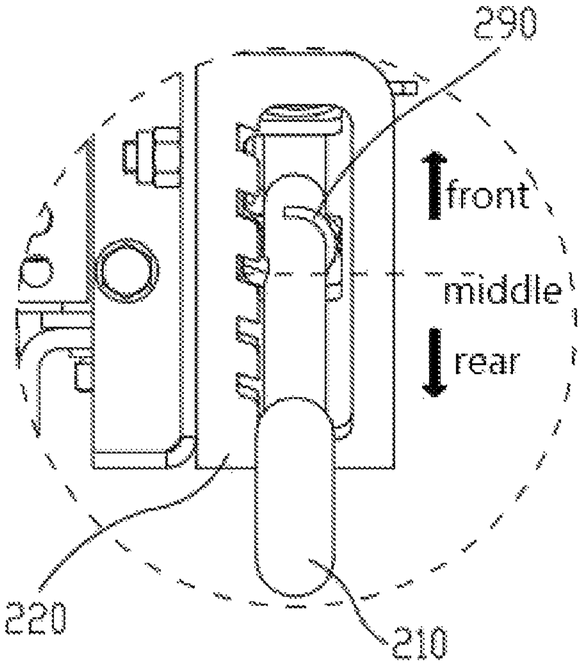
FIG. 33 is a partially enlarged view of an area indicated by a circle in FIG. 32.
Figure 34:
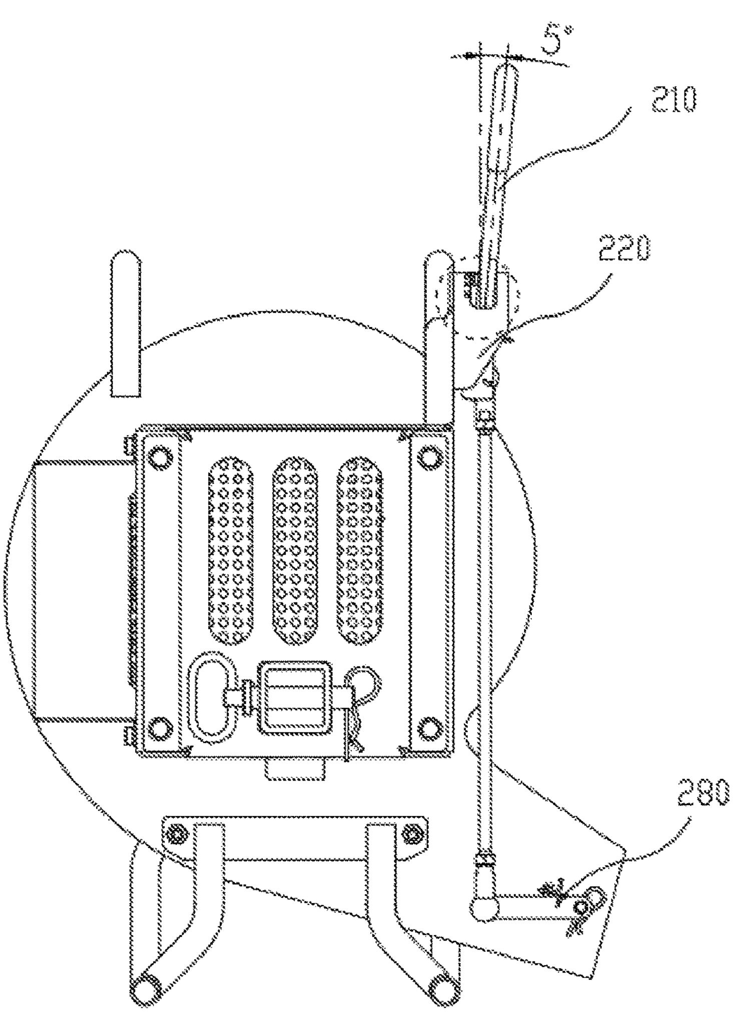
FIG. 34 is a front view of the blower with the blowing direction adjustment mechanism of the disclosure after an adjustment handle overcomes a torsion force of a first torsion spring and swings away from a ratchet.
Figure 35:
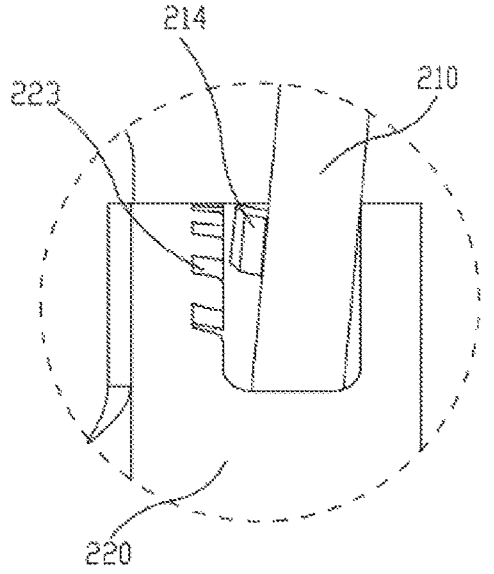
FIG. 35 is a partially enlarged view of an area indicated by a dotted circle in FIG. 34.
Figure 36:
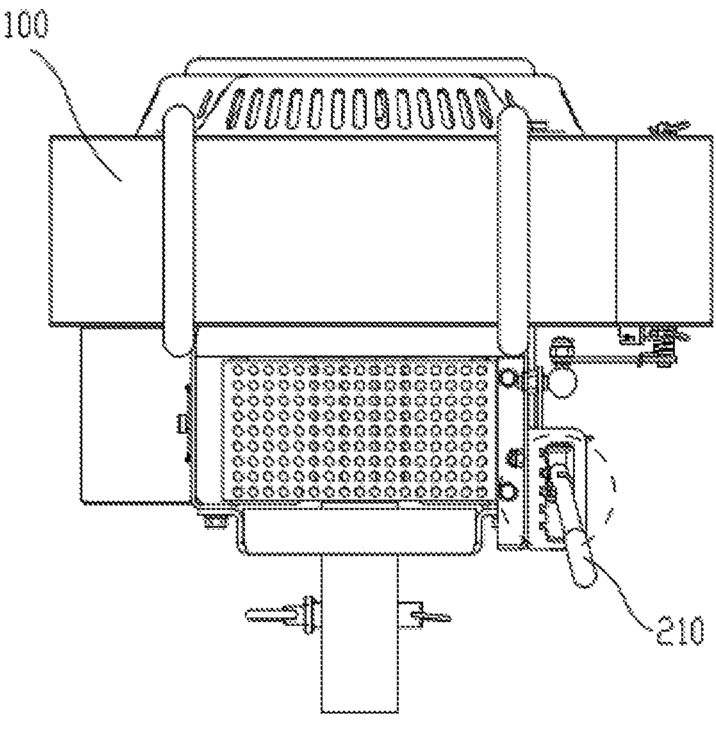
FIG. 36 is a top view of the blower with the blowing direction adjustment mechanism of the disclosure after the adjustment handle overcomes the torsion force of the first torsion spring and swings away from the ratchet.
Figure 37:
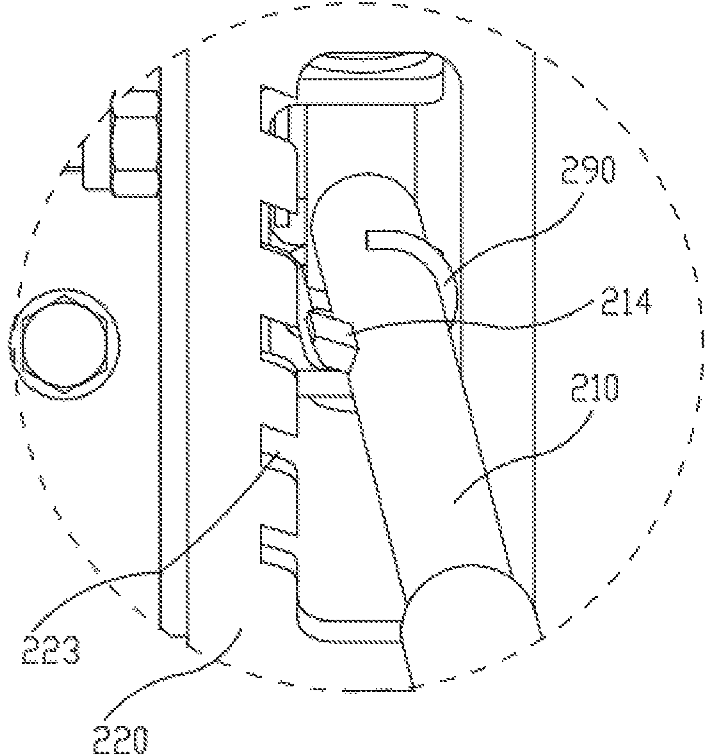
FIG. 37 is a partially enlarged view of an area indicated by a dotted circle in FIG. 36.

Please refer to FIG. 32 through FIG. 37. The adjustment handle 210 may move in two directions, which are forward-to-backward (corresponding to FIG. 32 and FIG. 33) movement and left-to-right movement (corresponding to FIG. 34 through FIG. 37). Please refer to FIG. 34 through FIG. 37. An action of the first torsion spring 290 enables the adjustment handle 210 to move toward a groove direction of the ratchet gear groove 223 of the gear base 220, and a state of left-to-right movement has been subjected to a left torsion and may enable the adjustment handle 210 to be engaged with the ratchet gear groove 223 of the gear base 220. The ratchet 214 of the adjustment handle 210 needs to overcome a torsional swing of the first torsion spring 290 to be separated from the ratchet gear groove 223. As shown in FIG. 32 and FIG. 33, a function of the second torsion spring 280 is to eliminate a movement gap between the multi-connecting rod, and at the same time, it shows a clockwise torque to the adjustment handle 210. The ratchet 214 of the adjustment handle 210 and the ratchet gear groove 223 of the gear base 220 form a ratchet meshing mechanism, so that the adjustment handle 210 has a power to move forward in a natural state. The power to move forward allows the ratchet 214 of the adjustment handle 210 to be firmly locked in the ratchet gear groove 223 of the gear base 220, so as not to move or loosen.

Figure 29:
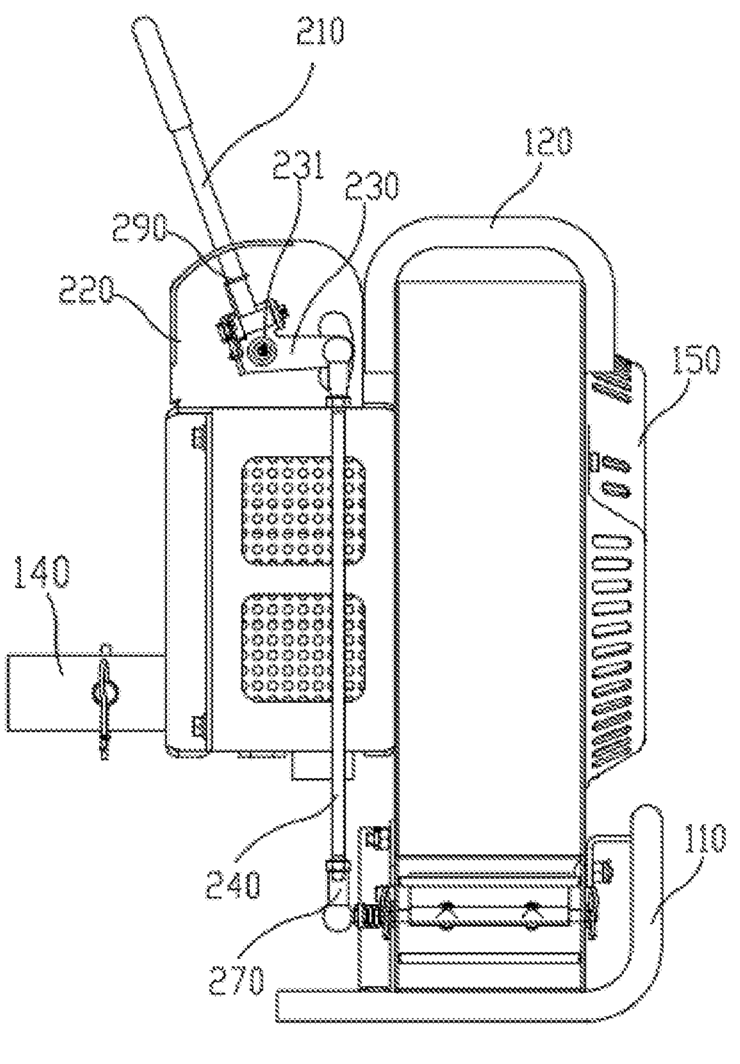
FIG. 29 is a right view of the blower with the blowing direction adjustment mechanism of the disclosure.
Figure 30:
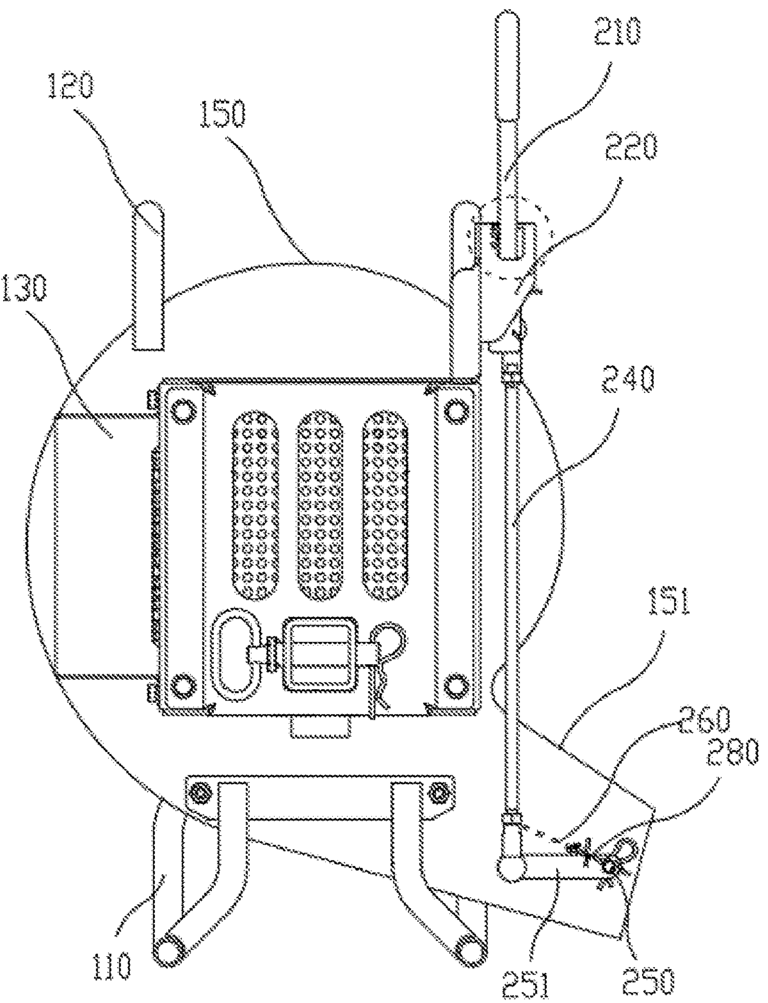
FIG. 30 is a front view of the blower with the blowing direction adjustment mechanism of the disclosure.
Figure 31:
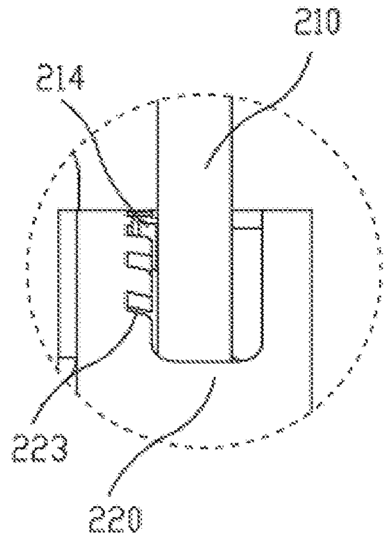
FIG. 31 is a partially enlarged view of an area indicated by a dotted circle in FIG. 30.
Figure 38:
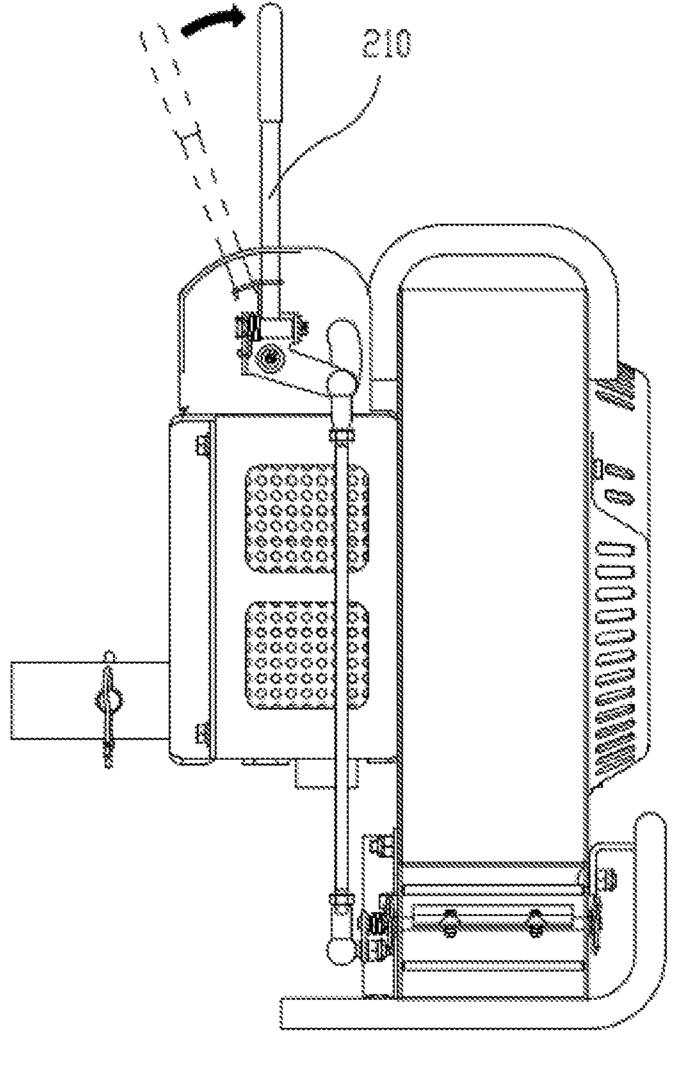
FIG. 38 is a right view of the blower with the blowing direction adjustment mechanism of the disclosure when the adjustment handle swings forward.
Figure 39:
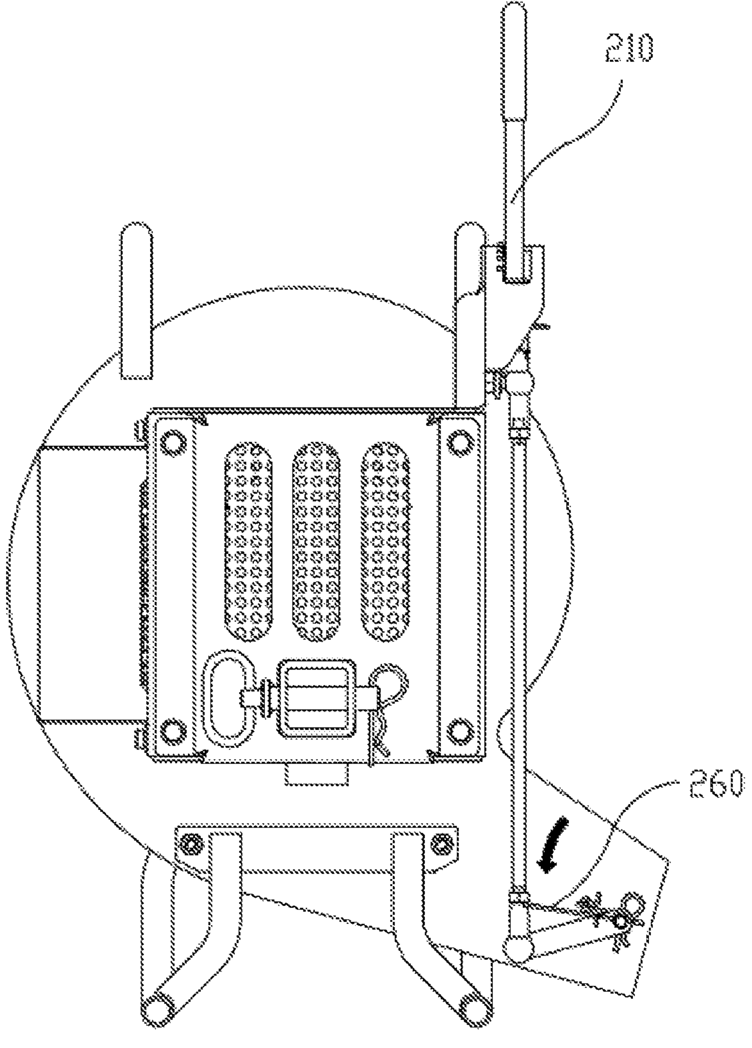
FIG. 39 is a front view of the blower with the blowing direction adjustment mechanism of the disclosure when the adjustment handle swings forward.
Figure 40:
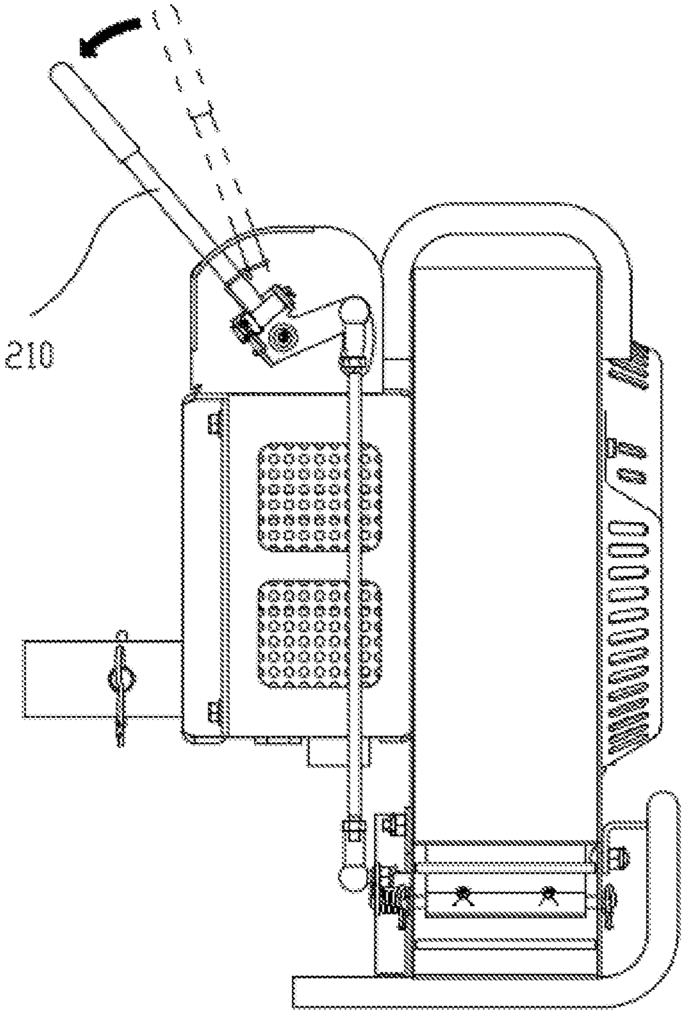
FIG. 40 is a right view of the blower with the blowing direction adjustment mechanism of the disclosure when the adjustment handle swings backward.
Figure 41:
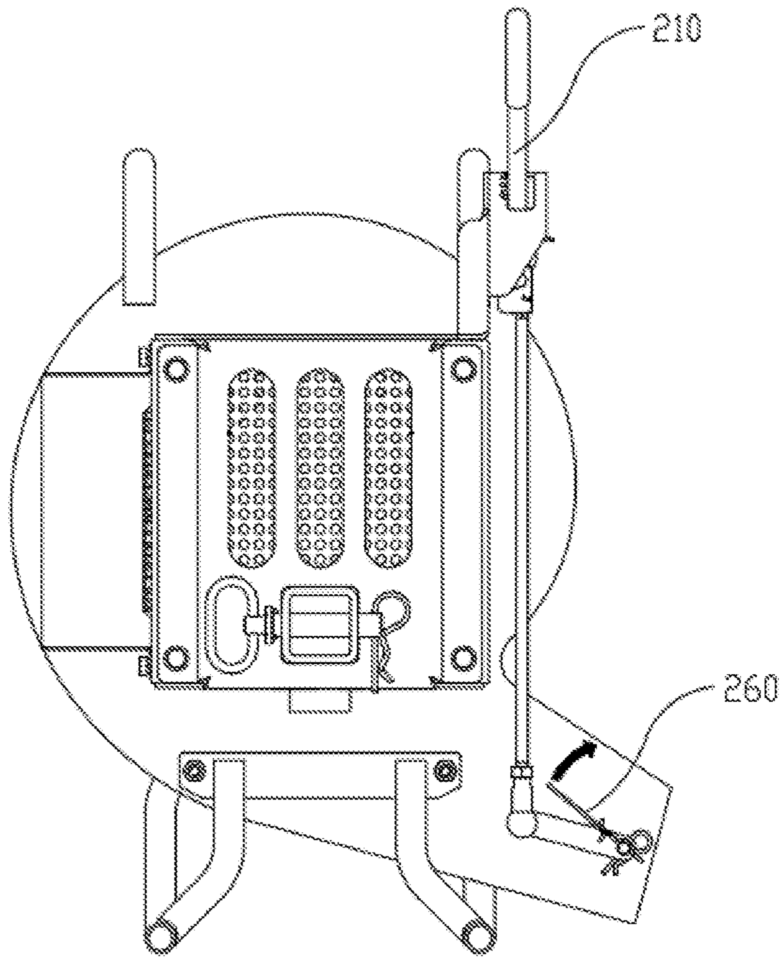
FIG. 41 is a front view of the blower with the blowing direction adjustment mechanism of the disclosure when the adjustment handle swings backward.
Figure 42:
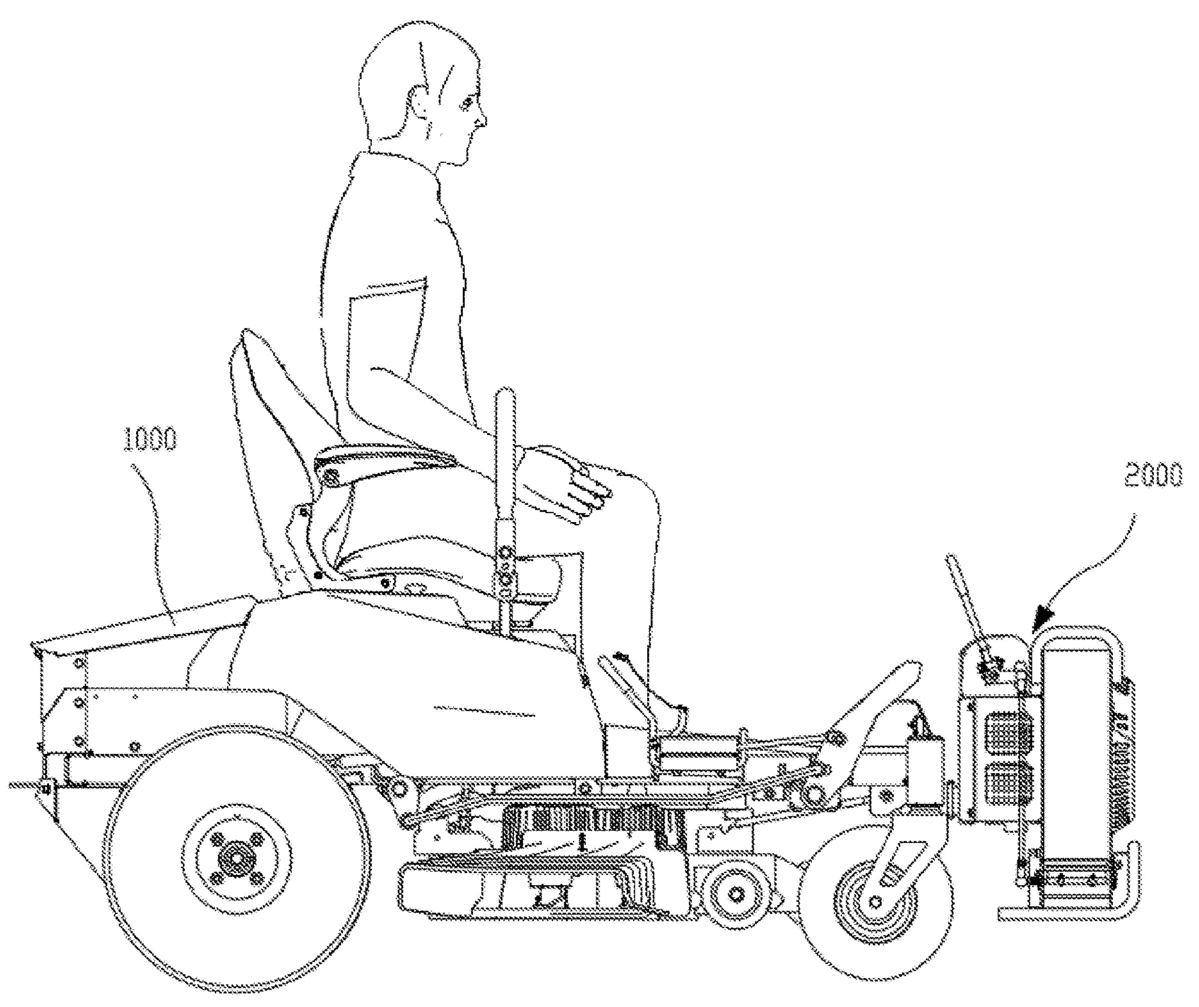
FIG. 42 is a structural schematic view of the blower with the blowing direction adjustment mechanism mounted on the front end of the mower of the disclosure.

During a process of adjusting the air direction, when the adjustment handle 210 is at a middle position shown in FIG. 29, the air direction adjustment plate 260 is at a middle position shown in FIG. 30, and the air direction does not change. When the adjustment handle 210 turns clockwise (forward) as shown in FIG. 38, the air direction adjustment plate 260 turns counterclockwise as shown in FIG. 39, and the air direction is upward. When the adjustment handle 210 turns counterclockwise (backward) in FIG. 40, the air direction adjustment plate 260 turns clockwise as shown in FIG. 41, and the air direction is downward.

When adjusting an air direction angle of the blower 2000, the operator leans forward in the driving position of the mower 1000, and an arm may perform a multi-angle adjustment of the air direction of the blower 2000 through the adjustment handle 210. The adjustment process is simple and convenient, and the operator does not need to get off the mower 1000 during an adjustment process, which saves manpower and time.

Please refer to FIG. 43 through FIG. 50. In order to solve a technical problem of inconvenient operation and cumbersome process of adjusting the air direction of the blower 2000 for the mower 1000, the embodiment of the disclosure further provides another blowing direction adjustment mechanism. The blowing direction adjustment mechanism is a manual blowing direction adjustment mechanism, which manually adjusts the air direction of the air outlet of the blower 2000. The blowing direction adjustment mechanism includes a first rotating air passage assembly 600 mounted at the air outlet 151 of the blower and a driving mechanism for driving the air outlet tube of the first rotating air passage assembly 600 to rotate, and the driving mechanism is a manual driving mechanism 300.

Figure 43:
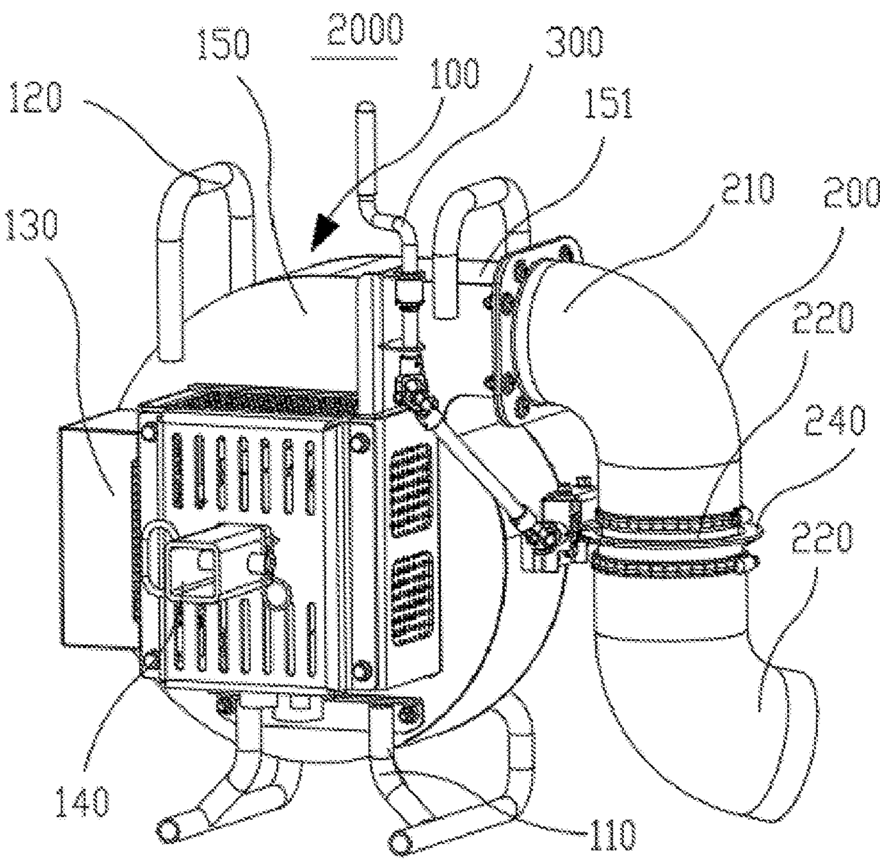
FIG. 43 is a perspective schematic structural view of a blower with a second blowing direction adjustment mechanism of the disclosure.

Please refer to FIG. 43. In this embodiment, the blower 2000 includes a blower assembly 100 and a blowing direction adjustment mechanism mounted on the blower assembly 100. The blower assembly 100 includes the blower frame 150, the motor assembly and the fan assembly housed in the blower frame 150, the handle 120 arranged above the blower frame 150, the base 110 for supporting the whole blower assembly 100 below the blower frame 150, the second connecting component 140 for connecting one side of the blower frame 150 with the mower 1000 and the controller 130. The blower frame 150 includes the air outlet 151, and the air outlet 151 is arranged on one side of the blower frame 150. The second connecting component 140 is arranged on the side of the blower frame 150 close to the mower (see FIG. 50), and the blower 2000 may be mounted on the front end of the mower 1000 through the second connecting component 140.

Figure 44:
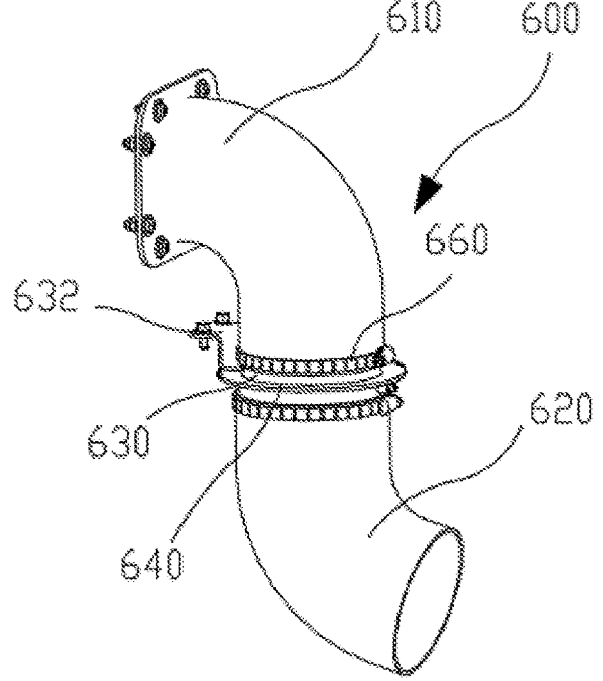
FIG. 44 is a perspective schematic structural view of the rotating air passage assembly of the second blowing direction adjustment mechanism of the disclosure.
Figure 45:
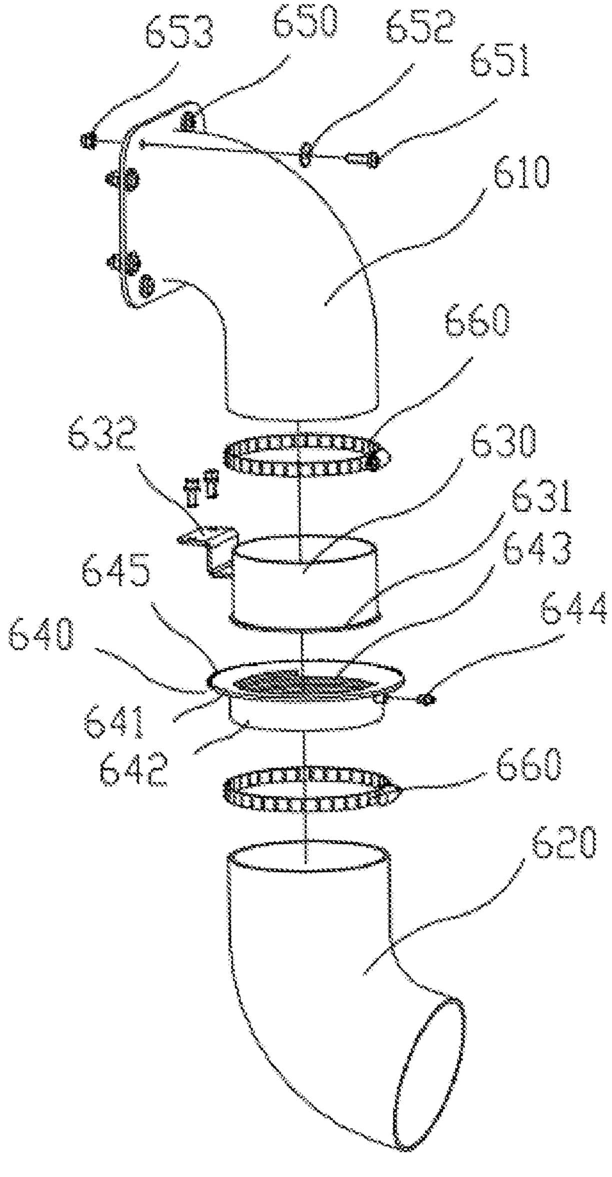
FIG. 45 is an exploded schematic view of the rotating air passage assembly of the second blowing direction adjustment mechanism of the disclosure.
Figure 46:
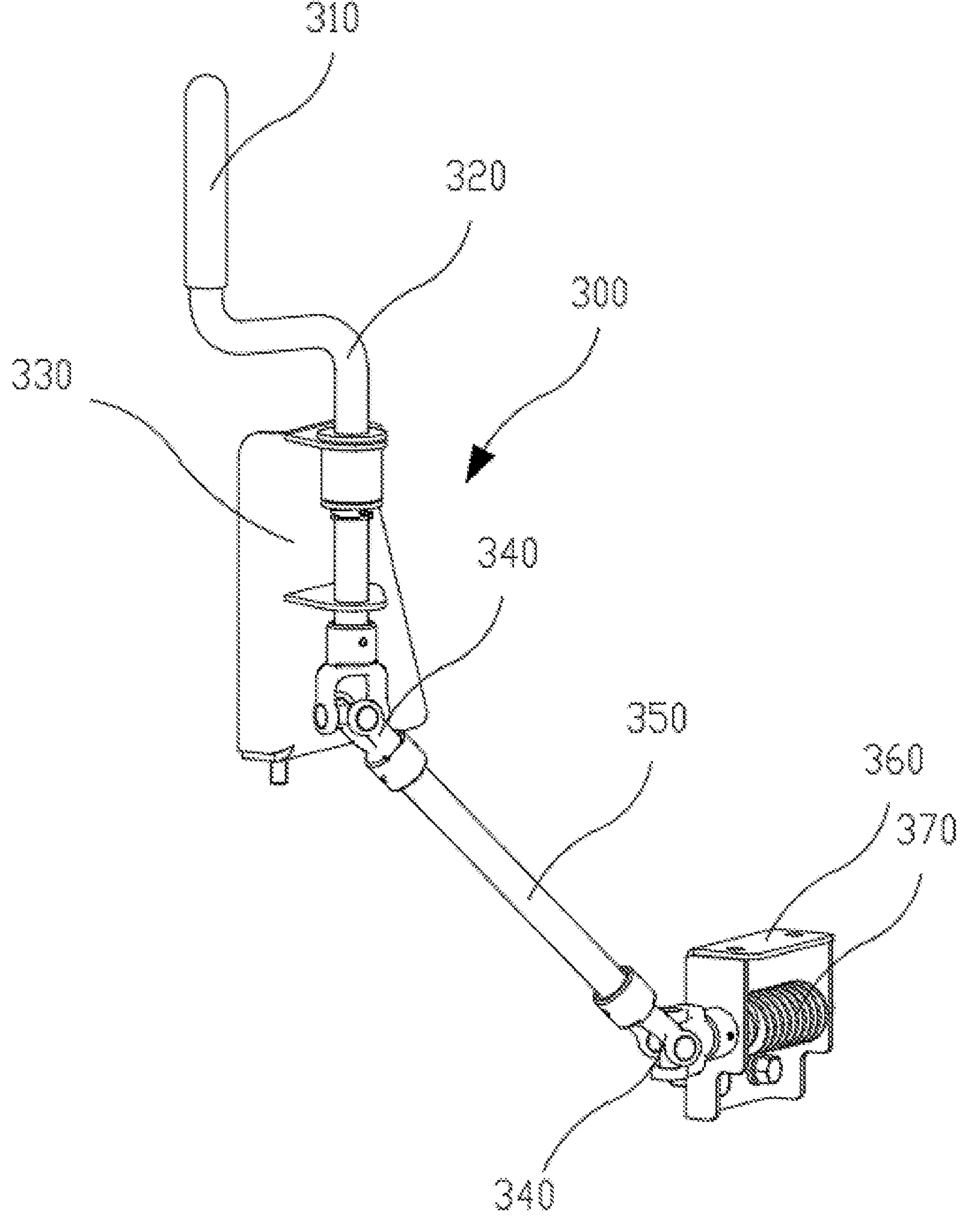
FIG. 46 is a perspective schematic structural view of a manual driving mechanism of the second blowing direction adjustment mechanism of the disclosure.
Figure 47:
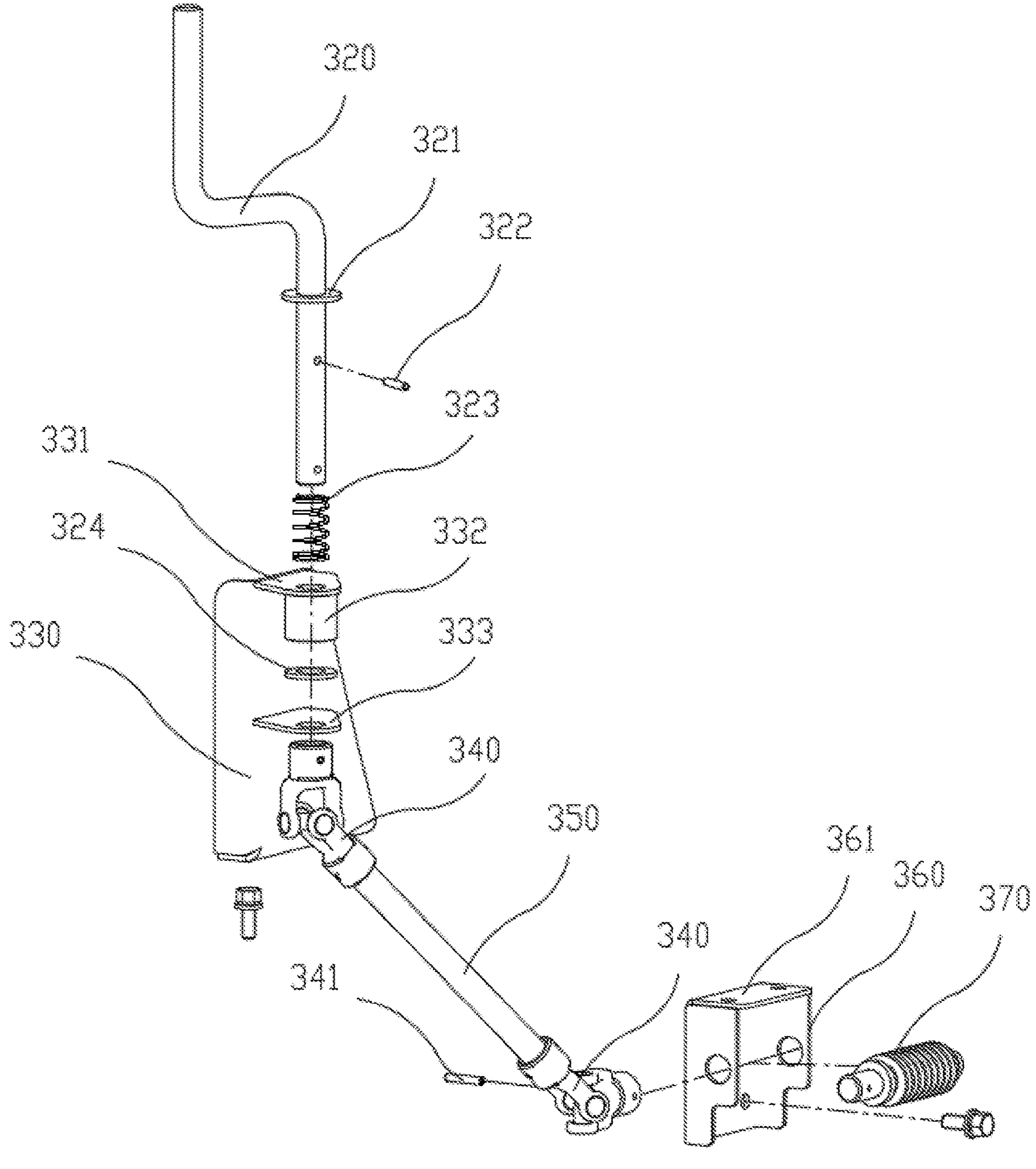
FIG. 47 is an exploded schematic view of the manual driving mechanism of the second blowing direction adjustment mechanism of the disclosure.

Please refer to FIG. 43 through FIG. 45. In this embodiment, the first rotating air passage assembly 600 is mounted at the air outlet 151 of the blower. The first rotating air passage assembly 600 includes a first air inlet conduit 610, a fixed conduit 630, a first rotating component 640 and a first air outlet conduit 620. The first air inlet conduit 610 may be, for example, an elbow structure, and an upper end of the first air inlet conduit 610 is provided with a connecting flange. The connecting flange of the first air inlet conduit 610 is fixedly connected with a connecting flange at the air outlet 151 of the blower 2000 through a fastening assembly 650, so as to fix the upper end of the first air inlet conduit 610 at the air outlet 151 of the blower 2000. The fastening assembly 650 includes a bolt 651, a fourth washer 652 and a nut 653. Certainly, the upper end of the first air inlet conduit 610 and the air outlet 151 of the blower 2000 may also be connected and fixed by means of rivets or welding.

Please refer to FIG. 43 through FIG. 45. In this embodiment, the fixed conduit 630 is provided with a cylindrical tubular structure as a whole, and a lower end of the fixed conduit 630 is outwardly formed with a bottom annular protruding edge 631. When the first rotating member 640 is sleeved on an outside of the fixed conduit 630, the bottom annular protruding edge 631 is used to support the first rotating component 640 to prevent the first rotating component 640 from falling. An upper end of the fixed conduit 630 may be connected and fixed with the lower end of the first air inlet conduit 610 through, for example, a hose clamp 660, so as to facilitate disassembly. In addition, the upper end of the fixed conduit 630 may be connected and fixed with the lower end of the first air inlet conduit 610 by, for example, bolts, nuts, fasteners or rivets.

Please refer to FIG. 43 through FIG. 45. In this embodiment, a first connecting component 632 is further arranged on a conduit wall of the fixed conduit 630. A first end of the first connecting component 632 is fixedly connected with an outer wall of the fixed conduit 630 between the first rotating component 640 and the first air inlet conduit 610, and a second end of the first connecting component 632 may be fixedly connected with a top of a worm base 360 through a bolt-nut assembly.

Please refer to FIG. 43 through FIG. 45. In this embodiment, the first rotating component 640 is a rotating toothed plate, including a first toothed disc part 641 located at an upper end and a first connecting tube part 642 located at a lower end. The first toothed disc part 641 is a disc-shaped structure, and the first toothed disc part 641 is provided with a central opening through which the fixed conduit 630 passes. The central opening of the first toothed disc part 641 communicates with the first connecting tube part 642. The first rotating component 640 is sleeved on the lower end of the fixed conduit 630, the lower end of the first rotating component 640 overlaps the bottom annular protruding edge 631 to prevent the first rotating component 640 from falling, and the first rotating component 640 may rotate around the fixed conduit 630.

Please refer to FIG. 45. In this embodiment, a helical oil passage 643 is opened on an inner wall of the first rotating component 640. A lubricating oil nipple 644 is mounted on an outer wall of the first connecting tube part 642 of the first rotating component 640, the lubricating oil nipple 644 communicates with an inner wall of the first rotating component 640, and lubricating oil may be injected into the helical oil passage 643 of the first rotating component 640 through the lubricating oil nipple 644 to lubricate a relative rotation between the first rotating component 640 and the fixed conduit 630.

Please refer to FIG. 43 through FIG. 45. In this embodiment, an outer diameter of the bottom annular protruding edge 631 is larger than an inner diameter of the first connecting tube part 642 of the first rotating component 640 but smaller than an outer diameter of the first connecting component 642. The first air outlet conduit 620 may be, for example, an elbow structure. An upper end of the first air outlet conduit 620 is sleeved on a lower end of the first connecting tube part 642 and may be connected and fixed by the hose clamp 660 to facilitate disassembly. In addition, an upper end of the first air outlet conduit 620 and the lower end of the first connecting tube part 642 may also be connected and fixed by, for example, bolts, nuts, fasteners or rivets.

Please refer to FIG. 42 through FIG. 47. In this embodiment, the manual driving mechanism 300 and the first rotating air passage assembly 600 are arranged on the same side of the blower 2000, and the manual driving mechanism 300 is located on one side of the first rotating air passage assembly 600. The manual driving mechanism 300 includes a rotary handle 320, a coupling and a worm 370, and the rotary handle 320 is connected with the worm 370 through the coupling. Wherein, the coupling and the worm 370 are used as transmission parts for transmitting power or movement of the manual driving mechanism 300. The worm 370 is provided with a first driving meshing part, and the first toothed disc part 641 is provided with a first driven meshing part 645. The worm 370 is arranged on one side of the first rotating component 640 to ensure that the first driving meshing part of the worm 370 is meshed with the first driven meshing part 645 of the first rotating component 640. A rotation of the worm 370 drives the first rotating component 640 to rotate around the fixed conduit 630. As an example, the first driving meshing part of the worm 370 is a helical tooth, and the first driven meshing part 645 of the first toothed disc part 641 is a normal tooth.

In this embodiment, the worm 370 is directly meshed with the first rotating component 640 to transmit power or motion. However, it should be understood that the power or motion may also be transmitted between the worm 370 and the first rotating component 640 through a meshing of an intermediate component, and the worm 370 and the intermediate component constitute the transmission component.

Please refer to FIG. 43 through FIG. 47. In this embodiment, the coupling is a universal coupling, including a connecting rod 350 and two cross universal joints 340, and the connecting rod 350 is, for example, a round rod. A first end of the connecting rod 350 is connected with a lower end of the rotary handle 320 through a cross universal joint 340, and may be fixed by a pin, and a second end of the connecting rod 350 is connected with one end of the worm 370 through another cross universal joint 340 and fixed by a pin shaft. The rotary handle 320 performs a rotary motion under an action of the operator, driving a cross universal joint 340 on a top (defined as an upper cross universal joint 340) to rotate. The upper cross universal joint drives a rotation of the connecting rod 350, and the connecting rod 350 drives a rotation of a cross universal joint 340 located below (defined as a lower cross universal joint 340). The lower cross universal joint 340 drives the worm 370 to rotate, and the rotation of the worm 370 drives the first rotating component 640 to rotate, thereby driving the rotation of the first air outlet conduit 620 to adjust the air direction angle.

Please refer to FIG. 43 through FIG. 47. In this embodiment, an upper end of the rotary handle 320 is covered with a handle cover 310, which is provided for a convenience of the user to hold.

Please refer to FIG. 43 through FIG. 47. In this embodiment, the first toothed disc part 641 may only be provided with the first driven meshing part 645 in a partial circumferential direction. This design may not only meet needs of angle adjustment, but also play a role of limitation. The limiting function means that the first rotating component 640 will stop when it rotates to a position of a tooth edge, thereby restricting a continuous rotation of the first air outlet conduit 620. Of course, the first driven meshing part 645 that meshes with the first driving meshing part of the worm 370 may also be arranged on an entire circumferential direction of the first toothed disc part 641.

Please refer to FIG. 43 through FIG. 47. In this embodiment, the manual driving mechanism 300 is mounted on one side of the blower 2000 through the fixing base 330, and one side of the fixing base 330 is provided with an upper mounting plate 331 and a lower mounting plate 333 sequentially from top to bottom. The upper mounting plate 331 and the lower mounting plate 333 are provided with coaxial mounting holes for the rotary handle 320 to pass through. The lower end of the rotary handle 320 passes through the mounting holes of the upper mounting plate 331 and the mounting holes of the lower mounting plate 333 of the fixed base 330 in turn, and is connected with one end of the universal coupling. An outer side wall of the rotary handle 320 is provided with an annular clamping protrusion 321, and the clamping protrusion 321 overlaps the mounting hole of the upper mounting plate 331.

Please refer to FIG. 43 through FIG. 47. In this embodiment, the manual driving mechanism 300 further includes a compression spring 323 and a fifth washer 324 sleeved on the rotary handle 320. The fifth washer 324 is fixed on the rotary handle 320 through a first pin shaft 322. The compression spring 323 is arranged between the fifth washer 324 and the upper mounting plate 331 so that the compression spring 323 is in a compressed state. In this way, the compression spring 323 indirectly exerts a downward force on the rotary handle 320 through the fifth washer 324, and the force enables the clamping protrusion 321 on the rotary handle 320 and the upper mounting plate 331 to always have a pretightening force. In a natural state, the rotary handle 320 will not shake or loosen.

Please refer to FIG. 43 through FIG. 47. In this embodiment, the manual driving mechanism 300 further includes a sleeve coupling 332, which is a circular tube. A diameter of the sleeve coupling 332 is larger than an outer diameter of the compression spring 323, the sleeve coupling 332 is sleeved on an outside of the compression spring 323, the sleeve coupling 332 is located between the fifth washer 324 and the upper mounting plate 331, and an upper end of the sleeve coupling 332 is connected and fixed with a bottom of the upper mounting plate 331.

Please refer to FIG. 43 through FIG. 47. In this embodiment, the worm 370 is fixed on the worm base 360, and the worm seat 360 is fixed on one side of the blower frame 150 by bolts. The worm base 360 is located between the first rotating air passage assembly 600 and the blower frame 150, and an upper end of the worm base 360 is connected with a side wall of the fixed conduit 630 through the first connecting component 632.

Figure 48:
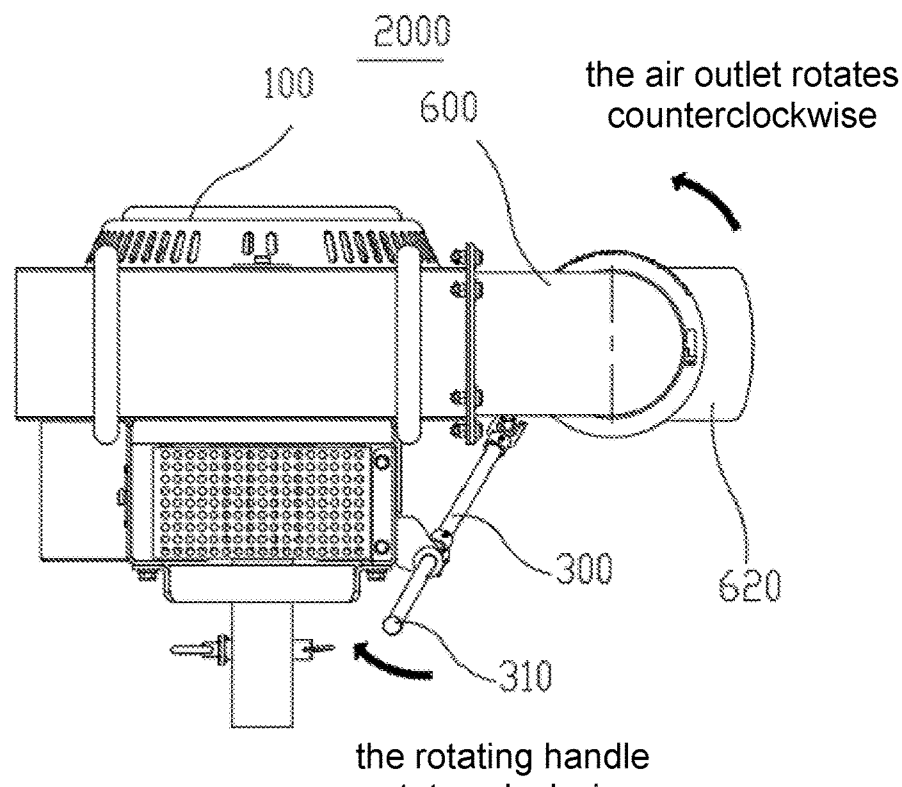
FIG. 48 is a schematic view of a blowing direction adjustment of the blower with the second blowing direction adjustment mechanism of the disclosure.
Figure 49:
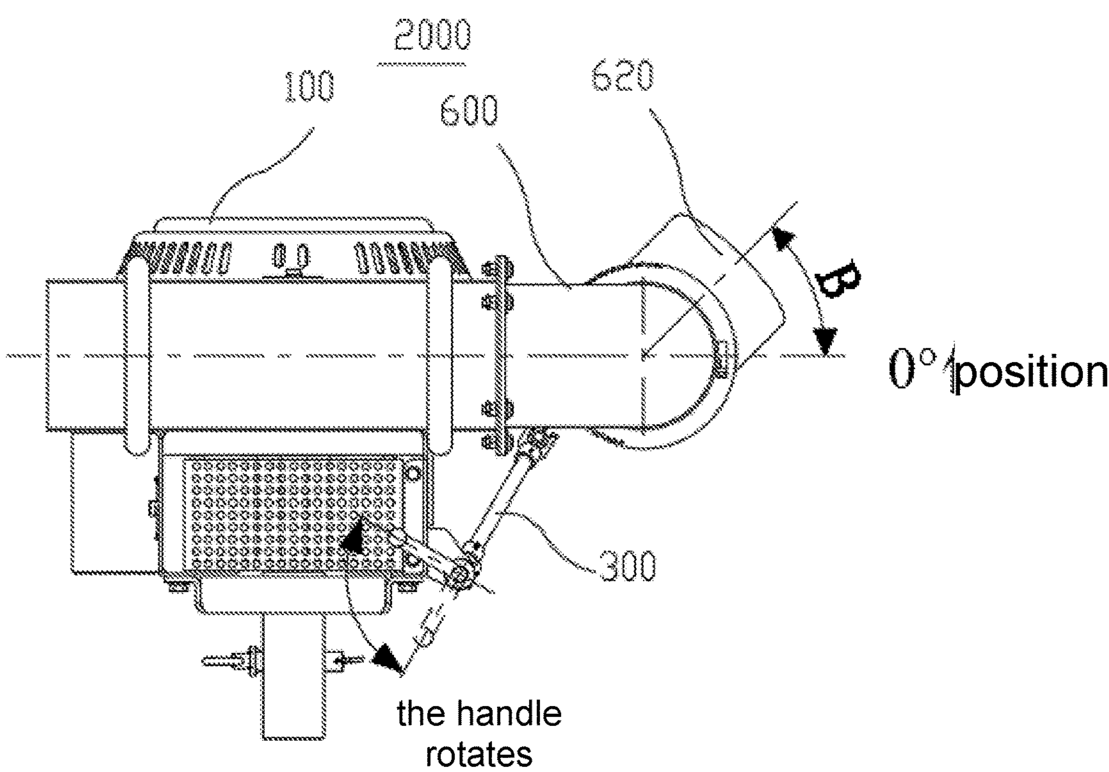
FIG. 49 is a schematic view of a rotation angle of the air outlet of the blower with the second blowing direction adjustment mechanism of the disclosure.

Please refer to FIG. 48 and FIG. 49. In this embodiment, by controlling the rotary handle 320 to rotate clockwise, the first air outlet conduit 620 may be driven to rotate counterclockwise, on the contrary, a counterclockwise rotation of the rotary handle 320 may drive the first air outlet conduit 620 to rotate clockwise, so as to realize the adjustment of the air direction. In a specific example, the rotary handle 320 rotates clockwise for one circle (360°), which may drive the worm 370 to rotate one circle and drive the first air outlet conduit 620 to rotate counterclockwise by 4° (this angle may be adjusted according to a transmission ratio between the worm 370 and the first rotating component 640). The rotary handle 320 rotates counterclockwise for one turn (360°), which may drive the worm 370 to rotate one turn and drive the first air outlet conduit 620 to rotate clockwise by 4° (this angle may be adjusted according to the transmission between the worm 370 and the first rotating component 640). In an embodiment, when only half of a tooth profile is arranged on an outer circumference of the first toothed disc part 641 at an upper end of the first rotating component 640, that is, it means that a tooth profile angle is 180°. The air outlet of the first air outlet conduit 620 may perform a stepless adjustment within an angle range B of −45° to 135° relative to a position of 0° in the figure.

A design of the blowing direction adjustment mechanism of the blower in this embodiment can realize the stepless adjustment of the blowing direction of the blower 2000. In addition, the compression spring 323 is mounted inside the rotary handle 320, and the compression spring 323 always has a pre-tightening effect on the rotary handle 320. In a natural state, the rotary handle 320 will not shake or loosen, which enables the entire adjustment mechanism to be compact and reliable.

Figure 50:
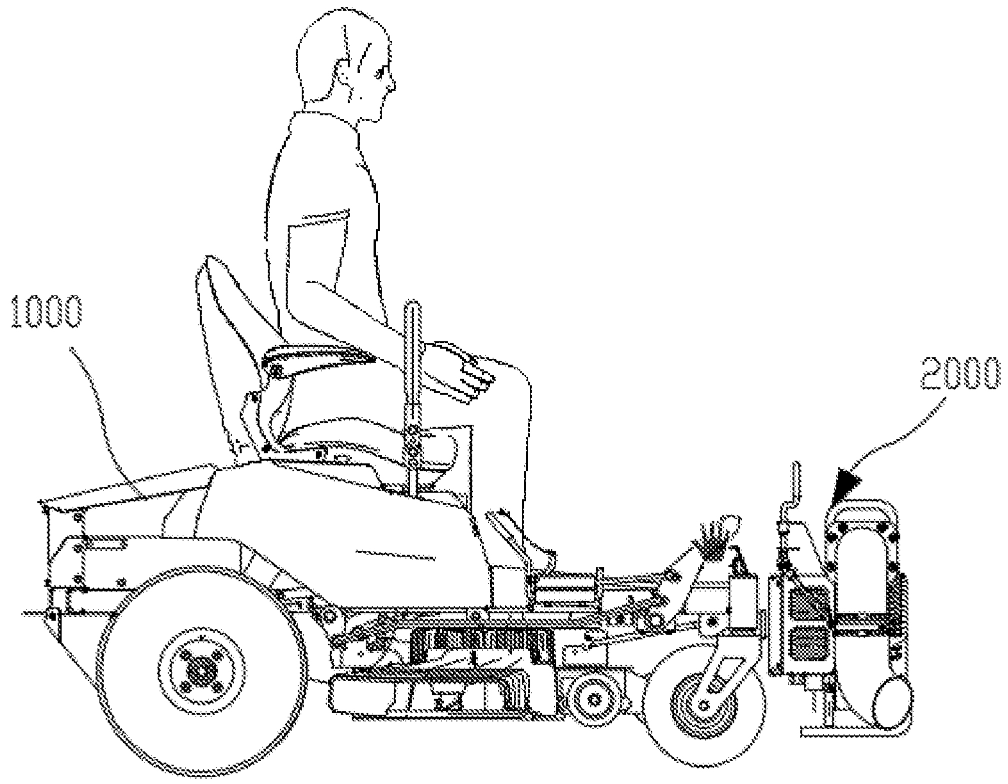
FIG. 50 is a structural schematic view of the blower with the second blowing direction adjustment mechanism mounted on the front end of the mower of the disclosure.
Figure 51:
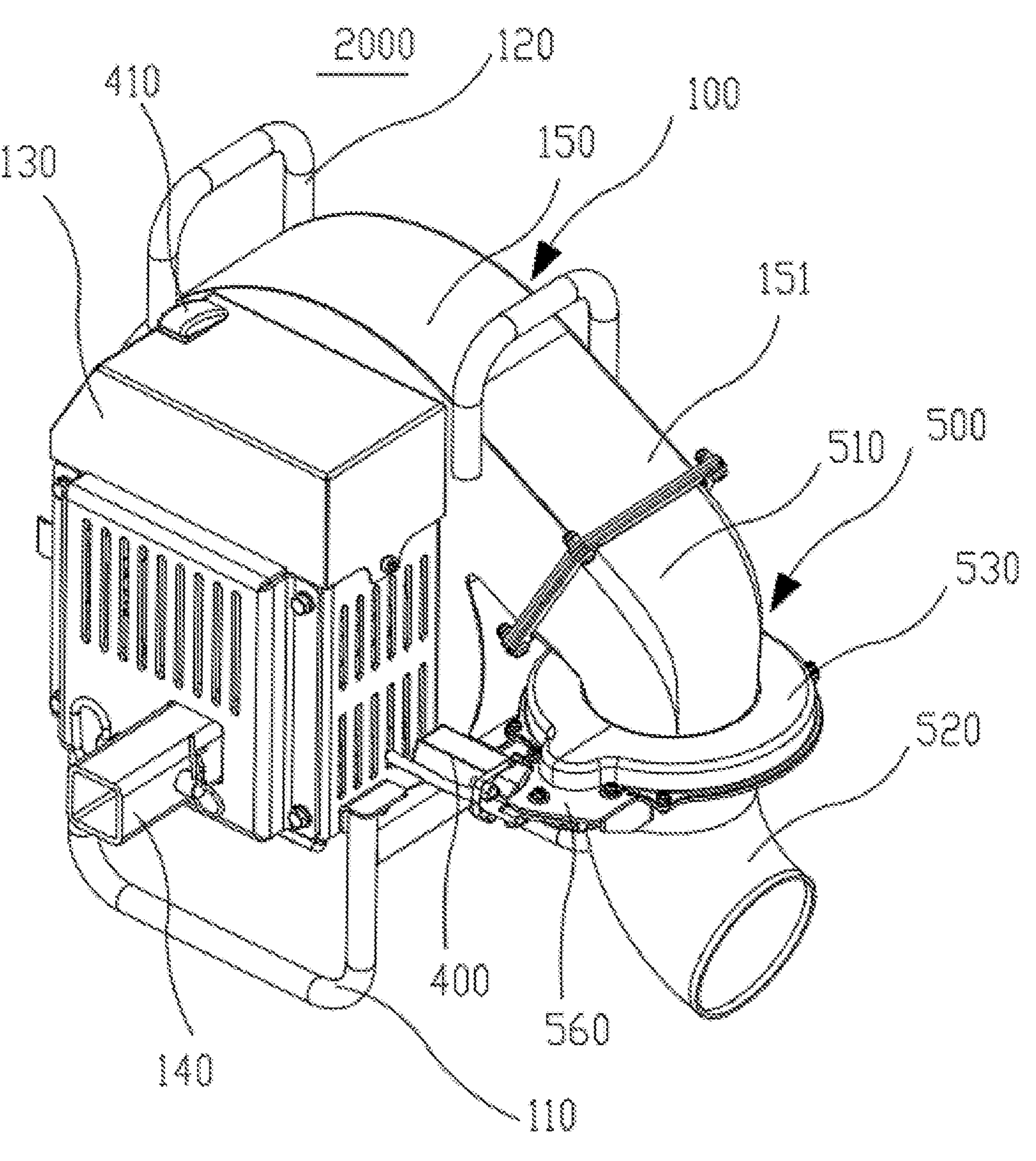
FIG. 51 is a perspective schematic structural view of a blower with a third blowing direction adjustment mechanism of the disclosure.
Figure 52:
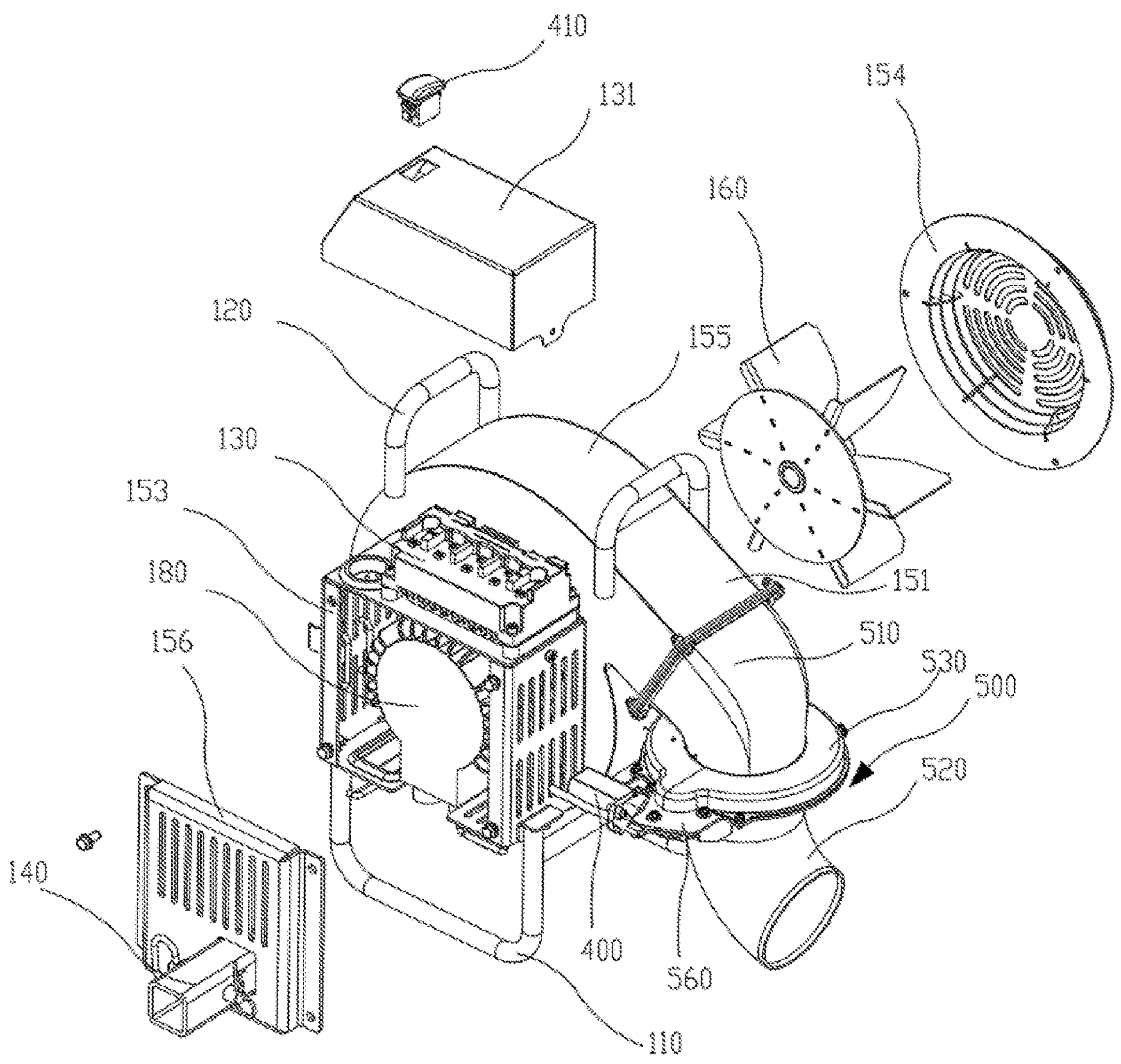
FIG. 52 is an exploded view of a blower with a third blowing direction adjustment mechanism of the disclosure.
Figure 53:
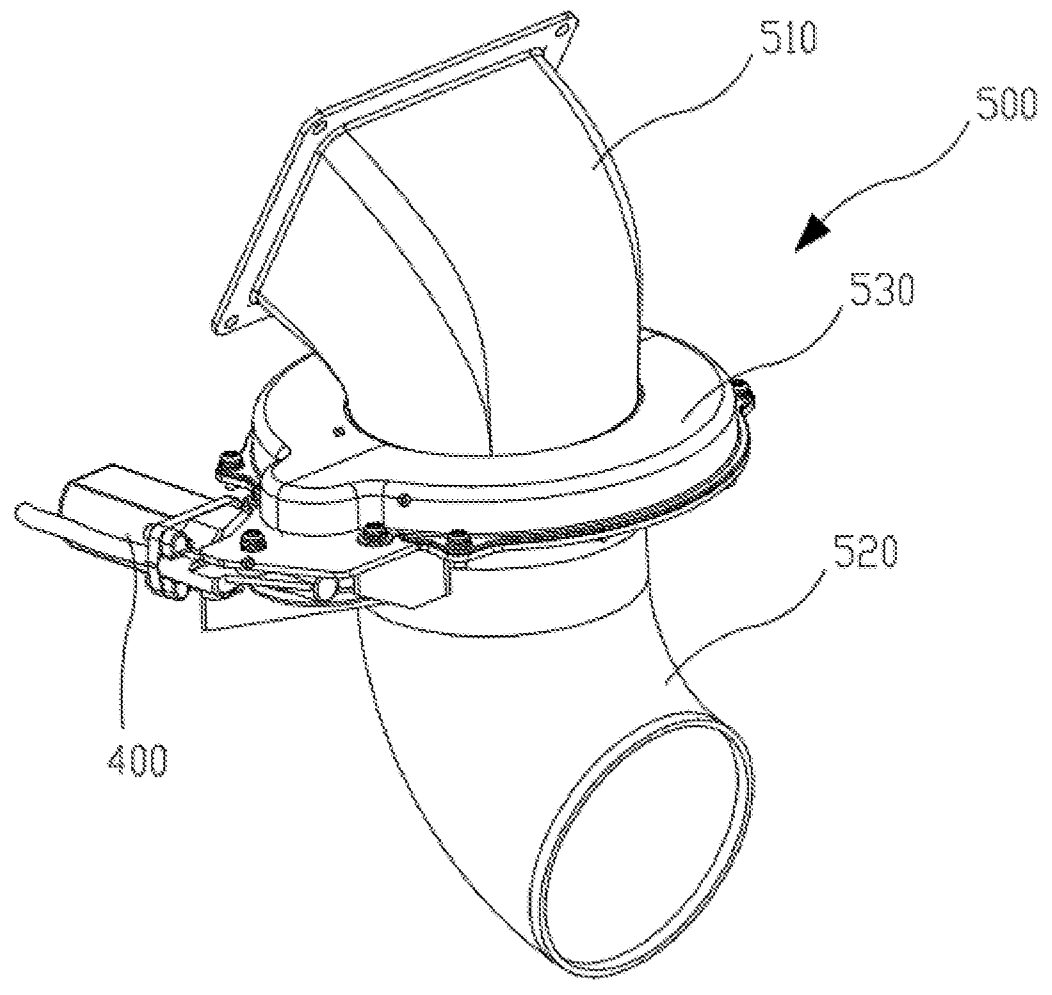
FIG. 53 is a perspective schematic structural view of the third blowing direction adjustment mechanism of the disclosure.
Figure 54:
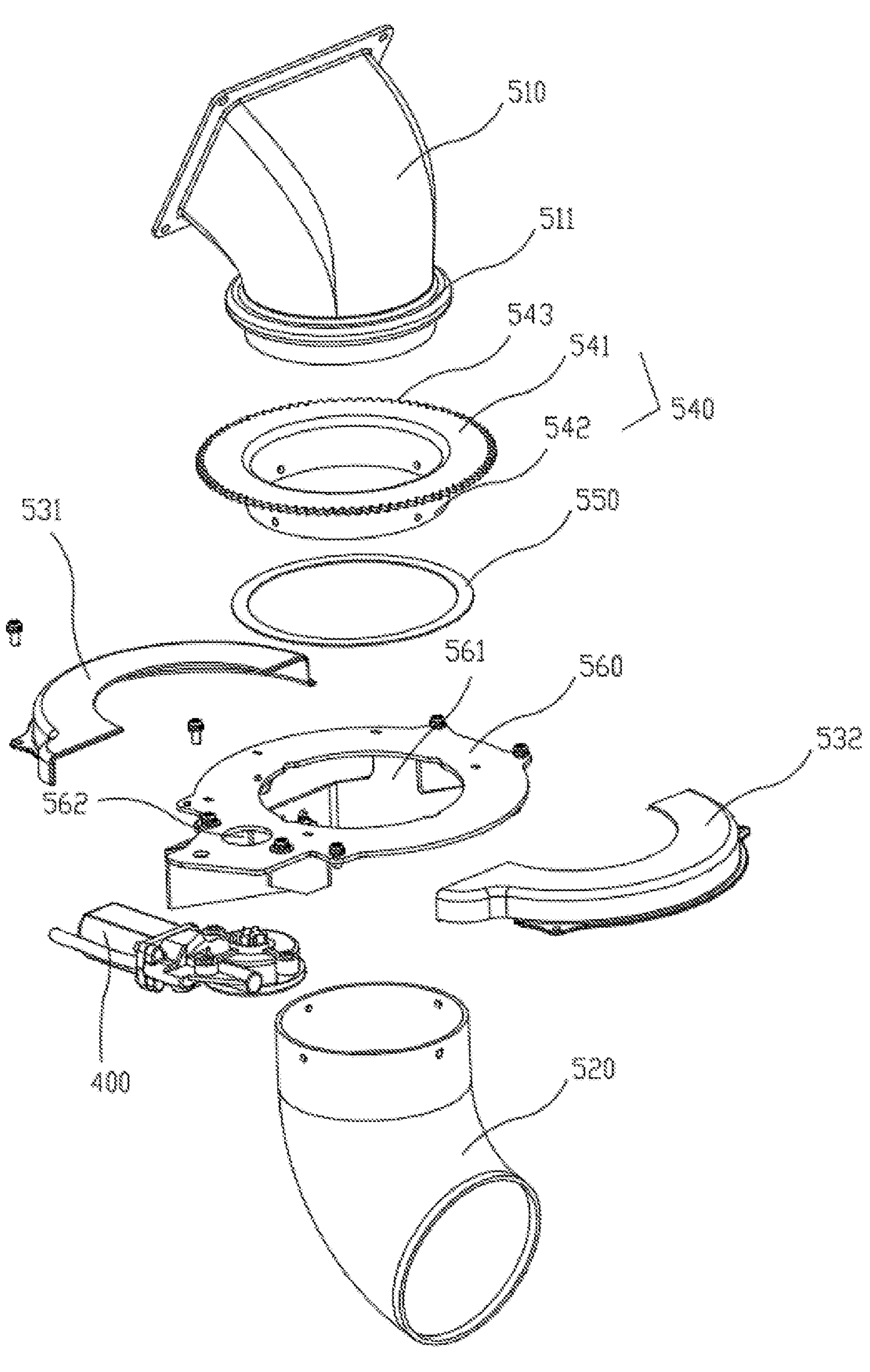
FIG. 54 is an exploded view of the third blowing direction adjustment mechanism of the disclosure.
Figure 55:
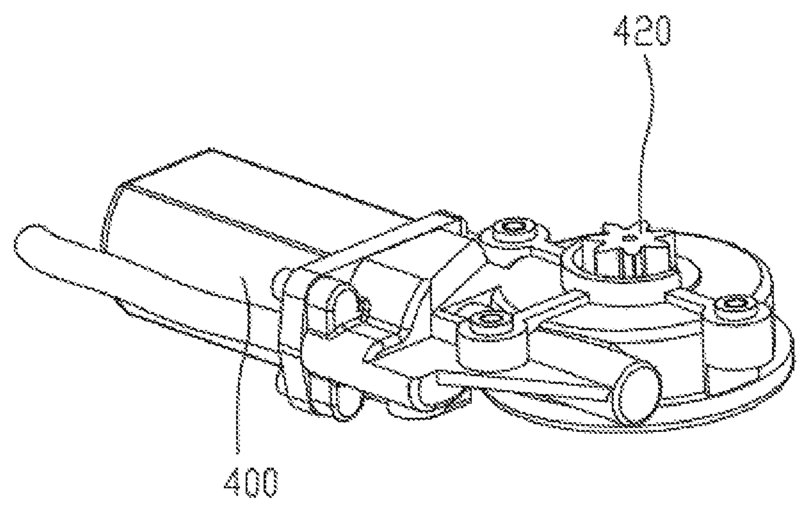
FIG. 55 is a schematic structural view of a worm motor of the third blowing direction adjustment mechanism of the disclosure.

Please refer to FIG. 50. The blower 2000 is mounted on the front end of the mower 1000 through the second connecting component 140 arranged on one side thereof. In order to facilitate an adjustment by the operator, the rotary handle 320 of the blowing direction adjustment mechanism is arranged at a suitable position on a top of the blower 2000 close to the mower 1000, so that it is convenient for the operator to control the mower 1000 when it is in the driving position. During an entire adjustment process, the operator leans forward in a driving position on the mower 1000. The operator's arm may rotate the rotary handle 320 to drive the first air outlet conduit 620 to rotate, and perform the angle adjustment of the blowing direction. The adjustment process is simple and convenient, and the operator does not need to get off the mower 1000 during the adjustment process, which saves manpower and time.

Please refer to FIG. 51 through FIG. 57. In order to solve the technical problem of inconvenient operation and cumbersome process of adjusting the air direction of the blower 2000 for the mower 1000, the embodiment of the present invention further provides another blowing direction adjustment mechanism to realize the adjustment of the blowing direction of the blower 2000. The blowing direction adjustment mechanism includes a second rotating air passage assembly 500 mounted at the air outlet 151 of the blower and the driving mechanism for driving the air outlet tube of the second rotating air passage assembly 500 to rotate, and the driving mechanism is a motor driving mechanism.

Please refer to FIG. 51 through FIG. 55. In this embodiment, the blower 2000 includes the blower assembly 100 and the blowing direction adjustment mechanism mounted on the blower assembly 100. The blower assembly 100 includes the blower frame 150, the motor assembly and the fan assembly 160 housed in the blower frame 150, the handle 120 arranged above the blower frame 150, the base 110 for supporting the whole blower assembly 100 arranged below the blower frame 150, the second connecting component 140 arranged on one side of the blower frame 150 for connecting with the mower 1000 and the controller 130 arranged on the blower frame 150.

The blower frame 150 includes the air outlet 151 of the blower, a connecting frame 156, a fixing frame 153, an air inlet cover 154 and a fan housing 155. The connecting frame 156, the fixing frame 153, the air inlet cover 154 and the fan housing 155 are arranged in sequence along an axial direction of a motor assembly 180. The motor assembly 180 is mounted in the fixing frame 153, and the fan housing 155 is mounted on one side of the fixing frame 153. The fan assembly 160 is mounted on an output shaft of the motor assembly 180, and the air inlet cover 154 is mounted on a side of the fan housing 155 away from the fixing frame 153. The connecting frame 156 is mounted on the fixing frame 153 by bolts, and the second connecting component 140 is arranged on a side of the connecting frame 156 away from the fixing frame 153. The blower 2000 may be mounted on the front end of the mower 1000 through the second connecting component 140.

Please refer to FIG. 51 through FIG. 54. In this embodiment, the controller 130 is arranged on a top of the fixing frame 153, and a controller cover 131 is arranged on the controller 130. Openings for accommodating an adjustment switch 410 of the motor driving mechanism to be described later are arranged on a top surface and side surface of the controller cover 131.

In a specific example, some parameters of the blower 2000 are as follows: the fan assembly 160 is an impeller including 6 vanes; an air inlet area of the air inlet cover 154 may be, for example, 0.0288 $m^2$; the motor assembly 180 may be, for example, a 1.5 KW motor with a rated voltage of 82V, an operating current of 16.5 A and a continuous working system; the controller 130 may be a 1.5 KW controller with a maximum allowable current of 45 A; a square tube is mounted as a second connecting component 140 on a side of the connecting frame 156 away from the fixing frame 153; a main structure design of the whole blower 2000 meets waterproof level requirements of IPX4, a maximum air speed is 42 m/s, and a maximum air volume is 922 CFM.

Please refer to FIG. 51 through FIG. 54. In this embodiment, the second rotating air passage assembly 500 is mounted at the air outlet 151 of the blower, the second rotating air passage assembly 500 includes a second air inlet conduit 510, a second rotating component 540, a fixing tray 560, and a second air outlet conduit 520. The second air inlet conduit 510 may be, for example, an elbow structure, and an upper end of the second air inlet conduit 510 is provided with a connecting flange. The connecting flange of the second air inlet conduit 510 is fixedly connected with the connecting flange at the air outlet 151 of the blower frame 150 on one side of the blower 2000 through a fastening assembly, so as to fix the upper end of the second air inlet conduit 510 to the air outlet 151 of the blower, and the fastening assembly may include bolts, washers and nuts, for example. A lower end of the second air inlet conduit 510 is inserted into the second rotating component 540 and overlapped with a central hole of the second rotating component 540. Certainly, the upper end of the second air inlet conduit 510 and the air outlet 151 of the blower may also be connected and fixed by means of rivets or welding.

Please refer to FIG. 51 through FIG. 54. In this embodiment, the fixing tray 560 has a disc-shaped structure with a central opening 561 as a whole. One side of the fixing tray 560 is fixedly mounted on the blower frame 150 of the blower 2000, and the central opening 561 of the fixing tray 560 is used for mounting the second rotating component 540. The fixing tray 560 is provided with a gear opening 562, and the gear opening 562 is located on one side of the second rotating component 540. A third driving motor 400 of the motor driving mechanism is mounted on a side of the fixing tray 560 facing the air outlet conduit, and a transmission gear 420 of the motor driving mechanism passes through the gear opening 562 and is arranged on one side of the rotating component.

Please refer to FIG. 51 through FIG. 54. In this embodiment, the second rotating component 540 is a rotating toothed plate, including a second toothed disc part 541 located at an upper end and a second connecting tube part 542 located at a lower end. The second toothed disc part 541 is a disc-shaped structure, and the second toothed disc part 541 is provided with a central opening for inserting the lower end of the second air inlet conduit 510. The central opening of the second toothed disc part 541 communicates with the second connecting tube part 542, the lower end of the second air inlet conduit 510 is inserted into the central opening of the second toothed disc part 541, and overlapped with the central opening of the second toothed disc part 541 through an annular protruding rib 511. Wherein, the annular protruding rib 511 is arranged on an outer wall of the second air inlet conduit 510 close to the lower end.

Please refer to FIG. 51 through FIG. 54. In this embodiment, the second air outlet conduit 520 may be, for example, an elbow structure. An upper end of the second air outlet conduit 520 is sleeved on a lower end of the second connecting tube part 542 of the second rotating component 540, and may be connected and fixed by bolts, nuts, fasteners or rivets, which means that the lower end of the second rotating component 540 passes through the central opening 561 of the fixing tray 560 and is connected and fixed to the upper end of the second air outlet conduit 520, and the second rotating component 540 and the second air outlet conduit 520 are fixed to rotate together. In addition, the upper end of the second air outlet conduit 520 and the lower end of the second connecting tube part 542 of the second rotating component 540 may also be connected and fixed by, for example, a hose clamp, so as to facilitate disassembly.

Please refer to FIG. 51 through FIG. 54. In this embodiment, the second rotary air passage assembly 500 further includes a toothed plate cover 530. The toothed plate cover 530 is covered and fixed on the fixing tray 560 and covers the second rotating component 540 and the transmission gear 420 so as to protect the second rotating component 540 and the transmission gear 420. In order to facilitate assembly and disassembly, the toothed plate cover 530 may adopt toothed plate left cover 531 and toothed plate right cover 532 connected radially. The toothed plate left cover 531 and the toothed plate right cover 532 are located on both sides of the second air inlet conduit 510 respectively, and upper ends of the toothed plate left cover 531 and the toothed plate right cover 532 are connected and mounted on an upper end of the annular protruding rib 511. Lower ends of the toothed plate left cover 531 and the toothed plate right cover 532 may be respectively fixed on the fixing tray 560 by bolt-nut assemblies. As an example, top surfaces of the toothed plate left cover 531 and the toothed plate right cover 532 are generally semi-circular structures, and after the two are connected, a central opening that is compatible with an outer diameter of a corresponding position of the second air inlet conduit 510 may be formed. A diameter of the central opening needs to be smaller than an outer diameter of the annular protruding rib 511, so as to prevent the second air inlet conduit 510 from slipping out of the toothed plate cover 530.

Please refer to FIG. 51 through FIG. 54. In this embodiment, in order to reduce a direct contact friction between the second rotating component 540 and the fixing tray 560, a sixth washer 550 may be arranged between the second rotating component 540 and the fixing tray 560. The sixth washer 550 is sleeved on the second connecting tube part 542 of the second rotating component 540 and located between the second toothed disc part 541 and the fixing tray 560. As an example, the sixth washer 550 may be a nylon washer, for example.

Please refer to FIG. 51 through FIG. 55. In this embodiment, the motor driving mechanism includes the third driving motor 400, the transmission gear 420 and the adjustment switch 410. The transmission gear 420 is arranged on the output shaft of the third driving motor 400. Wherein, the transmission gear 420 serves as a transmission component for transmitting power or movement of the motor driving mechanism. The transmission gear 420 is arranged on one side of the second rotating component 540, and the second driving meshing part of the transmission gear 420 meshes with the second driven meshing part 543 of the second rotating component 540. The adjustment switch 410 is connected with the third driving motor 400, and the third driving motor 400 is controlled by the adjustment switch 410 to drive the transmission gear 420 to rotate, so that the second rotating component 540 is driven to rotate synchronously with the second air outlet conduit 520, and an adjustment of a direction of the air outlet of the blower 2000 is completed.

Please refer to FIG. 51 through FIG. 55. In this embodiment, the third driving motor 400 may be fixedly mounted on a side of the fixing tray 560 facing the second air outlet conduit 520 through a screw-nut assembly, for example. The transmission gear 420 is arranged on one side of the second rotating component 540 after passing through the gear opening 562 of the fixing tray 560, and a rotation of the third driving motor 400 drives the second rotating component 540 and the second air outlet conduit 520 to rotate around the second air inlet conduit 510 synchronously. In a specific embodiment, the third driving motor 400 may be, for example, a worm motor with a rated voltage of 72V, a rated speed of 100*r*/min, and an output gear with 7 teeth. A diameter of the second air outlet conduit 520 is 115 mm, an area of the air outlet is 0.01 $m^2$, an angle of the air outlet is 20° inclined downward, and a rated speed is 7.7 r/min.

In this embodiment, the transmission gear 420 is directly meshed with the second rotating component 540 to transmit power or movement. However, it may be understood that, in other embodiments, power or movement may also be transmitted between the transmission gear 420 and the second rotating component 540 through a meshing of the intermediate component, and the transmission gear 420 and the intermediate component constitute a transmission component.

Please refer to FIG. 51 through FIG. 55. In this embodiment, the second driven meshing part 543 is arranged on an entire circumference of the second toothed disc part 541, and for example, the second driving meshing part of the transmission gear 420 and the second driven meshing part 543 of the second toothed disc part 541 may both be teeth. It should be understood that, in other embodiments, the second rotating component 540 may also adopt the second driven meshing part 543 similar to the first rotating component 640 of the first embodiment, which means that the second driven meshing part 543 may only be arranged on a partial circumference of the second toothed disc part 541. Such a design may not only meet a requirement of angle adjustment, but also play a role of limitation. The second rotating component 540 will stop when it rotates to a position of a tooth edge, thereby restricting a continuous rotation of the second air outlet conduit 520.

In order to facilitate an adjustment of the air direction, the adjustment switch 410 of the motor driving mechanism may be arranged at a corresponding position on an upper end of the blower frame 150 of the blower 2000. This position needs to ensure that when the blower 2000 is mounted on the front end of the mower 1000, the operator leans forward in the driving position of the mower 1000, and it is advisable that the operator's arm can reach it. In this embodiment, the electrically driven adjustment switch 410 is mounted at an opening of the controller cover 131.

Figure 56:
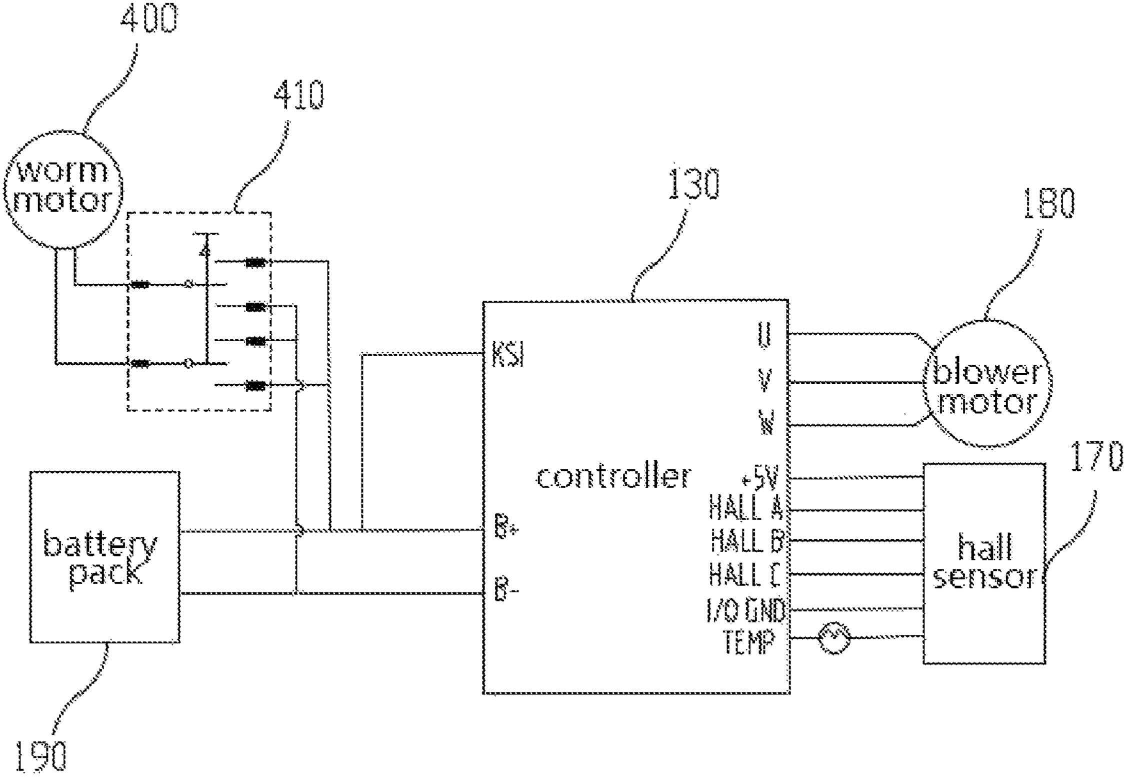
FIG. 56 is an electrical principle view of the blower with the third blowing direction adjustment mechanism of the disclosure.

FIG. 56 is an electrical principle view of the blower 2000 with the blowing direction adjustment mechanism of this embodiment. Please refer to FIG. 56. The third driving motor 400 (worm motor) is connected with the battery pack through the adjustment switch 410, and a connection between the third driving motor 400 and the battery pack 190 may be controlled to power on or off the third driving motor 400 through adjusting the switch 410. The battery pack may be, for example, a power supply battery pack of mower 1000. The motor assembly 180 of the blower 2000 is connected with the battery pack 190 through the controller 130, the controller 130 is also communicatively connected with a hall sensor 170 carried by the motor assembly 180 of the blower 2000, and an operation of the motor assembly 180 of the blower 2000 is controlled by the controller 130.

The adjustment switch 410 controls a rotation direction of the third driving motor 400 (forward rotation, reverse rotation and stop). An output steering of the third driving motor 400 has two kinds of steering, counterclockwise and clockwise. The third driving motor 400 rotates clockwise and drives a lower nozzle of the second air outlet conduit 520 to rotate counterclockwise in the horizontal direction. Conversely, a counterclockwise rotation of the third driving motor 400 drives the lower nozzle of the second air outlet conduit 520 to rotate clockwise in the horizontal direction, so that an orientation of the air outlet of the blower 2000 may be freely adjusted within a 360° circle.

The overall blower 2000 of this embodiment is designed such that the air outlet rotates freely 360° in the horizontal direction around the location, and controlling the third driving motor 400 by the adjustment switch 410 may realize a function of forward rotation and reverse rotation at any time. In order to improve efficiency of a volute fan, an area ratio of the air inlet and outlet of the fan is 2.77. Please refer to FIG. 57. The whole blower 2000 may be mounted on the front end of the mower 1000 through the second connecting component 140 mentioned above, and a height h1 of a lowest point of the whole blower 2000 from the ground may be, for example, 120 mm. A height h2 of a lowest point of the air outlet of the blower 2000 (the lower nozzle of the second air outlet conduit 520) from the ground may be, for example, 140 mm, so that the lowest height of the air outlet of the blower 2000 (the lower nozzle of the second air outlet conduit 520) is higher than the lowest height of the whole blower 2000 (h2−h1), for example, by 20 mm. It should be understood that h1 and h2 may be adjusted according to actual needs, and are not limited to the above data.

A structural design of the blower 2000 in this embodiment can realize a free adjustment of 360 degrees in the horizontal plane of the air outlet of the blower 2000.

Figure 57:
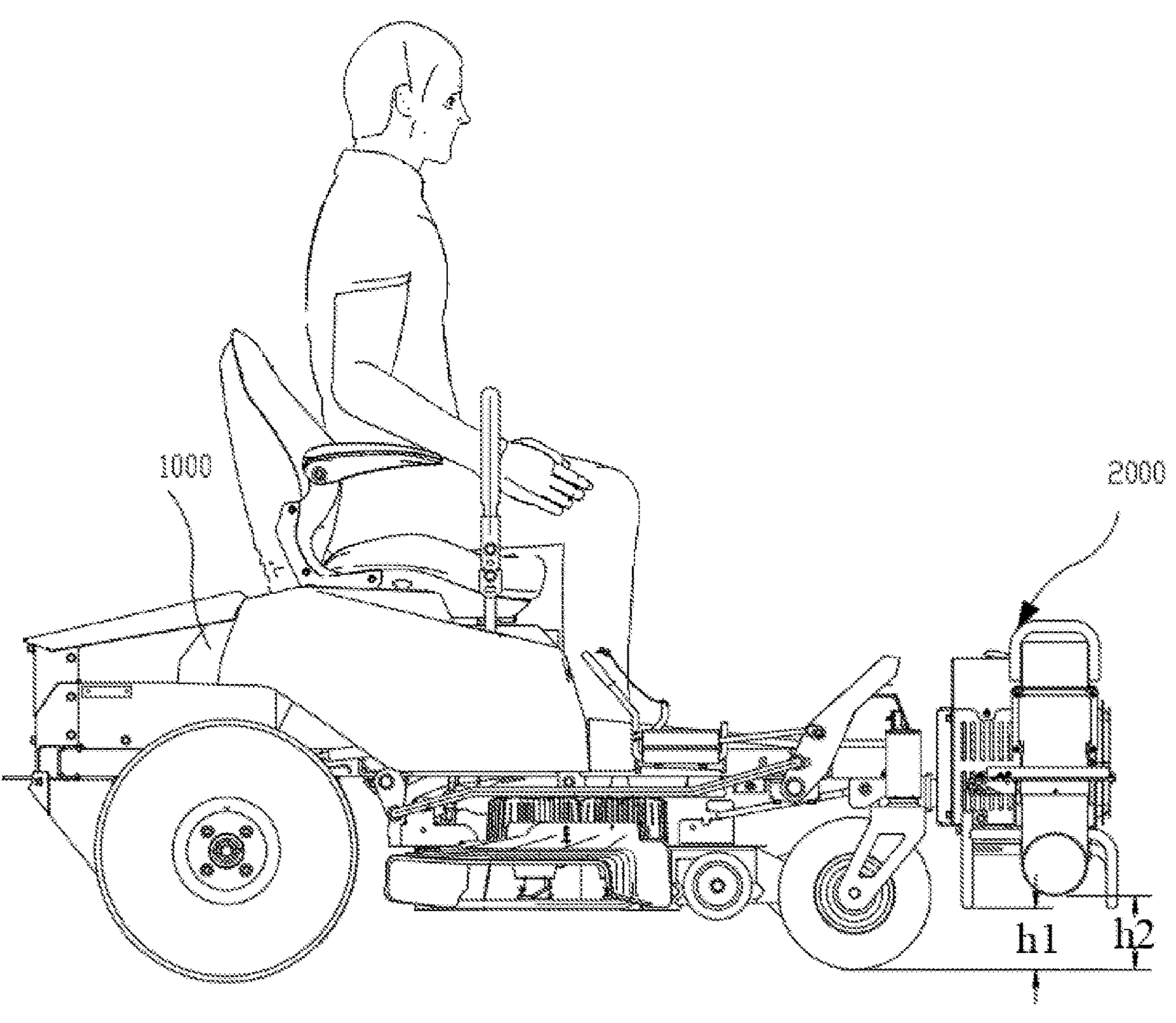
FIG. 57 is a schematic structural view of the blower with the third blowing direction adjustment mechanism of the disclosure mounted on the front end of a lawn mower.

Please refer to FIG. 57. The blower 2000 is mounted on the front end of the mower 1000 through the second connecting component 140 arranged on one side thereof. In order to facilitate the adjustment of the air direction, the adjustment switch 410 of the blowing direction adjustment mechanism may be arranged at a suitable position on the upper end of the blower frame 150 of the blower 2000. This position needs to ensure that when the blower 2000 is mounted on the front of the mower 1000, the operator leans forward in the driving position of the mower 1000, and it is advisable that the operator's arm can reach it. During an entire adjustment process, the operator leans forward in a driving position on the mower 1000. The operator's arm may touch the adjustment switch 410, and then control the adjustment of any angle of the air outlet. An adjustment process is simple and convenient, and the operator does not need to get off the mower 1000 during the adjustment process, which saves manpower and time. In this embodiment, the electrically driven adjustment switch 410 is mounted at the opening of the controller cover 131.

The above description of the illustrated embodiment of the disclosure (including content described in the abstract of the specification) is not intended to exhaustively enumerate or limit the disclosure to the precise form provided herein. Although specific embodiments of the disclosure and examples of the disclosure are described herein for illustrative purposes only, as those skilled in the art recognize and understand, various equivalent modifications are possible within the scope of the disclosure. As pointed out, these modifications may be made to the disclosure according to the above description of the embodiments of the disclosure, and these modifications will be within the scope of the disclosure.

What is claimed is:

1. A mower, comprising:
a vehicle frame;
a walking assembly, comprising a first walking wheel assembly connected with the vehicle frame and a second walking wheel assembly connected with the vehicle frame;
a working assembly, connected with the vehicle frame;
a seat, arranged on the vehicle frame;
a battery pack, mounted on the vehicle frame and extending below the seat; and
a resistor assembly, mounted at a bottom of the vehicle frame and comprising a reverse charging resistor, wherein
the first walking wheel assembly and/or the second walking wheel assembly comprises a main walking wheel and a hub motor, the main walking wheel is connected with the hub motor, and the hub motor is arranged outside a side of the vehicle frame.

2. The mower according to claim 1, wherein
the first walking wheel assembly is arranged at a front end of the vehicle frame, the first walking wheel assembly comprises a front wheel and a steering mechanism to control a steering of the front wheel, the second walking wheel assembly is arranged at a rear end of the vehicle frame, and the second walking wheel assembly comprises the main walking wheel and the hub motor.

3. The mower according to claim 2, wherein
the seat is arranged between the first walking wheel assembly and the second walking wheel assembly, and the battery pack is mounted at the rear end of the vehicle frame and extends below the seat.

4. The mower according to claim 3, wherein
a longitudinal distance between a front end of the battery pack and an axle of the main walking wheel is from 340 mm to 400 mm.

5. The mower according to claim 3, wherein
a distance between a center of gravity of the battery pack and an axle of the main walking wheels is from 60 mm to 70 mm.

6. The mower according to claim 3, wherein
a height of a center of gravity of the battery pack from a ground is from 400 mm to 500 mm.

7. The mower according to claim 6, wherein
a total length of the hub motor is from 250 mm to 310 mm.

8. The mower according to claim 1, wherein
the seat is arranged between the first walking wheel assembly and the second walking wheel assembly, and the battery pack is installed at the front of the vehicle frame and extends below the seat.

9. The mower according to claim 1, wherein
the working assembly further comprises:
a cutting deck;
a driving assembly, mounted on a top of the cutting deck, and an air vent being arranged between the cutting deck and the driving assembly; and
a cutter assembly, mounted on a bottom of the cutting deck and connected with an output shaft of the driving assembly.

10. The mower according to claim 9, wherein
a mounting hole is arranged on the cutting deck, the driving assembly is mounted at the mounting hole, partially extends from the mounting hole into the bottom of the cutting deck, and is connected with the cutter assembly.

11. The mower according to claim 1, wherein
the walking assembly comprises the first walking wheel assembly and the second walking wheel assembly arranged at the bottom of the vehicle frame, and the resistor assembly is located between the first walking wheel assembly and the second walking wheel assembly.

12. The mower according to claim 1, wherein
the resistor assembly further comprises:
a mounting bracket, the resistor assembly being mounted on the vehicle frame through the mounting bracket;
a heat dissipation component, mounted on the mounting bracket; and
a mesh plate, mounted on the mounting bracket; wherein
the reverse charging resistor is located between the heat dissipation component and the mesh plate, and heat dissipation holes of the mesh plate expose a surface of the reverse charging resistor on a side away from the heat dissipation component.

13. The mower according to claim 12, wherein
the mesh plate is arranged on one side of the resistor assembly facing a forward direction of the mower.

14. The mower according to claim 1, further comprising a control module, wherein
the control module and the resistor assembly are mounted independently, the control module is connected with the reverse charging resistor, and the control module and the reverse charging resistor together constitute an anti-reverse charging module.

15. The mower according to claim 1, further comprising a blower, wherein the blower is mounted to a front end of the mower, the blower comprises:

a blower frame, provided with an air outlet; and a blowing direction adjustment mechanism, arranged on the blower frame; wherein the blowing direction adjustment mechanism comprises:

a gear seat, mounted on the blower frame;

a rotating swing arm, rotatably mounted on the gear seat;

an adjustment handle, one end of the adjustment handle being pivotally arranged on the rotating swing arm;

a connecting rod assembly, a first end of the connecting rod assembly being connected with the rotating swing arm;

an adjustment plate rotating shaft, arranged at the air outlet, and connected with a second end of the connecting rod assembly through a transmission component; and an air direction adjustment plate, located in the air outlet, fixedly connected with the adjustment plate rotating shaft, and rotating synchronously with the adjustment plate rotating shaft.

16. The mower according to claim 15, wherein the adjustment handle comprises a holding part and a pivot mounting part, the pivot mounting part is arranged at one end of the holding part, the blowing direction adjustment mechanism further comprises a first torsion spring, the first torsion spring is sleeved on the pivot mounting part, a first end of the first torsion spring is connected with the holding part, and a second end of the first torsion spring is connected with the rotating swing arm.

17. The mower according to claim 15, wherein the blowing direction adjustment mechanism further comprises a second torsion spring, the second torsion spring is sleeved on the adjustment plate rotating shaft, a first end of the second torsion spring is connected with the transmission component, and a second end of the second torsion spring is connected with the blower frame.

18. The mower according to claim 15, wherein the blowing direction adjustment mechanism further comprises two joint bearings, a first end of the connecting rod assembly is connected with the rotating swing arm through the joint bearings, a second end of the connecting rod assembly is connected with a first end of the transmission component through the joint bearing, and a second end of the transmission component is connected with the adjustment plate rotating shaft.

19. The mower according to claim 1, further comprising a blower, wherein the blower is connected with the mower, the blower comprises:

a blower assembly; and an adjustment mechanism, arranged on the blower assembly, and the adjustment mechanism comprising:

a rotating air passage assembly, connected with an air outlet of the blower; and a driving mechanism, the driving mechanism being in a transmission connection with the rotating air passage assembly, and the driving mechanism being provided with an operating part;

wherein, an arrangement position of the operating part is a position that is operatable by an operator who in a driving position of the mower, and the driving mechanism is controlled by the operating part to drive the rotating air passage assembly to rotate.

* * * * *